(12) United States Patent
Huang

(10) Patent No.: US 12,445,715 B2
(45) Date of Patent: Oct. 14, 2025

(54) VIDEO SHOOTING METHOD AND ELECTRONIC DEVICE

(71) Applicant: HONOR DEVICE CO., LTD., Shenzhen (CN)

(72) Inventor: Yufei Huang, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 27 days.

(21) Appl. No.: 18/257,249

(22) PCT Filed: May 26, 2022

(86) PCT No.: PCT/CN2022/095323
§ 371 (c)(1),
(2) Date: Jun. 13, 2023

(87) PCT Pub. No.: WO2022/262547
PCT Pub. Date: Dec. 22, 2022

(65) Prior Publication Data
US 2024/0040235 A1  Feb. 1, 2024

(30) Foreign Application Priority Data

Jun. 16, 2021 (CN) .......................... 202110676709.3
Nov. 29, 2021 (CN) .......................... 202111437928.2
Dec. 31, 2021 (CN) .......................... 202111679287.1

(51) Int. Cl.
*H04N 23/63* (2023.01)
*H04N 5/262* (2006.01)
(Continued)

(52) U.S. Cl.
CPC ......... *H04N 23/632* (2023.01); *H04N 5/2624* (2013.01); *H04N 5/272* (2013.01); *H04N 23/667* (2023.01); *H04N 23/90* (2023.01)

(58) Field of Classification Search
CPC ........ H04N 5/272; H04N 23/45; H04N 23/69; H04N 23/632; H04N 5/2624;
(Continued)

(56) References Cited

U.S. PATENT DOCUMENTS 10,972,662 B2   4/2021  Lee et al.
11,379,061 B2   7/2022  Wang
(Continued)

FOREIGN PATENT DOCUMENTS

CN   105391866 A   3/2016
CN   105491309 A   4/2016
(Continued)

OTHER PUBLICATIONS

Fan et al., "A Fast and Robust Mult-i Camera Object Tracking Algorithm," Journal of Fudan University (Natural Science), vol. 49, No. 6, Dec. 2010, 9 pages (with English abstract).

*Primary Examiner* — Timothy J Henn
(74) *Attorney, Agent, or Firm* — Fish & Richardson P.C.

(57) ABSTRACT

Embodiments of this application provide a video shooting method and an electronic device, and relate to the field of terminal technologies. The method is applied to an electronic device including a display, a first camera, and a second camera. The method includes: displaying, in a first region of the display, a first image collected in real time by the first camera, and displaying, in a second region of the display, a second image collected in real time by the second camera; responding to a detected user operation, displaying a third image in a third region of the display, and displaying a fourth image in a fourth region of the display, where the third region is different from the first region, and the fourth region is different from the second region.

20 Claims, 37 Drawing Sheets

(51) Int. Cl.
*H04N 5/272* (2006.01)
*H04N 23/667* (2023.01)
*H04N 23/90* (2023.01)

(58) Field of Classification Search
CPC . H04N 5/2628; H04N 23/53; H04M 1/72469; H04M 2250/52; H04M 1/72403; G06V 40/113

See application file for complete search history.

(56) References Cited

U.S. PATENT DOCUMENTS

| | | | |
|---|---|---|---|
| 2014/0192137 A1* | 7/2014 | Kim | H04N 7/141 348/14.07 |
| 2014/0192232 A1* | 7/2014 | Park | H04N 5/76 348/231.99 |
| 2014/0192245 A1 | 7/2014 | Lee et al. | |
| 2014/0267842 A1 | 9/2014 | Lee et al. | |
| 2015/0039387 A1* | 2/2015 | Akahoshi | G06Q 30/0201 705/7.29 |
| 2015/0172552 A1 | 6/2015 | Kim | |
| 2016/0241783 A1 | 8/2016 | Fukui | |
| 2018/0063434 A1* | 3/2018 | Seol | G06V 40/197 |
| 2021/0208831 A1 | 7/2021 | Zhang et al. | |
| 2022/0159183 A1* | 5/2022 | Li | H04N 23/635 |
| 2022/0264053 A1* | 8/2022 | Wang | H04N 5/268 |

FOREIGN PATENT DOCUMENTS

| | | |
|---|---|---|
| CN | 105959544 A | 9/2016 |
| CN | 107197094 A | 9/2017 |
| CN | 107528938 A | 12/2017 |
| CN | 107807772 A | 3/2018 |
| CN | 107820016 A | 3/2018 |
| CN | 107835359 A | 3/2018 |
| CN | 108471498 A | 8/2018 |
| CN | 110072070 A | 7/2019 |
| CN | 110266983 A | 9/2019 |
| CN | 105979157 B | 12/2019 |
| CN | 111669462 A | 9/2020 |
| CN | 112136100 A | 12/2020 |
| CN | 112673612 A | 4/2021 |
| CN | 112738414 A | 4/2021 |
| CN | 112954219 A | 6/2021 |
| JP | 2008160473 A | 7/2008 |
| WO | 2018169273 A1 | 9/2018 |
| WO | WO-2020186969 A1 * | 9/2020 ............. H04N 23/45 |

* cited by examiner

Face a display and hand up

Face a display and make a fist

Face a display and flip a palm

Face a display and hand up

Face a display and hand up

Face a display and move a palm from left to right

Face a display and flip a palm

Face a display and move a palm from left to right

Face a display and make a fist

VIDEO SHOOTING METHOD AND ELECTRONIC DEVICE

This application is a national stage of International Application No. PCT/CN2022/095323, filed on May 26, 2022 which claims priority to Chinese Patent Application No. 202110676709.3, filed on Jun. 16, 2021, and Chinese Patent Application No. 202111437928.2, filed on Nov. 29, 2021, and Chinese Patent Application No. 202111679287.1, filed on Dec. 31, 2021. The disclosures of the aforementioned applications are hereby incorporated by reference in their entireties.

TECHNICAL FIELD

This application relates to the field of terminal technologies, and in particular, to a video shooting method and an electronic device.

BACKGROUND

With development of electronic technologies, electronic devices such as a mobile phone and a tablet computer are generally provided with a plurality of cameras, such as a front-facing camera, a rear-facing camera, and a wide-angle camera. To further improve photographing creation experience, more electronic devices can allow a plurality of cameras to shoot simultaneously, and a user may select, based on a requirement of the user, a corresponding photographing mode, for example, a front photographing mode, a rear photographing mode, a front/rear photographing mode, and a picture-in-picture photographing mode. Therefore, wonderful pictures such as a magic moment and a heartwarming scene are recorded.

In a video shooting process, the user may need to switch a photographing mode, for example, switch the front/rear photographing mode to the picture-in-picture photographing mode. However, when switching between different photographing modes is performed, picture data collected by different cameras of the electronic device is displayed on a photographing preview interface with a specific delay. When the user performs switching between the different photographing modes, if picture data collected by cameras corresponding to various modes is directly displayed, when mode switching is performed, picture switching on the photographing preview interface appears rigid, and even a "frame freezing" visual effect appears, affecting user experience.

SUMMARY

Embodiments of this application provide a video shooting method and an electronic device. The video shooting method can support the electronic device in performing animation processing during switching for a displayed picture on a photographing preview interface when performing photographing mode switching, so that the displayed picture on the photographing preview interface looks more fluent and vivid during switching, improving user experience.

According to a first aspect, an embodiment of this application provides a video shooting method. The method is applied to an electronic device including a display, a first camera, and a second camera, the first camera and the second camera are located on different sides of the display, and the first camera and the display are located on a same side of the electronic device. The method includes:

displaying, in a first region of the display, a first image collected in real time by the first camera, and displaying, in a second region of the display, a second image collected in real time by the second camera;

responding to a detected user operation, displaying a third image in a third region of the display, and displaying a fourth image in a fourth region of the display, where the third region is smaller than the first region and the fourth region is larger than the second region, or the third region is larger than the first region and the fourth region is smaller than the second region; and displaying, in a fifth region of the display, the first image collected in real time by the first camera, and displaying, in a sixth region of the display, the second image collected in real time by the second camera, where the fifth region is different from the first region, and the sixth region is different from the second region.

On this basis, when the image is displayed according to the shooting method provided in this embodiment of this application, before the user operation is detected, the first image and the second image are displayed in the first region and the second region of the display, and this is one displayed picture. After the user operation is detected, a picture last displayed on the display is the first image and the second image that are displayed in the fifth region and the sixth region of the display. Because the fifth region is different from the first region and the sixth region is different from the second region, this picture is another displayed picture. That is, before and after the user operation is detected, displayed pictures on the display are switched from one displayed picture to another displayed picture. In this application, when the user operation is detected, before the first image and the second image are displayed in the fifth region and the sixth region, the third image is displayed in the third region of the display, and the fourth image is displayed in the fourth region of the display. This part of display content is used as a transition animation of the displayed picture of the display during switching, that is, the transition animation is added when the displayed picture on the display is switched from one displayed picture to another displayed picture. In addition, the transition animation is a dynamic displayed picture, and is used for transition from one displayed picture to another displayed picture. During picture switching, the transition animation is added, helping improve fluency of picture switching. This embodiment of this application shows specific switching of the displayed picture, that is, switching from a split-screen display mode to a picture-in-picture display mode.

In a possible design manner of the first aspect, after the responding to a detected user operation, the method includes:

in a first time period, displaying, in the first region, a first image collected by the first camera when the user operation is detected, and displaying, in the second region, a second image collected by the second camera when the user operation is detected;

in a second time period, displaying the third image in the third region, and displaying the fourth image in the fourth region; and in a third time period, displaying, in the fifth region, the third image and the first image collected in real time by the first camera, where the third image is superimposed and displayed on the first image, and displaying, in the sixth region, the fourth image and the second image collected in real time by the second camera, where the fourth image is superimposed and displayed on the second image.

On this basis, a process of switching a picture on the display from one displayed picture to another displayed picture is divided into three phases. To be specific, in the first time period, the first image and the second image are displayed in a display mode (in which the first image is displayed in the first region and the second image is displayed in the second region) before picture switching. In the second time period, the transition animation is displayed (where the third image is displayed in the third region and the fourth image is displayed in the fourth region) for transition. In the third time period, the first image and the second image are displayed in a switched-to display mode (in which the first image is displayed in the fifth region and the second image is displayed in the sixth region), and in this case, the third image is superimposed on the first image, and the fourth image is superimposed on the second image, so as to implement a smooth transition from the transition animation to the switched-to display mode, thereby improving fluency of picture switching.

In a possible design manner of the first aspect, the first region and the second region are spliced and displayed on the display, the third region and the fourth region are spliced and displayed on the display, the sixth region is the entire display region of the display, and the fifth region is smaller than the sixth region.

On this basis, through setting, the first region and the second region are spliced and displayed on the display, so that this display mode may be the split-screen display mode. Through setting, the third region and the fourth region are spliced and displayed on the display, so that the transition animation may also be in the split-screen display mode, and the transition animation and the display mode before switching are the same display mode. Therefore, a smooth transition is kept between the transition animation and the display mode before switching. The sixth region is set as the entire display region of the display, and the fifth region is smaller than the sixth region, so that this display mode may be the picture-in-picture display mode. In this design manner, specific switching of the displayed picture, that is, switching from the split-screen display mode to the picture-in-picture display mode is shown, and the display mode of the transition animation is also the split-screen display mode.

In a possible design manner of the first aspect, in the first time period, a Gaussian blur value of the second image gradually increases from a first blur value based on a first curve, and in the second time period, a Gaussian blur value of the fourth image gradually increases to a second blur value based on the first curve.

On this basis, through setting, the Gaussian blur value of the second image gradually increases in the first time period, and the Gaussian blur value of the fourth image gradually increases in the second time period. This is a specific animation processing manner of the transition animation, which can ensure that when real-time image data is subsequently loaded in the display region in which the fourth image is located, the displayed picture is more natural.

In a possible design manner of the first aspect, when the third image is displayed in the third region of the display, and the fourth image is displayed in the fourth region of the display, the method further includes:
  displaying a preset picture in the fifth region of the display, where the preset picture is superimposed and displayed on the third image and/or the fourth image; and
  in the second time period, gradually increasing a Gaussian blur value of the preset picture from the first blur value to a third blur value based on the first curve, and
  gradually increasing an opacity of the preset picture from a first opacity to a second opacity based on a second curve.

On this basis, the preset picture is displayed in the fifth region, and the preset picture is superimposed and displayed on the third image and/or the fourth image, so that the transition animation facilitates switching to the picture-in-picture display mode, and the fifth region may be used to display data content displayed in a small window in the picture-in-picture display mode. By setting a change of the blur value and a change of the transparency of the preset picture, two specific animation effects in the transition animation are shown, so that the displayed picture on the screen can naturally transition during the switching, thereby avoiding direct switching from one display interface to another display interface, and avoiding rigidness and abruptness in picture switching.

In a possible design manner of the first aspect, before the displaying, in a fifth region of the display, the first image collected in real time by the first camera, and displaying, in a sixth region of the display, the second image collected in real time by the second camera, the method further includes:
  in the third time period, gradually decreasing the opacity of the preset picture from the second opacity to the first opacity based on the second curve; and
  in the third time period, gradually decreasing an opacity of the fourth image from the second opacity to the first opacity based on the second curve.

On this basis, the opacities of the preset picture and the fourth image are set to gradually decrease, so that the preset picture and the fourth image gradually become transparent, the first image covered by the preset picture and the second image covered by the fourth image are gradually displayed on the screen, the first image is clearly displayed in the fifth region, and the second image is clearly displayed in the sixth region. Displaying from the transition animation to the switched-to displayed picture is completed, so that the first image and the second image are displayed in the switched-to display mode.

In a possible design manner of the first aspect, when the third image is displayed in the third region of the display, and the fourth image is displayed in the fourth region of the display, the method includes:
  in the second time period, shrinking the third region along a direction corresponding to the user operation, and moving the third image along the direction corresponding to the user operation until the third image disappears from the display; and
  in the second time period, enlarging the fourth region along the direction corresponding to the user operation, and zooming in the fourth image along the direction corresponding to the user operation until the fourth image fills the entire display.

On this basis, the third image is set to move along the direction corresponding to the user operation, and the fourth image is set to zoom in along the direction corresponding to the user operation, which serve as a part of specific animation in the transition animation, so that a picture displayed after the transition animation is completed is the same as the switched-to displayed picture (that is, the second image is displayed in the sixth region), a transition from the transition animation to the switched-to displayed picture is natural, switching of the entire displayed picture appears smoother, and fluency of the switching process is improved.

In a possible design manner of the first aspect, the third image moves based on a third curve along the direction corresponding to the user operation, and the fourth image zooms based on the third curve along the direction corresponding to the user operation.

On this basis, the third curve is set as a moving speed reference of the third image, and the third curve is set as a zooming speed reference of the fourth image. Selecting a proper third curve can ensure that a picture change in the transition animation is more natural, improving visual experience of a user.

In a possible design manner of the first aspect, the third image is generated based on the first image, and the fourth image is generated based on the second image.

On this basis, through setting, the third image is generated based on the first image, and the fourth image is generated based on the second image, so that a displayed picture in the transition animation is the same as or similar to a displayed picture displayed on the display when no user operation is detected, and a transition from the displayed picture before switching to the transition animation is natural.

According to a second aspect, an embodiment of this application provides a video shooting method. The method is applied to an electronic device including a display, a first camera, and a second camera, the first camera and the second camera are located on different sides of the display, and the first camera and the display are located on a same side of the electronic device. The method includes:
- displaying, in a first region of the display, a first image collected in real time by the first camera, and displaying, in a second region of the display, a second image collected in real time by the second camera;
- responding to a detected user operation, displaying a third image in a third region of the display, and displaying a fourth image in a fourth region of the display; and
- displaying, in a fifth region of the display, the first image collected in real time by the first camera, and displaying, in a sixth region of the display, the second image collected in real time by the second camera, where the fifth region is different from the first region, the sixth region is different from the second region, the fifth region is larger than the third region, and the sixth region is smaller than the fourth region.

On this basis, this embodiment of this application shows another specific switching of a displayed picture, that is, switching from a picture-in-picture display mode to a split-screen display mode, and a display mode of a transition animation may be the split-screen display mode. This embodiment and the embodiment provided in the first aspect are mirroring change processes. For technical effects in this embodiment and a possible design manner, refer to the beneficial effects described in the first aspect and the possible design manners of the first aspect. Details are not described herein again.

In a possible design manner of the second aspect, after the responding to a detected user operation, the method includes:
- in a first time period, displaying, in the first region, a first image collected by the first camera when the user operation is detected, and displaying, in the second region, a second image collected by the second camera when the user operation is detected;
- in a second time period, displaying the third image in the third region, and displaying the fourth image in the fourth region; and
- in a third time period, displaying, in the fifth region, the third image and the first image collected in real time by the first camera, where the third image is superimposed and displayed on the first image, and displaying, in the sixth region, the fourth image and the second image collected in real time by the second camera, where the fourth image is superimposed and displayed on the second image.

On this basis, a process of switching a picture on the display from one displayed picture to another displayed picture is divided into three phases. To be specific, in the first time period, the first image and the second image are displayed in a display mode (in which the first image is displayed in the first region and the second image is displayed in the second region) before picture switching. In the second time period, the transition animation is displayed (where the third image is displayed in the third region and the fourth image is displayed in the fourth region) for transition. In the third time period, the first image and the second image are displayed in a switched-to display mode (in which the first image is displayed in the fifth region and the second image is displayed in the sixth region), and in this case, the third image is superimposed on the first image, and the fourth image is superimposed on the second image, so as to implement a smooth transition from the transition animation to the switched-to display mode, thereby improving fluency of picture switching.

In a possible design manner of the second aspect, the second region is the entire display region of the display, the first region is smaller than the second region, the third region and the fourth region are spliced and displayed on the display, and the fifth region and the sixth region are spliced and displayed on the display.

In a possible design manner of the second aspect, in the first time period, a Gaussian blur value of the first image gradually increases from a first blur value to a third blur value based on a first curve, and a Gaussian blur value of the second image gradually increases from the first blur value based on the first curve; and
in the second time period, a Gaussian blur value of the fourth image gradually increases to a second blur value based on the first curve.

On this basis, the Gaussian blur values of the first image and the second image are set to gradually increase. This is a specific animation effect in the transition animation, and helps implement a visually natural switching effect during picture switching. By setting the first curve, degrees of changes in the blur values of the first image and the second image can be adjusted by selecting a proper first curve, so that an animation formed by the changes in the blur values can make a change of the picture smooth and natural.

In a possible design manner of the second aspect, when the third image is displayed in the third region of the display, and the fourth image is displayed in the fourth region of the display, the method includes:
- displaying the first image in the first region, where the first image is superimposed and displayed on the third image and/or the fourth image; and
- in the second time period, gradually decreasing an opacity of the first image from a second opacity to a first opacity based on a second curve.

On this basis, the opacity of the first image is set to gradually decrease, so that a small window in the picture-in-picture display mode and display content in the small window are gradually transparent, and the transition animation gradually transitions to the split-screen display mode.

In a possible design manner of the second aspect, when the third image is displayed in the third region of the display, and the fourth image is displayed in the fourth region of the display, the method includes:
- moving the third region and the third image along a direction corresponding to the user operation, and moving the fourth region and the fourth image along the direction corresponding to the user operation until a size of the third region is equal to a size of the fourth region.

On this basis, the third image is set to move in the direction corresponding to the user operation, and the fourth image is set to move in the direction corresponding to the user operation, so that the transition animation gradually transitions to the split-screen display mode, to transition from the transition animation to the switched-to split-screen display mode.

In a possible design manner of the second aspect, the third image moves based on a third curve along the direction corresponding to the user operation, and the fourth image moves based on the third curve along the direction corresponding to the user operation.

On this basis, the third curve is set as a reference curve for moving the third image and the fourth image. After a proper third curve is selected, moving speeds of the third image and the fourth image can be adjusted, so that animations formed by moving the third image and the fourth image have a specific change rhythm, to improve visual experience of a user.

In a possible design manner of the second aspect, before the displaying, in a fifth region of the display, the first image collected in real time by the first camera, and displaying, in a sixth region of the display, the second image collected in real time by the second camera, the method further includes:
 in the third time period, gradually decreasing an opacity of the third image from the second opacity to the first opacity based on the second curve; and
 in the third time period, gradually decreasing an opacity of the fourth image from the second opacity to the first opacity based on the second curve.

On this basis, the opacities of the third image and the fourth image are set to gradually decrease, so that the third image and the fourth image gradually become transparent, the first image covered by the third image and the second image covered by the fourth image are gradually displayed on the screen, the first image is clearly displayed in the fifth region, and the second image is clearly displayed in the sixth region. Displaying from the transition animation to the switched-to displayed picture is completed, so that the first image and the second image are displayed in the switched-to display mode (the split-screen display mode).

In a possible design manner of the second aspect, the third image is a preset picture, and the fourth image is generated based on the second image.

On this basis, through setting, the fourth image is generated based on the second image, so that a part of displayed picture in the transition animation is the same as or similar to a displayed picture displayed on the display when no user operation is detected, and a transition from the displayed picture before switching to the transition animation is natural.

According to a third aspect, an embodiment of this application provides an electronic device, including a memory configured to store computer program instructions and a processor configured to execute the program instructions. When the computer program instructions are executed by the processor, the electronic device is triggered to perform the method according to any one of the first aspect/the second aspect and the possible design manners thereof.

According to a fourth aspect, an embodiment of this application provides a computer-readable storage medium. The computer-readable storage medium includes a stored program, and when the program is run, a device on which the computer-readable storage medium is located is controlled to perform the method according to any one of the first aspect/the second aspect and the possible design manners thereof.

According to a fifth aspect, an embodiment of this application provides a computer program product. The computer program product includes executable instructions, and when the executable instructions are executed on a computer, the computer is enabled to perform the method according to any one of the first aspect/the second aspect and the possible design manners thereof.

It may be understood that, for beneficial effects that can be achieved by the electronic device provided in the third aspect, the computer-readable storage medium provided in the fourth aspect, and the computer program product provided in the fifth aspect, reference may be made to the beneficial effects of any one of the first aspect/the second aspect and the possible design manners thereof. Details are not described herein again.

DESCRIPTION OF EMBODIMENTS

Figure 1A:
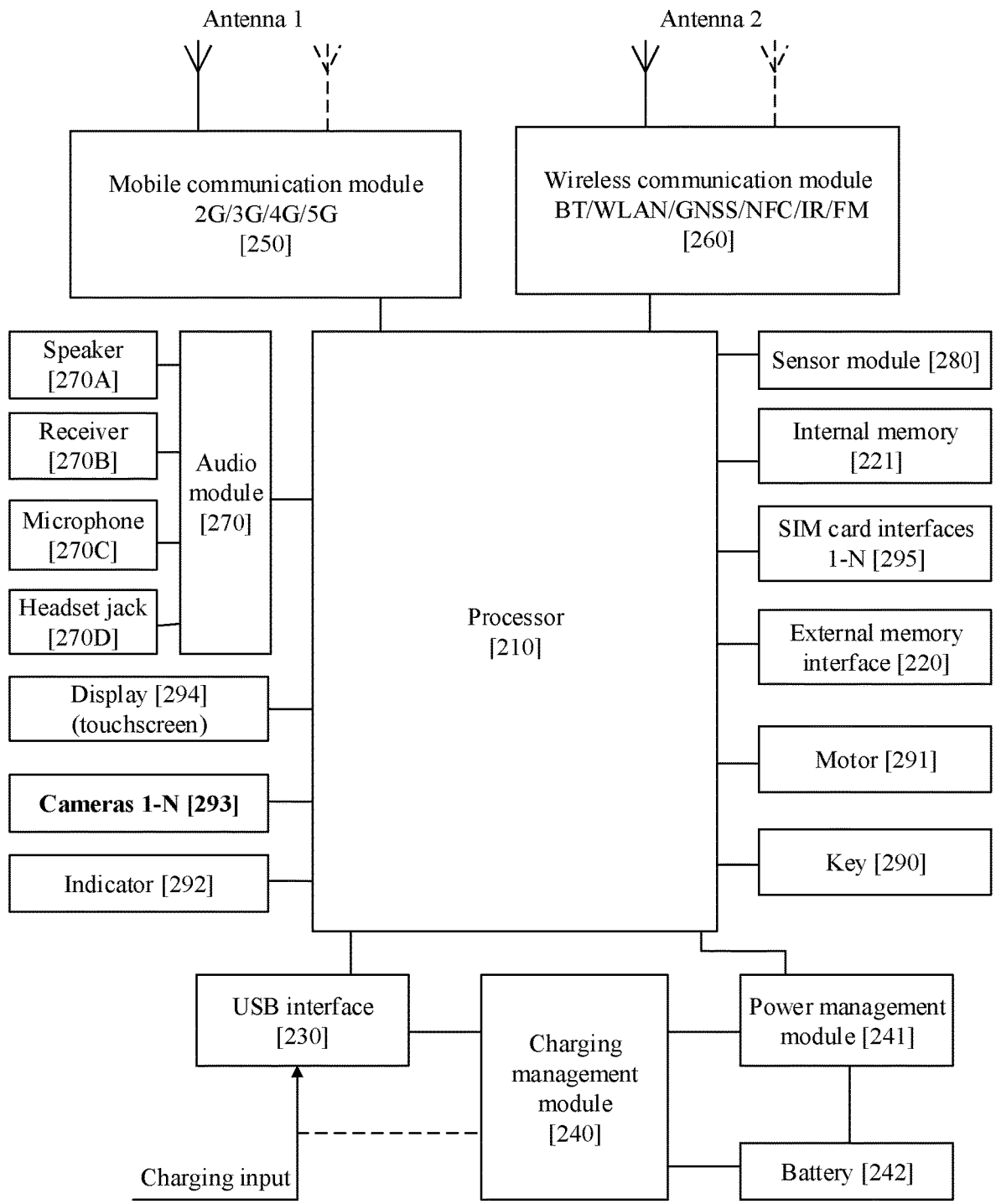
FIG. 1A is a diagram of a hardware architecture of an electronic device according to an embodiment of this application.

The terms used in the following embodiments of this application are merely intended to describe specific embodiments, but are not intended to limit this application. As used in the specification of this application and the appended claims, the singular expressions "one", "a", "the", "the foregoing", "said", and "this" are intended to also include plural expressions, unless otherwise explicitly oppositely indicated in their context. It should be further understood that "/" represents a meaning of "or". For example, "A/B"

may represent A or B. The term "and/or" in this specification describes only an association relationship for describing associated objects and represents that three relationships can exist. For example, "A and/or B" can represent the following three cases: Only A exists, both A and B exist, and only B exists.

The following clearly and fully describes technical solutions in embodiments of this application with reference to the accompanying drawings.

An "embodiment" in this application means that a specific feature, structure, or characteristic described with reference to the embodiment may be included in at least one embodiment of this application. The phrase appearing at various locations in the specification does not necessarily refer to a same embodiment, nor is a separate or alternative embodiment mutually exclusive with another embodiment. A person skilled in the art explicitly and implicitly understand that the embodiments described in this application may be combined with another embodiment.

In the following embodiments of this application, the terms "first" and "second" are used only for description purposes, and cannot be construed as an implication or implication of relative importance or implicit indication of a quantity of indicated technical features. Therefore, features defined by "first" and "second" may explicitly or implicitly include one or more of the features. In the descriptions of embodiments of this application, unless otherwise specified, "a plurality of" means two or more.

The term "user interface (user interface, UI)" in the following embodiments of this application is a medium interface for interaction and information exchange between an application or an operating system and a user, and implements conversion between an internal form of information and a form that can be accepted by the user. The user interface is source code written in a specific computer language such as Java or an extensible markup language (extensible markup language, XML). Interface source code is parsed and rendered on an electronic device, and is finally presented as content that can be identified by the user. The user interface is usually in a representation form of a graphic user interface (graphic user interface, GUI), and the graphic user interface is a user interface that is related to a computer operation and that is displayed in a graphical manner. The user interface may be a visual interface element such as a text, an icon, a button, a menu, a tab, a text box, a dialog box, a status bar, a navigation bar, or a Widget displayed on a display of the electronic device.

For clarity and brevity of description of the following embodiments and for ease of understanding by a person skilled in the art, related concepts or technologies are briefly described first.

A photographing preview interface is an interface displayed by an electronic device during photographing, and may be used to display an image collected by a camera and a plurality of controls. The plurality of controls may include a camera flash control configured to enable/disable a camera flash, a beauty control configured to enable/disable a beauty function, a shutter control that can be configured to enable/disable photographing, and the like.

Single-lens shooting refers to a mode in which an electronic device performs photographing by using only one camera. The single-lens shooting may include a front photographing mode, a rear photographing mode, and the like.

Specifically, the front photographing mode is a mode in which the electronic device performs photographing by using a front-facing camera. When the electronic device is in the front photographing mode, an image collected by the front-facing camera may be displayed in real time on a photographing preview interface.

The rear photographing mode is a mode in which the electronic device performs photographing by using a rear-facing camera. When the electronic device is in the rear photographing mode, an image collected by the rear-facing camera may be displayed in real time on a photographing preview interface.

Multi-lens shooting refers to a mode in which an electronic device may perform photographing by using two or more cameras. The multi-lens shooting may include a front/rear photographing mode, a front/front photographing mode, a rear/rear photographing mode, a picture-in-picture photographing mode, and the like.

The front/rear photographing mode is a mode in which the electronic device can perform photographing simultaneously by using a front-facing camera and a rear-facing camera. When the electronic device is in the front/rear photographing mode, the electronic device may simultaneously display, on a photographing preview interface, images (for example, a first image and a second image) shot by the front-facing camera and the rear-facing camera. The first image and the second image are spliced and displayed. When the electronic device is vertically placed, the first image and the second image may be spliced up and down. When the electronic device is horizontally placed, the first image and the second image may be spliced left and right. By default, a display area of the first image is the same as a display area of the second image.

The front/front photographing mode is similar to the front/rear photographing mode, and a difference lies in that in the front/front photographing mode, photographing is performed simultaneously by using two front-facing cameras.

The rear/rear photographing mode is a mode in which the electronic device can perform photographing simultaneously by using two rear-facing cameras. When the electronic device is in the rear/rear photographing mode, the electronic device may simultaneously display, on a photographing preview interface, images (for example, a first image and a second image) shot by the two rear-facing cameras. The first image and the second image are spliced and displayed. When the electronic device is vertically placed, the first image and the second image may be spliced up and down. When the electronic device is horizontally placed, the first image and the second image may be spliced left and right.

The picture-in-picture photographing mode is a mode in which the electronic device can perform photographing simultaneously by using two cameras. When the electronic device is in the picture-in-picture photographing mode, the electronic device may simultaneously display, on a photographing preview interface, images (for example, a first image and a second image) shot by the two cameras. The second image is displayed in the entire display region of the photographing preview interface, the first image is superimposed on the second image, and a display area of the first image is smaller than a display area of the second image. By default, the first image may be located at the lower left of the second image. The foregoing two cameras may include two front-facing cameras, two rear-facing cameras, or one front-facing camera and one rear-facing camera.

A split-screen display mode (spliced display) means that a display of an electronic device can display images (for example, a first image and a second image) shot by two cameras, and the first image and the second image are spliced and displayed on the display.

A picture-in-picture display mode means that a display of an electronic device can display images (for example, a first image and a second image) shot by two cameras. The second image is displayed in the entire display region of the display, the first image is displayed in a small window, and a display area of the small window is smaller than a display area of the display, that is, the first image is superimposed on the second image, and a display area of the first image is smaller than a display area of the second image.

A full-screen mode means that a display of an electronic device can display, in full screen, an image shot by any camera, and a display area of the image is a display area of the display.

A user operation is an operation performed when a user switches a displayed picture, for example, may be switching the displayed picture by touching a switching button on a display, or may refer to switching the displayed picture by using an air gesture. A direction corresponding to the user operation may be a direction indicated by the switching button on the display, or may be a moving direction of the gesture when the user makes the air gesture. For example, when the air gesture is "move a palm from left to right", the direction corresponding to the user operation is from left to right. For another example, if a direction or representation of the switching button is to switch "from left to right", after the button is tapped, the direction corresponding to the user operation is also from left to right.

A first camera may be a front-facing camera or a rear-facing camera. The first camera in embodiments of this application usually is the front-facing camera.

A second camera may be a front-facing camera or a rear-facing camera. The first camera in embodiments of this application usually is the rear-facing camera.

A first image is an image shot by a front-facing camera. A second image is an image shot by a rear-facing camera.

A third image in embodiments of this application usually is an image obtained after blur processing, transparency processing, cropping, or zooming-in is performed on an image shot by a front-facing camera, or is a preset picture (including a first preset picture and a second preset picture). A fourth image in embodiments of this application usually is an image obtained after blur processing, transparency processing, cropping, or zooming-in is performed on an image shot by a rear-facing camera.

It should be noted that the foregoing "single-lens shooting", "multi-lens shooting", "front photographing mode", "rear photographing mode", "front/rear photographing mode", "front/front photographing mode", "rear/rear photographing mode", and "picture-in-picture photographing mode" are merely some names used in embodiments of this application, meanings represented by the foregoing "single-lens shooting", "multi-lens shooting", "front photographing mode", "rear photographing mode", "front/rear photographing mode", "front/front photographing mode", "rear/rear photographing mode", and "picture-in-picture photographing mode" are already recorded in embodiments of this application, and the names thereof do not constitute any limitation on embodiments.

Currently, the electronic device can provide a plurality of photographing modes for the user, and can switch between the plurality of photographing modes. For example, the front photographing mode is switched to the rear photographing mode; the rear photographing mode is switched to the front photographing mode; the front photographing mode/the rear photographing mode is switched to the front/rear photographing mode; or the front/rear photographing mode is switched to any one of the front photographing mode, the rear photographing mode, the rear/rear photographing mode, or the picture-in-picture photographing mode.

In different photographing modes, the electronic device uses different cameras, and the different cameras collect different pictures. Therefore, when the electronic device switches the photographing mode, a camera (referred to as a preview camera) used by the electronic device also changes, and a displayed picture on the photographing preview interface also changes accordingly. However, it takes some time for the electronic device to start a different camera. It also takes some time for a picture shot by the different camera to be displayed in a different mode on the photographing preview interface.

Therefore, when switching between the different photographing modes is performed, picture data collected by the different cameras of the electronic device is displayed on the photographing preview interface with a specific delay. When the user performs switching between the different photographing modes, if picture data collected by cameras corresponding to various modes is directly displayed, when mode switching is performed, picture switching on the photographing preview interface appears rigid, and even a "frame freezing" visual effect appears, affecting user experience.

To resolve the foregoing problem, an embodiment of this application provides a video shooting method. The video shooting method can support an electronic device in performing animation processing during switching for a displayed picture on a photographing preview interface when performing photographing mode switching, so that the displayed picture on the photographing preview interface looks more fluent and vivid during switching, improving user experience.

The video shooting method provided in this embodiment of this application may be applied to an electronic device including a plurality of cameras. The electronic device may recognize a user operation (an air gesture) of a user by using any one of front-facing cameras. The user operation (the air gesture) used to switch a photographing mode is not limited in this embodiment of this application. The foregoing air gesture is merely a name used in this embodiment of this application, and may also be referred to as a suspension gesture, a floating gesture, or the like. Specifically, the air gesture is a gesture for inputting without touching an electronic device. A meaning represented by the air gesture is already recorded in this embodiment of this application, and the name of the air gesture does not constitute any limitation on this embodiment.

To more clearly describe the video shooting method provided in embodiments of this application in more detail, the following first describes an electronic device for implementing the method provided in embodiments of this application.

The electronic device may be a mobile phone, a tablet computer, a desktop computer, a laptop computer, a handheld computer, a notebook computer, an ultra-mobile personal computer (ultra-mobile personal computer, UMPC), a netbook, a cellular phone, a personal digital assistant (personal digital assistant, PDA), an augmented reality (augmented reality, AR) device, a virtual reality (virtual reality, VR) device, an artificial intelligence (artificial intelligence, AI) device, a wearable device, an in-vehicle device, a smart household device, and/or a smart city device. A specific type of the electronic device is not specifically limited in embodiments of this application.

FIG. 1A is a schematic diagram of a hardware structure of an electronic device according to an embodiment of this application.

As shown in FIG. 1A, the electronic device 200 may include a processor 210, an external memory interface 220, an internal memory 221, a universal serial bus (universal serial bus, USB) interface 230, a charging management module 240, a power management module 241, a battery 242, an antenna 1, an antenna 2, a mobile communication module 250, a wireless communication module 260, an audio module 270, a speaker 270A, a receiver 270B, a microphone 270C, a headset jack 270D, a sensor module 280, a key 290, a motor 291, an indicator 292, a plurality of cameras 293, a display 294, a subscriber identification module (subscriber identification module, SIM) card interface 295, and the like.

The sensor module 280 may include sensors such as a pressure sensor, a gyroscope sensor, a barometric pressure sensor, a magnetic sensor, an acceleration sensor, a distance sensor, an optical proximity sensor, a fingerprint sensor, a temperature sensor, a touch sensor, an ambient light sensor, and a bone conduction sensor.

It may be understood that a structure illustrated in this embodiment does not constitute a specific limitation on the electronic device 200. In some other embodiments, the electronic device 200 may include more or fewer components than those shown in the figure, or may combine some components, or may split some components, or may have different component arrangements. The components in the figure may be implemented by hardware, software, or a combination of software and hardware.

The processor 210 may include one or more processing units. For example, the processor 210 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent devices, or may be integrated in one or more processors.

The controller may be a nerve center and a command center of the electronic device 200. The controller may generate an operation control signal based on instruction operation code and a timing signal, to complete control of instruction fetching and instruction execution.

The memory may be further disposed in the processor 210 to store instructions and data. In some embodiments, the memory in the processor 210 is a cache memory. The memory may store an instruction or data that is just used or cyclically used by the processor 210. If the processor 210 needs to reuse the instruction or the data, the instruction or the data may be directly invoked from the memory. Repeated access is avoided, and a waiting time of the processor 210 is reduced, so that system efficiency is improved.

In some embodiments, the processor 210 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like. It may be understood that the interface connection relationship between the modules shown in this embodiment is merely an example for description, and does not constitute a limitation on the structure of the electronic device 200. In some other embodiments, the electronic device 200 may alternatively use an interface connection mode that is different from those in the foregoing embodiments, or use a combination of a plurality of interface connection modes.

In this embodiment of this application, the processor 210 may receive a plurality of consecutive images corresponding to a user-input specific air gesture such as a "palm" that are shot by the camera 293. Then, the processor 210 may perform comparative analysis on the plurality of consecutive images to determine that an air gesture corresponding to the plurality of consecutive images is the "palm", and determine that an operation corresponding to the air gesture is, for example, starting or stopping recording. Then, the processor 210 may control a camera application to perform the corresponding operation. For example, the corresponding operation may include: triggering a plurality of cameras to simultaneously collect images, then performing composition, by using the GPU through splicing, picture-in-picture (local superimposition), or the like, on the images respectively collected by the plurality of cameras, and invoking the display 294 to display a composite image on a photographing preview interface of the electronic device.

The external memory interface 220 may be configured to connect to an external storage card such as a Micro SD card, to extend a storage capability of the electronic device 200. The external storage card communicates with the processor 210 by using the external memory interface 220 to implement a data storage function. For example, files such as music and videos are stored in the external storage card.

The internal memory 221 may be configured to store computer executable program code, and the executable program code includes instructions. The processor 210 executes various functional applications and data processing of the electronic device 200 by running the instructions stored in the internal memory 221. For example, in this embodiment of this application, the processor 210 can execute the instructions stored in the internal memory 221. The internal memory 221 may include a program storage area and a data storage area. The program storage area may store an operating system, an application required by at least one function (for example, a sound playing function or an image playing function), and the like. The data storage area may store data (for example, audio data and a phone book) created during use of the electronic device 200. In addition, the internal memory 221 may include a high-speed random access memory, and may further include a non-volatile memory, for example, at least one magnetic disk storage device, a flash memory device, or a universal flash storage (universal flash storage, UFS).

In this embodiment of this application, the internal memory 221 may store a picture file photographed by or a video file recorded by the electronic device in different photographing modes, or the like.

The charging management module 240 is configured to receive a charging input from a charger. The charger may be a wireless charger, or may be a wired charger. While charging the battery 242, the charging management module 240 may further supply power to a terminal device by using the power management module 241.

The power management module 241 is configured to connect the battery 242, the charging management module 240, and the processor 210. The power management module 241 receives an input of the battery 242 and/or the charging management module 240, and supplies power to the processor 210, the internal memory 221, an external memory, the display 294, the camera 293, the wireless communication module 260, and the like. In some embodiments, the power management module 241 and the charging management module 240 may alternatively be disposed in a same device.

A wireless communication function of the electronic device 200 may be implemented by using the antenna 1, the antenna 2, the mobile communication module 250, the wireless communication module 260, the modem processor, the baseband processor, and the like. In some embodiments, the antenna 1 of the electronic device 200 is coupled to the mobile communication module 250, and the antenna 2 is coupled to the wireless communication module 260, so that the electronic device 200 can communicate with a network and another device by using a wireless communication technology.

The antenna 1 and the antenna 2 are configured to transmit and receive electromagnetic wave signals. Each antenna in the electronic device 200 may be configured to cover one or more communication bands. Different antennas may be further multiplexed to improve antenna utilization. For example, the antenna 1 may be multiplexed into a diversity antenna of a wireless local area network. In some other embodiments, the antenna may be used together with a tuning switch.

The mobile communication module 250 may provide a wireless communication solution including 2G/3G/4G/5G and the like applied to the electronic device 200. The mobile communication module 250 may include at least one filter, a switch, a power amplifier, a low noise amplifier (low noise amplifier, LNA), and the like. The mobile communication module 250 may receive an electromagnetic wave by using the antenna 1, perform processing such as filtering and amplification on the received electromagnetic wave, and send the electromagnetic wave to the modem processor for demodulation.

The mobile communication module 250 may further amplify a signal modulated by the modem processor, and convert the signal into an electromagnetic wave by using the antenna 1 for radiation. In some embodiments, at least some functional modules of the mobile communication module 250 may be disposed in the processor 210. In some embodiments, at least some functional modules of the mobile communication module 250 and at least some modules of the processor 210 may be disposed in a same device.

The wireless communication module 260 may provide a wireless communication solution that is applied to the electronic device 200, including a WLAN (for example, a (wireless fidelity, Wi-Fi) network), Bluetooth (bluetooth, BT), a global navigation satellite system (global navigation satellite system, GNSS), frequency modulation (frequency modulation, FM), near field communication (near field communication, NFC), an infrared (infrared, IR) technology, and the like.

The wireless communication module 260 may be one or more devices into which at least one communication processing module is integrated. The wireless communication module 260 receives an electromagnetic wave by using the antenna 2, performs frequency modulation and filtering processing on an electromagnetic wave signal, and sends a processed signal to the processor 210. The wireless communication module 260 may further receive a to-be-sent signal from the processor 210, perform frequency modulation and amplification on the signal, and convert the signal into an electromagnetic wave by using the antenna 2 for radiation.

The electronic device 200 implements a display function through the GPU, the display 294, the application processor, and the like. The GPU is a microprocessor for image processing, and connects the display 294 and the application processor. The GPU is configured to perform mathematical and geometric calculations, and is configured to render graphics. The processor 210 may include one or more GPUs, which execute program instructions to generate or change display information.

The display 294 is configured to display an image, a video, and the like. The display 294 includes a display panel.

The electronic device 200 may implement a photographing function by using the ISP, the camera 293, the video codec, the GPU, the display 294, the application processor, and the like. The ISP is configured to process data fed back by the camera 293. The camera 293 is configured to capture a static image or a video. In some embodiments, the electronic device 200 may include N cameras 293, where N is a positive integer greater than 2.

The electronic device 200 may implement audio functions (for example, music playing and sound recording) by using the audio module 270, the speaker 270A, the receiver 270B, the microphone 270C, the headset jack 270D, the application processor, and the like.

The key 290 includes a power-on key, a volume key, or the like. The key 290 may be a mechanical key, or may be a touch key. The motor 291 may generate a vibration alert. The motor 291 may be configured to provide a vibration alert for an incoming call, or may be configured to provide a touch vibration feedback. The indicator 292 may be an indicator light, and may be configured to indicate a charging state and a power change, or to indicate a message, a missed incoming call, a notification, or the like.

The plurality of cameras 293 are configured to collect images. In this embodiment of this application, a quantity of the cameras 193 may be M, where M≥2 and M is a positive integer. A quantity of cameras enabled by the electronic device in multi-lens shooting may be N, where 2≤N≤M and N is a positive integer.

In this embodiment of this application, a type of the camera 293 may be distinguished based on a hardware configuration and a physical location. For example, the plurality of cameras included in the cameras 293 may be separately disposed on front and rear sides of the electronic device. A camera disposed on a side of the display 294 of the electronic device may be referred to as a front-facing camera, and a camera disposed on a side of a rear cover of the electronic device may be referred to as a rear-facing camera. For another example, the cameras 293 include a plurality of cameras with different focal lengths and different viewing angles. A camera with a short focal length and a larger viewing angle may be referred to as a wide-angle camera, and a camera with a long focal length and a small viewing angle may be referred to as a common camera. Content of images collected by different cameras differs in that: The front-facing camera is configured to collect a scene on a front side of the electronic device, and the rear-facing camera is configured to collect a scene on a rear side of the electronic device. The wide-angle camera can shoot a large area of a scene within a short photographing distance range. A scene shot by the wide-angle camera at a same photographing distance is smaller than an image of the scene in a picture shot by using a common lens. A value of the focal length and a size of the viewing angle are relative concepts, and are not limited by specific parameters. Therefore, the wide-angle camera and the common camera are also relative concepts, and may be specifically distinguished based on physical parameters such as the focal length and the viewing angle.

In particular, in this embodiment of this application, the cameras 293 include at least one camera that can obtain 3D data of an object in a shot image, so that the processor 210 can identify, based on the 3D data of the object, an operation instruction corresponding to an air gesture of the user.

The camera configured to obtain the 3D data of the object may be an independent low-power camera, or may be another common front-facing or rear-facing camera, and the common front-facing or rear-facing camera supports a low-power mode. When the low-power camera works, or the common front-facing or rear-facing camera works in the low-power mode, a frame rate of the camera is lower than a frame rate of the common camera that works in a non-low-power mode, and an output image is in a black and white format. Usually, a common camera may output 30 frames of images, 60 frames of images, 90 frames of images, and 240 frames of images in 1 second. However, for the low-power camera, or when the common front-facing or rear-facing camera runs in the low-power mode, the camera may output, for example, 2.5 frames of images in 1 second. When the camera shoots a first image indicating a same air gesture, the camera may switch to output 10 frames of images in 1 second, to accurately identify the operation instruction corresponding to the air gesture by identifying a plurality of consecutive images. In addition, pixels of the images collected by the low-power camera are lower than pixels of the images collected by the common camera. In addition, in comparison with the common camera, working of the low-power camera in the low-power mode reduces power consumption.

Aspect ratios of the cameras 293 may be different or the same. An aspect ratio of a camera is a ratio of a length to a width of an image collected by the camera. Both the length and the width of the image may be measured in pixels. The aspect ratio of the camera may also be referred to as an output image size, an image dimension, an image size, a pixel size, or image resolution. Common aspect ratios of a camera may include: 4:3, 16:9, 3:2, or the like. The aspect ratio is a rough pixel quantity ratio of a length to a width of an image collected by a camera. In this embodiment of this application, when the electronic device is in a multi-lens shooting mode, and images respectively collected by a plurality of cameras are displayed in a form of left-right splicing or up-down splicing, sizes of images that are shot by different cameras and that are displayed in a preview frame may be the same. When the images respectively collected by the plurality of cameras are displayed in a picture-in-picture mode, the sizes of the images that are shot by the different cameras and that are displayed in the preview frame may be different. Specifically, a size of an image shot by the front-facing camera is smaller than a size of that shot by the rear-facing camera. For details, refer to related descriptions in the later UI embodiment. Details are not described herein.

In some embodiments, the camera 293 may be configured to collect depth data. For example, the camera 293 may have a time of flight (time of flight, TOF) 3D sensing module or a structured light (structured light) 3D sensing module for obtaining depth information. A camera used for collecting the depth data may be a front-facing camera or a rear-facing camera.

The ISP is configured to process data fed back by the camera 293. For example, during photographing, a shutter is pressed, light is transmitted to a camera photosensitive element through a lens, an optical signal is converted into an electrical signal, and the camera photosensitive element transfers the electrical signal to the ISP for processing, so that the electrical signal is converted into an image visible to a naked eye. The ISP can further optimize algorithms for noise, brightness, and a skin color of the image. The ISP can further optimize parameters such as exposure and a color temperature in a photographing scenario. In some embodiments, the ISP may be disposed in the camera 293.

The digital signal processor is configured to process digital signals, including not only digital image signals but also other digital signals. For example, when the electronic device selects a frequency, the digital signal processor is configured to perform Fourier transform or the like on energy of the frequency.

The video codec is configured to compress or decompress a digital video. The electronic device can support one or more video codecs. Therefore, the electronic device may play or record videos in a plurality of encoding formats, such as moving picture experts group (moving picture experts group, MPEG)1, MPEG2, MPEG3, and MPEG4.

The NPU is a neural-network (neural-network, NN) computing processor. By referring to a structure of a biological neural network, for example, by referring to a transfer mode between human brain neurons, the NPU quickly processes input information, and can further perform continuous self-learning. Applications such as intelligent cognition of the electronic device may be implemented by the NPU, for example, image recognition, face recognition, speech recognition, and text understanding.

The electronic device implements a display function by using the GPU, the display 294, the application processor, and the like. The GPU is a microprocessor for image processing, and connects the display 294 and the application processor. The GPU is configured to perform mathematical and geometric calculations, and is configured to render graphics. The processor 210 may include one or more GPUs, which execute program instructions to generate or change display information.

The display 294 is configured to display an image, a video, and the like. The display 294 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flex light-emitting diode (flex light-emitting diode, FLED), a Miniled, a MicroLed, a Micro-oLed, quantum dot light emitting diodes (quantum dot light emitting diodes, QLED), and the like. In some embodiments, the electronic device may include 1 or N displays 294, where N is a positive integer greater than 1.

In this embodiment of this application, the display 294 may be configured to display an image shot by any one camera 293, for example, display, in the preview frame, a plurality of frames of images shot by one camera, or display, in a saved video file, a plurality of frames of images from one camera 293, or display, in a saved picture file, one photo from one camera 293.

When the electronic device displays, in the camera preview frame, the plurality of frames of images shot by one camera, and receives a specific air gesture such as a "palm" input by the user, the display 294 may be configured to display, in the preview frame, a plurality of frames of images shot by the plurality of cameras. After the electronic device saves a video file or a picture file photographed by the plurality of cameras, the display may display, in the saved video file, the plurality of frames of images from the plurality of cameras 293, or display, in the saved picture file, one photo obtained through composition of a plurality of photos from the plurality of cameras 293.

In some embodiments, in the multi-lens shooting mode, the display 294 may display a plurality of images from the plurality of cameras 293 in manners such as splicing or picture-in-picture, so that the plurality of images from the plurality of cameras 293 can be simultaneously presented to the user.

In some embodiments, in the multi-lens shooting mode, the processor 210 (for example, the controller or the GPU) may perform composition on the plurality of frames of images from the plurality of cameras 293. For example, a plurality of video streams from the plurality of cameras 293 are combined into one video stream, and a video encoder in the processor 210 may encode combined video stream data to generate a video file. In this way, each frame of image in the video file may include the plurality of images from the plurality of cameras 293. When a specific frame of image of the video file is played, the display 294 may display the plurality of images from the plurality of cameras 293, to present, to the user, a plurality of pictures of different ranges or different definitions or with different detail information at a same moment or scene.

In some embodiments, in the multi-lens shooting mode, the processor 210 may associate image frames from different cameras 293 with each other, so that when a shot picture or video is played, the display 294 can simultaneously display associated image frames in a viewfinder frame. In this case, videos simultaneously recorded by the different cameras 293 may be respectively stored as different videos, and pictures simultaneously recorded by the different cameras 293 may be respectively stored as different pictures.

In some embodiments, in a multiple-channel video recording mode, the plurality of cameras 293 may respectively collect images at a same frame rate, that is, quantities of image frames collected by the plurality of cameras 293 at a same time are the same. The videos from the different cameras 293 may be respectively stored as different video files, and the different video files are associated with each other. Image frames in the video file are stored based on a sequence in which the image frames are collected, and the different video files each include a same quantity of image frames. When a recorded video is played, the display 294 may display image frames based on a preset layout or a layout indicated by the user in a sequence of image frames included in associated video files, to display, on a same interface, a plurality of frames of images corresponding to a same sequence in different video files.

In some embodiments, in a multiple-channel video recording mode, the plurality of cameras 293 may respectively collect images at a same frame rate, that is, quantities of image frames collected by the plurality of cameras 293 at a same time are the same. The processor 210 may add a timestamp to each frame of image from the different cameras 293, so that when a recorded video is played, the display 294 may simultaneously display the plurality of frames of images from the plurality of cameras 293 on a same interface based on timestamps.

In some embodiments, in a multi-lens shooting scenario, the display 294 may simultaneously display different images from the plurality of cameras 293 in manners such as left-right splicing, up-down splicing, or picture-in-picture, so that the different images from the plurality of cameras 293 can be simultaneously presented to the user. For details, refer to related descriptions in the later UI embodiment. Details are not described herein.

In some embodiments, in the multi-lens shooting mode, the processor 210, for example, the controller or the GPU, may perform composition on the different images from the plurality of cameras 293. For example, a plurality of video streams from the plurality of cameras 293 are combined into one video stream, and a video encoder in the processor 210 may encode combined video stream data to generate a video file. In this way, each frame of image in the video file may include the plurality of images from the plurality of cameras 293. When a specific frame of image of the video file is played, the display 294 may display the plurality of images from the plurality of cameras 293, to present, to the user, a plurality of pictures with different content, different depths of field, or different pixels at a same moment or scene. For another example, a plurality of photos from the plurality of cameras 293 are combined into one photo, and the video encoder in the processor 210 may encode combined photo data, to generate a picture file. In this way, one photo in the picture file may include a plurality of photos from the plurality of cameras 293. When the photo is viewed, the display 294 may display the plurality of photos from the plurality of cameras 293, to present, to the user, a plurality of pictures with different content, different depths of field, or different pixels at a same moment or scene.

In some embodiments, in the multi-lens shooting mode, the processor 210 may associate image frames from different cameras 293 with each other, so that when a shot picture or video is played, the display 294 can simultaneously display associated image frames in the preview frame. In this case, videos simultaneously recorded by the different cameras 293 may be respectively stored as different video files, and photos simultaneously shot by the different cameras 293 may be respectively stored as different picture files.

In some embodiments, in a multi-lens video recording mode, the plurality of cameras 293 may respectively collect images at a same frame rate, that is, quantities of image frames collected by the plurality of cameras 293 at a same time are the same. The videos from the different cameras 293 may be respectively stored as the different video files, and the different video files are associated with each other. Image frames in the video file are stored based on a sequence in which the image frames are collected, and the different video files each include a same quantity of image frames. When a recorded video is played, the display 294 may display image frames based on a preset layout or a layout indicated by the user in a sequence of image frames included in associated video files, to display, on a same interface, a plurality of frames of images corresponding to a same sequence in the different video files.

In some embodiments, in a multi-lens video recording mode, the plurality of cameras 293 may respectively collect images at a same frame rate, that is, quantities of image frames collected by the plurality of cameras 293 at a same time are the same. The processor 210 may add a timestamp to each frame of image from the different cameras 293, so that when a recorded video is played, the display 294 may simultaneously display the plurality of frames of images from the plurality of cameras 293 on a same interface based on timestamps.

For convenience of use, the electronic device usually performs shooting in a handheld mode of the user, and in the handheld mode of the user, a picture obtained by shooting usually shakes. In some embodiments, in the multi-lens shooting mode, the processor 210 may separately perform image stabilization processing on the image frames collected by the different cameras 293. Then, the display 294 displays an image obtained after image stabilization processing.

The SIM card interface 295 is configured to connect to a SIM card. The SIM card may be inserted into the SIM card interface 295 or pulled out of the SIM card interface 295, so that the SIM card is in contact with or separated from the electronic device. The electronic device can support 1 or N SIM card interfaces, where N is a positive integer greater than 1. The SIM card interface 295 can support a Nano SIM card, a Micro SIM card, a SIM card, and the like. A plurality of cards can be simultaneously inserted into a same SIM card interface 295. Types of the plurality of cards may be the same or different. The SIM card interface 295 is compatible with different types of SIM cards. The SIM card interface 295 is also compatible with an external storage card. The electronic device interacts with a network by using a SIM card, to implement functions such as a call and data communication. In some embodiments, the electronic device uses an eSIM, that is, an embedded SIM card. The eSIM card may be embedded in the electronic device and cannot be separated from the electronic device.

The display 294 is configured to display an image, a video, and the like. In some embodiments, the electronic device may include 1 or N displays 294, where N is a positive integer greater than 1. In this embodiment of this application, the display 294 may be configured to display an image shot by any one or more cameras 293, for example, display, on the photographing preview interface, a plurality of frames of images shot by one camera, or display, in a saved video file, a plurality of frames of images from one camera 293, or display, in a saved picture file, one photo from one camera 293.

The SIM card interface 295 is configured to connect to a SIM card. The SIM card may be inserted into the SIM card interface 295 or pulled out of the SIM card interface 295, so that the SIM card is in contact with or separated from the electronic device 200. The electronic device 200 can support 1 or N SIM card interfaces, where N is a positive integer greater than 1. The SIM card interface 295 can support a Nano SIM card, a Micro SIM card, a SIM card, and the like.

Figure 1B:
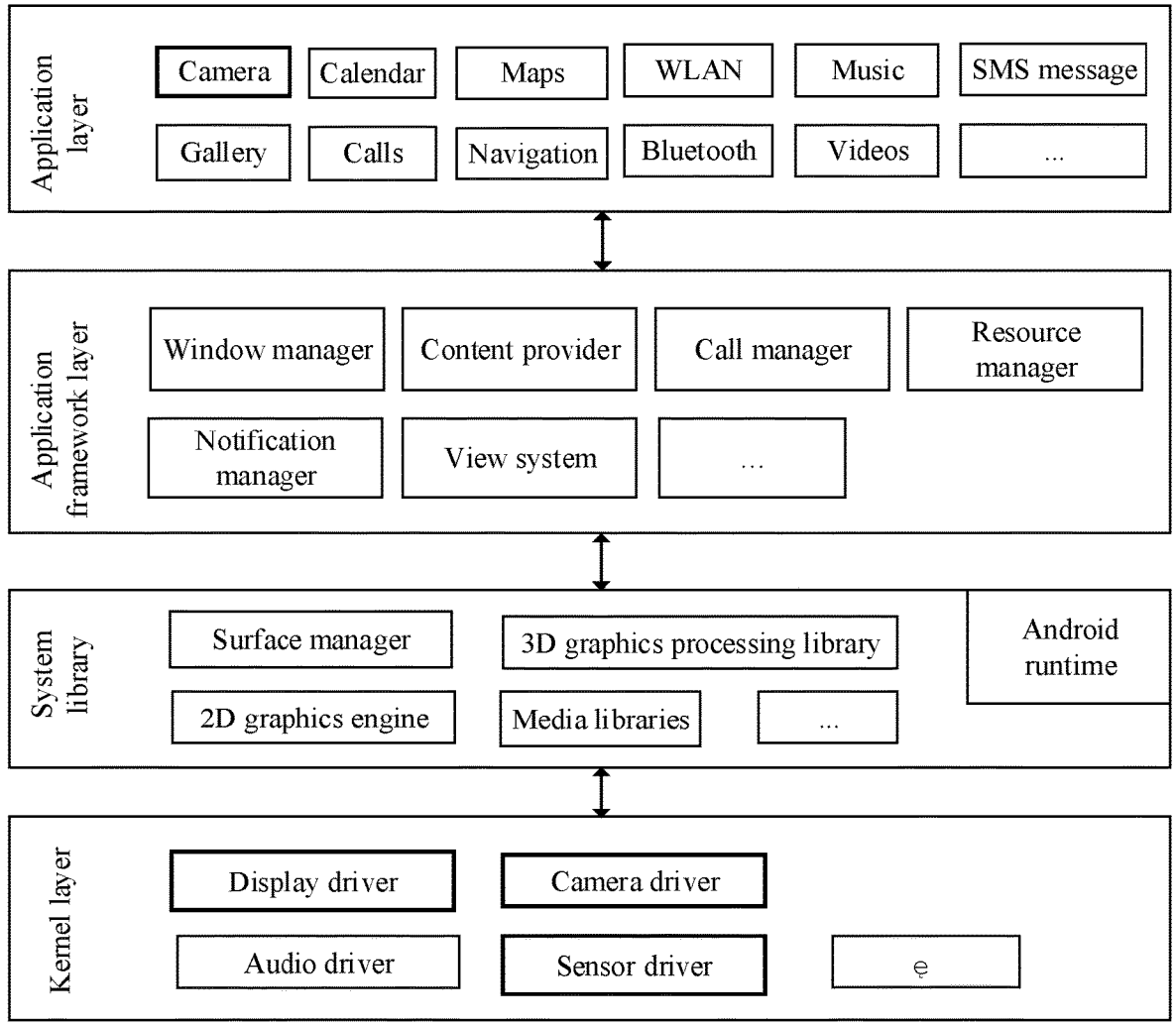
FIG. 1B is a diagram of a software architecture of an electronic device according to an embodiment of this application.

FIG. 1B is a block diagram of a software structure of an electronic device according to an embodiment of the present invention.

A layered architecture divides software into several layers, and each layer has a clear role and task. The layers communicate with each other by using a software interface. In some embodiments, an Android system is divided into four layers: an application layer, an application framework layer, an Android runtime (Android runtime) and system library, and a kernel layer from top to down.

The application layer may include a series of application packages.

As shown in FIG. 1B, the application packages may include applications such as camera, gallery, calendar, call, map, navigation, WLAN, Bluetooth, music, video, and short message service.

The application framework layer provides an application programming interface (application programming interface, API) and a programming framework for an application at the application layer. The application framework layer includes some predefined functions.

As shown in FIG. 1B, the application framework layer may include a window manager, a content provider, a view system, a phone manager, a resource manager, a notification manager, and the like.

The window manager is configured to manage a window program. The window manager may obtain a display size, determine whether there is a status bar, lock a screen, take a screenshot, and the like.

The content provider is configured to store and obtain data, and enable the data to be accessible to an application. The data may include videos, images, audios, calls made and received, browsing histories and bookmarks, phone books, and the like.

The view system includes visual controls, such as a control for displaying a text and a control for displaying a picture. The view system may be used to build an application. A display interface may include one or more views. For example, a display interface including an SMS notification icon may include a view for displaying a text and a view for displaying a picture.

The phone manager is configured to provide a communication function of an electronic device, for example, call status management (including answering, declining, or the like).

The resource manager provides various resources for an application, such as a localized string, an icon, a picture, a layout file, and a video file.

The notification manager enables an application to display notification information in the status bar, which can be used to convey a notification-type message, and can automatically disappear after a short stay without user interaction. For example, the notification manager is configured to notify that downloading is completed, or prompt a message. The notification manager may alternatively be a notification that appears in a status bar at the top of a system in a form of a chart or a scroll bar text, for example, a notification for an application running in the background, or a notification that appears on a screen in a form of a dialog window. For example, text information is prompted in the status bar, a prompt tone is produced, the electronic device vibrates, or an indicator light blinks.

The Android Runtime includes a core library and a virtual machine. The Android runtime is responsible for scheduling and management of an Android system.

The core library includes two parts: One part is a functional function that needs to be called in java language, and the other part is a core library of Android.

The application layer and the application framework layer run on the virtual machine. The virtual machine converts a java file at the application layer and the application framework layer into a binary file for execution. The virtual machine is configured to perform functions such as object lifecycle management, stack management, thread management, security and exception management, and garbage collection.

The system library may include a plurality of functional modules such as a surface manager (surface manager), media libraries (Media Libraries), a 3D graphics processing library (for example, an OpenGL ES), and a 2D graphics engine (for example, an SGL).

The surface manager is configured to manage a display subsystem, and provide 2D and 3D layer fusion for a plurality of applications.

The media library supports playback and recording in a plurality of common audio and video formats, and also supports static image files, and the like. The media libraries can support a plurality of audio and video encoding formats, such as MPEG4, H.264, MP3, AAC, AMR, JPG, and PNG.

The 3D graphics processing library is configured to implement 3D graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

The following describes examples of working procedures of software and hardware of the electronic device with reference to a capture or photographing scenario.

When a touch sensor receives a touch operation, a corresponding hardware interrupt is sent to the kernel layer. The kernel layer processes the touch operation into an original input event (including information such as touch coordinates and a timestamp of the touch operation). The original input event is stored in the kernel layer. The application framework layer obtains the original input event from the kernel layer, and identifies a control corresponding to the input event. For example, the touch operation is a touch single-tap operation, and a control corresponding to the single-tap operation is a control of a camera application icon. A camera application invokes an interface of the application framework layer to start the camera application, then starts the camera driver by invoking the kernel layer, and captures a static image or a video by using the camera 293. In this embodiment of this application, the touch operation received by the touch sensor may be replaced with an operation of a user-input air gesture (a user operation) collected by the camera 293. Specifically, when the camera 293 collects the air gesture operation, the corresponding hardware interrupt is sent to the kernel layer. The kernel layer processes the air gesture operation into an original input event (including information such as an image of the air gesture and a timestamp of the air gesture operation). The original input event is stored in the kernel layer. The application framework layer obtains the original input event from the kernel layer, and identifies an operation corresponding to the input event. For example, the air gesture operation is an operation of switching a photographing mode. The camera application invokes an interface of the application framework layer, and then starts another camera driver by invoking the kernel layer, to switch to another camera 293 to capture a static image or a video.

The following describes, with reference to the accompanying drawings, switching of some photographing modes to which the video shooting method provided in this application is applied.

Figure 2A:
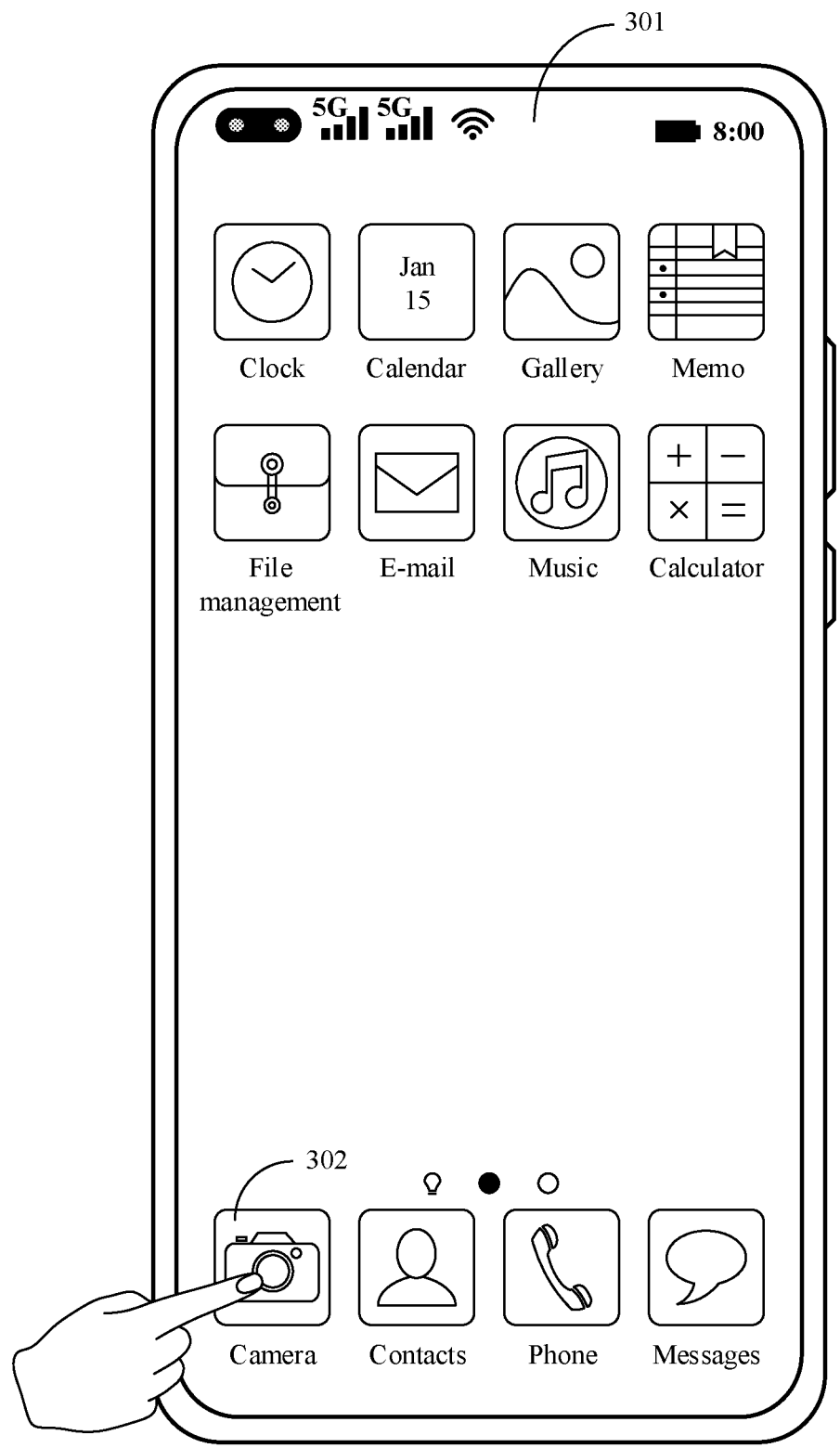
FIG. 2A-FIG. 2C are schematic diagrams of a group of user interfaces according to an embodiment of this application.

As shown in FIG. 2A, the mobile phone may display a main interface 301. The main interface 301 may include an icon 302 of the camera application. The mobile phone may receive an operation of tapping the icon 302 by the user. In response to the operation, the mobile phone may enable the camera application and display a photographing preview interface 303 of the camera application. It may be understood that the camera application is an image shooting application on an electronic device such as a smartphone or a tablet computer, and may be a system application or a third-party application. A name of the application is not limited in this application. That is, the user may tap the icon 302 of the camera application to open the photographing preview interface 303 of the camera application. This is not limited. The user may alternatively invoke a camera application in another application to open the photographing preview interface 303. For example, the user taps a photographing control in a social application to open the photographing preview interface 303. The social application can support the user in sharing a shot picture, video, or the like with another person.

It should be noted that the photographing preview interface 303 may be a user interface in a default photographing mode of the camera application, for example, may be a user interface provided when the camera application is in a front photographing mode. It may be understood that the default photographing mode may alternatively be another photographing mode, for example, a rear photographing mode or a front/rear photographing mode. Alternatively, the photographing preview interface 303 may be a user interface of a photographing mode of the camera application when the camera application exits last time.

Figure 2B:
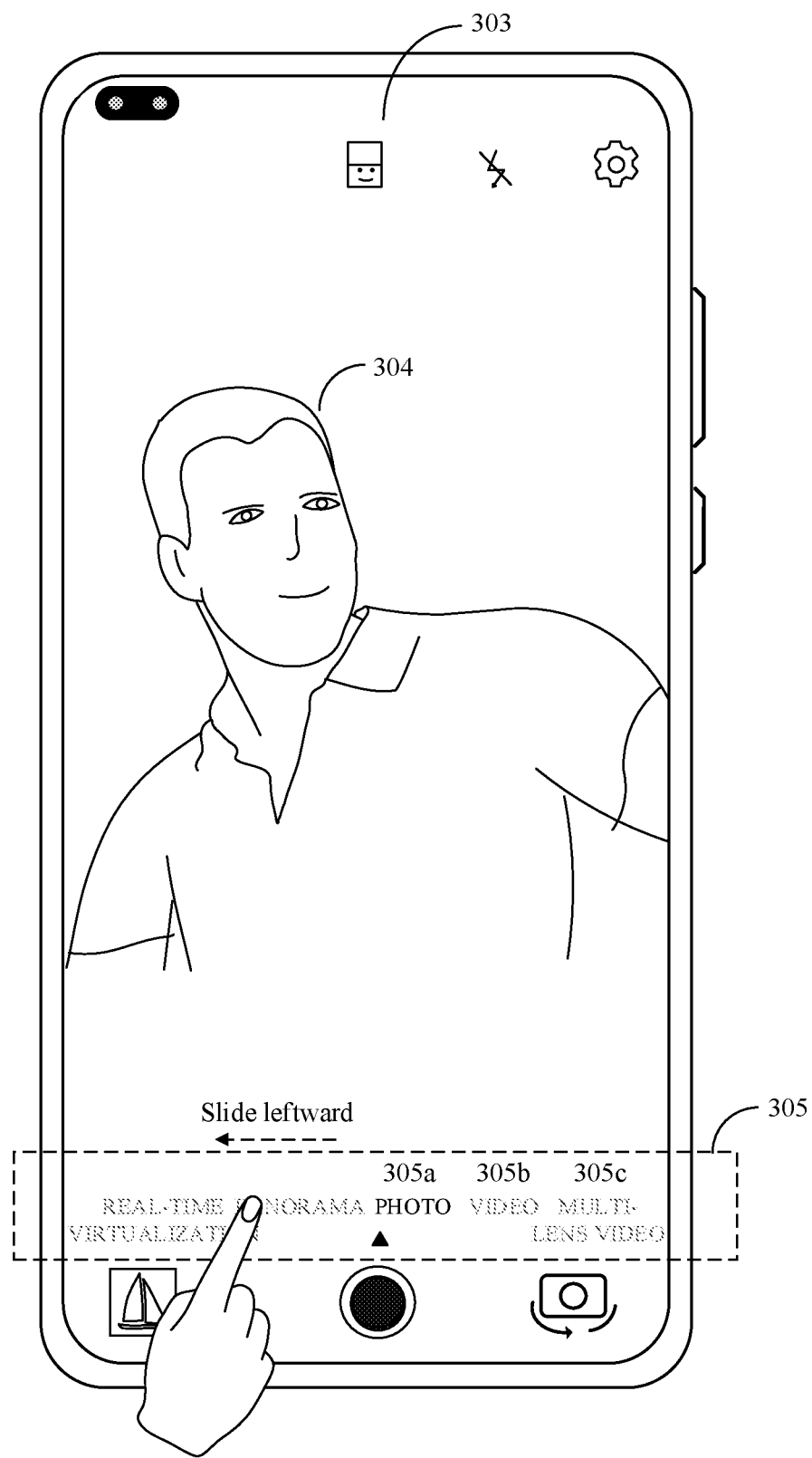

FIG. 2B is described by using an example in which the photographing preview interface 303 is a photographing preview interface corresponding to the camera application in the front photographing mode. As shown in FIG. 2B, the photographing preview interface 303 may include a preview image 304, a photographing mode option 305, a camera flash control, a shutter control, and the like. The preview image 304 is an image collected in real time by the camera 293. It should be noted that the electronic device may refresh, in real time, the image (that is, the preview image 304) displayed on the photographing preview interface 303, so that the user previews an image currently collected by the camera 293. The photographing mode option 305 is configured to provide a plurality of photographing modes for the user to select. The plurality of photographing modes may include photographing 305a, video recording 305b, multi-lens video recording 305c, real-time virtualization, panorama, and the like. The electronic device may receive a left/right sliding operation performed by the user on the photographing mode option 305, and in response to the operation, the electronic device may enable a photographing mode selected by the user. It should be noted that, not limited to that shown in FIG. 2B, the photographing mode option 305 may display more or fewer options than those shown in FIG. 2B.

A photographing mode corresponding to the photographing 305a is a common single-lens shooting, which may include a front photographing mode, a rear photographing mode, and the like. That is, when the photographing 305a is selected, the electronic device may perform photographing by using the front-facing camera or the rear-facing camera. For specific descriptions of the front photographing mode and the rear photographing mode, refer to the foregoing descriptions. Details are not described herein again.

Photographing modes corresponding to the multi-lens video recording 305c may include a plurality of photographing modes, for example, a plurality of photographing modes in the case of multi-lens shooting and a plurality of photographing modes in the case of single-lens shooting. That is, when the multi-lens video recording 305c is selected, the electronic device may perform single-lens shooting by using one camera, or may perform multi-lens shooting by using a plurality of cameras. For descriptions of the plurality of photographing modes in the case of multi-lens shooting, refer to the foregoing specific descriptions. Details are not described herein again.

Figure 2C:
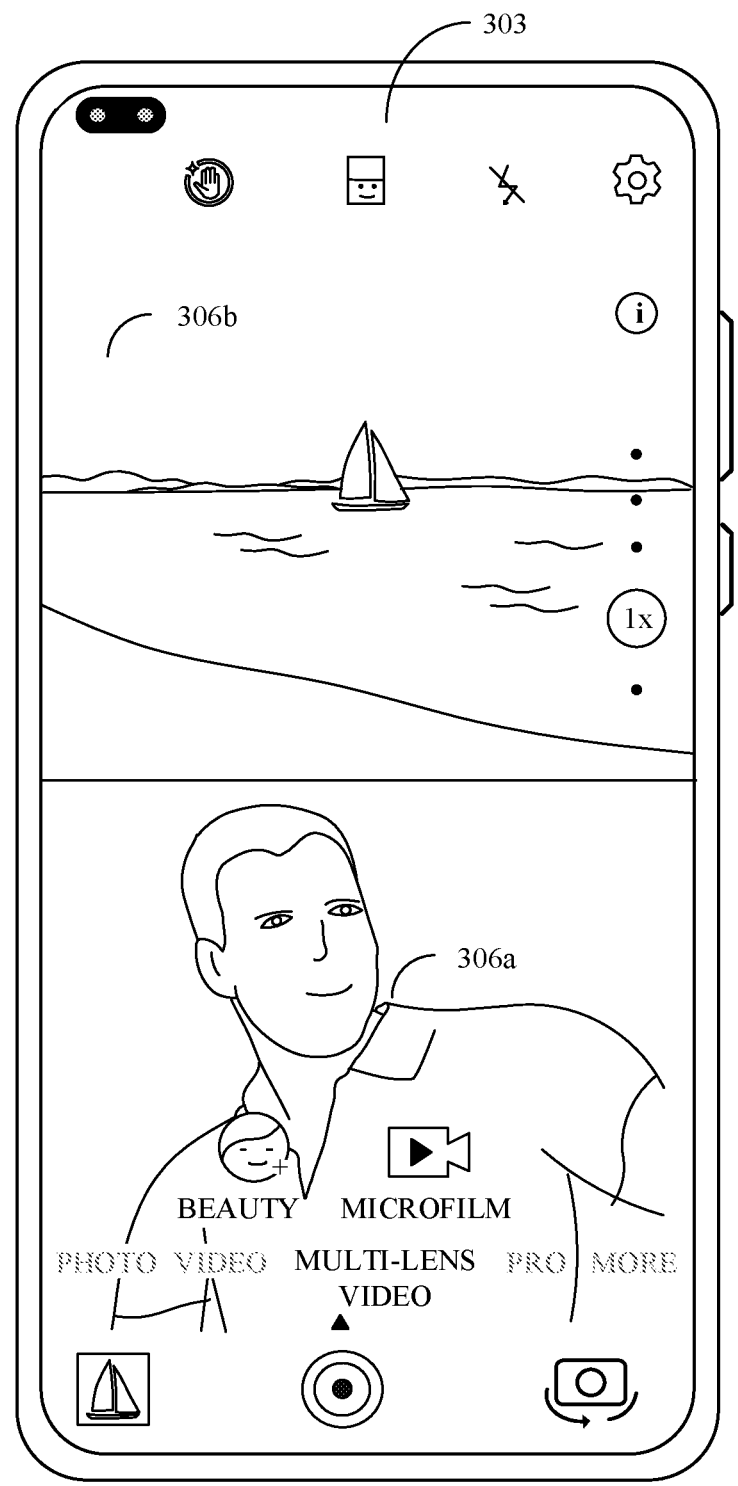

As shown in FIG. 2B, the photographing 305a is in a selected state. That is, the electronic device is currently in a photographing mode. If the user wants to enable the multi-lens video recording mode, the user may slide the photographing mode option 305 leftward and select the multi-lens video recording 305c. When detecting operations that the user slides the photographing mode option 305 leftward and selects the multi-lens video recording 305c, the electronic device may enable the multi-lens video recording mode and display the photographing preview interface 303 shown in FIG. 2C. As shown in FIG. 2C, after entering the multi-lens video recording mode, the electronic device may enable the front-facing camera and the rear-facing camera, and the photographing preview interface 303 simultaneously displays an image 306a collected by the front-facing camera and an image 306b collected by the rear-facing camera, and the image 306a and the image 306b are spliced and displayed. Because the electronic device is vertically placed, the image 306a and the image 306b are spliced up and down.

In an optional implementation, after the electronic device enables the multi-lens video recording, the front-facing camera and the rear-facing camera may be enabled by default, and an image collected by the front-facing camera and an image collected by the rear-facing camera are spliced and displayed on the photographing preview interface (for example, a display method shown in FIG. 2C). It may be understood that cameras enabled by default are not limited to the front-facing camera and the rear-facing camera, and may alternatively be a rear-facing camera and a rear-facing camera, a front-facing camera, a rear-facing camera, or the like. In addition, a display manner of the image is not limited to a splicing manner, and may alternatively be a picture-in-picture mode or the like. This is not specifically limited herein.

Figure 3:
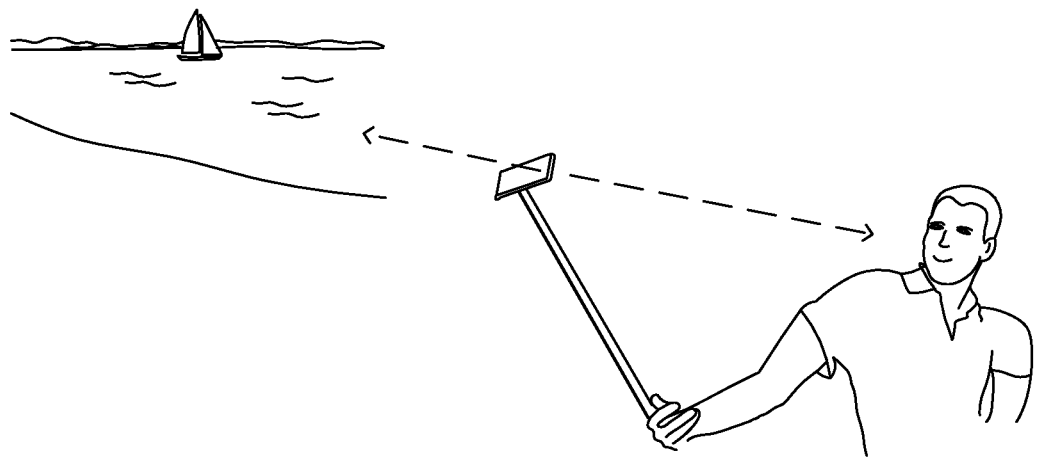
FIG. 3 is a schematic diagram of a photographing scenario according to an embodiment of this application.

After enabling the multi-lens video recording, the electronic device may perform multi-lens video recording. FIG. 3 is a schematic diagram of a scenario in which a user performs landscape photographing by using a selfie stick to hold an electronic device, where the electronic device is horizontally placed in the selfie stick. It can be learned that when the electronic device is in the photographing scenario shown in FIG. 3 or in another scenario in which it is inconvenient for the user to directly touch a display, or it is inconvenient for the user to control the electronic device, for example, it is inconvenient for the user to start or stop recording and switch a photographing mode. In this case, the user may control, by using an air gesture, the electronic device to start or stop recording, and switch a photographing mode of the electronic device.

The following describes, with reference to the accompanying drawings, procedures of controlling the electronic device by the user by using the air gesture in the photographing scenario shown in FIG. 3.

With reference to FIG. 4A-FIG. 4E, the following describes a series of interfaces on which a user controls, by using an air gesture, an electronic device to start recording.

Figure 4A:
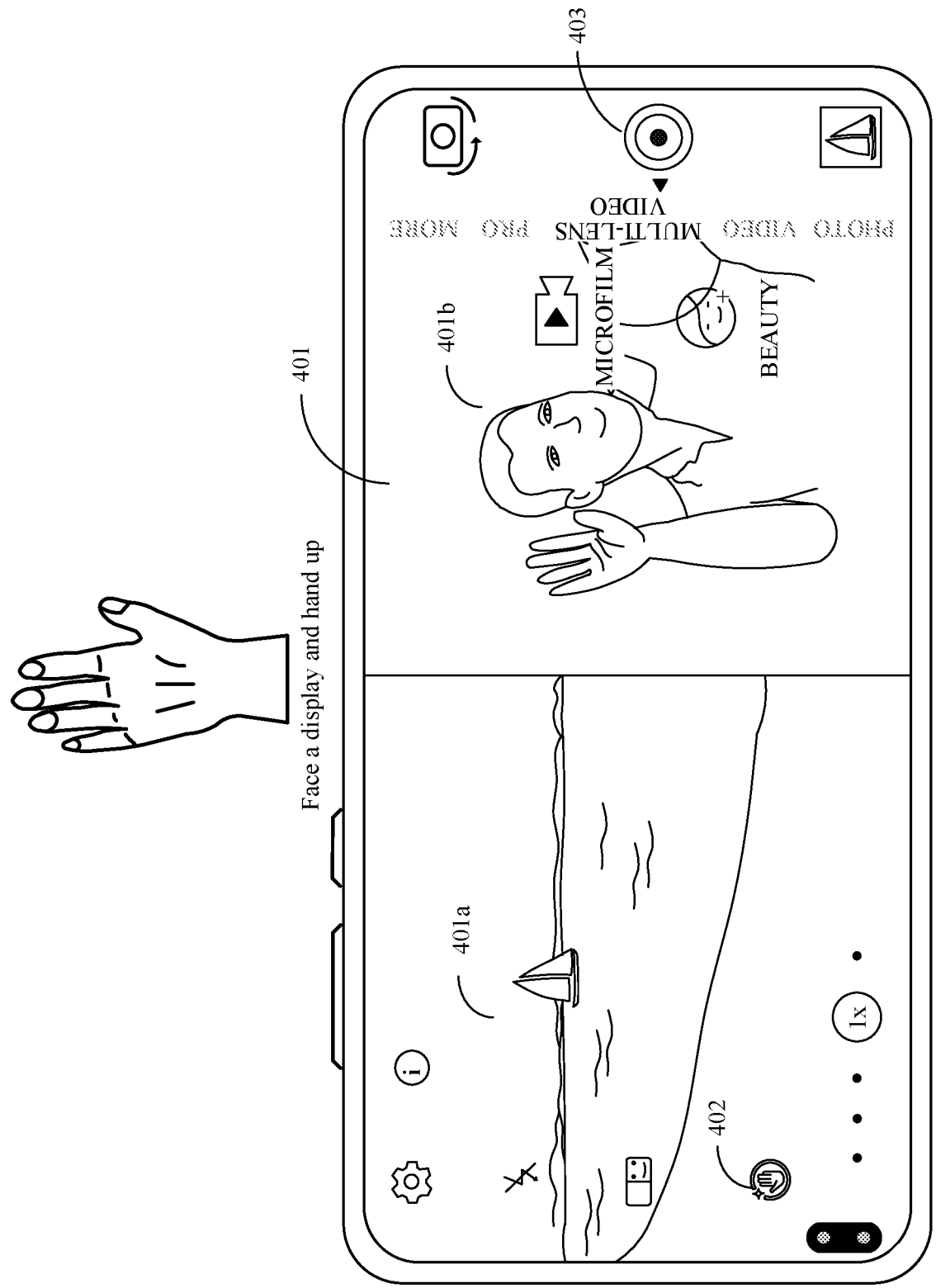
FIG. 4A-FIG. 4E are schematic diagrams of another group of interfaces according to an embodiment of this application.

As shown in FIG. 4A, the electronic device may display a photographing preview interface 401. The photographing preview interface 401 includes a preview image 401a, a preview image 401b, an air lens switching control 402, a recording control 403, and the like. The preview image 401a is an image collected by the rear-facing camera, and the preview image 401b is an image collected by the front-facing camera. In addition, the preview image 401a and the preview image 401b are spliced left and right because the electronic device is horizontally placed in the selfie stick. When the electronic device is vertically placed in the selfie stick, the preview image 401a and the preview image 401b may be spliced up and down. The air lens switching control 402 may be used by the user to quickly enable/disable an air lens switching function. After the air lens switching function is enabled, the user may control the electronic device by using a specific air gesture. In FIG. 4A, the air lens switching control 402 indicates that the air lens switching function is in an enabled state (which may also be referred to as a first state). The recording control 403 may be used by the user to quickly start/stop video recording. In FIG. 4A, the recording control 403 indicates that the electronic device is in a non-recording state.

Figure 4B:
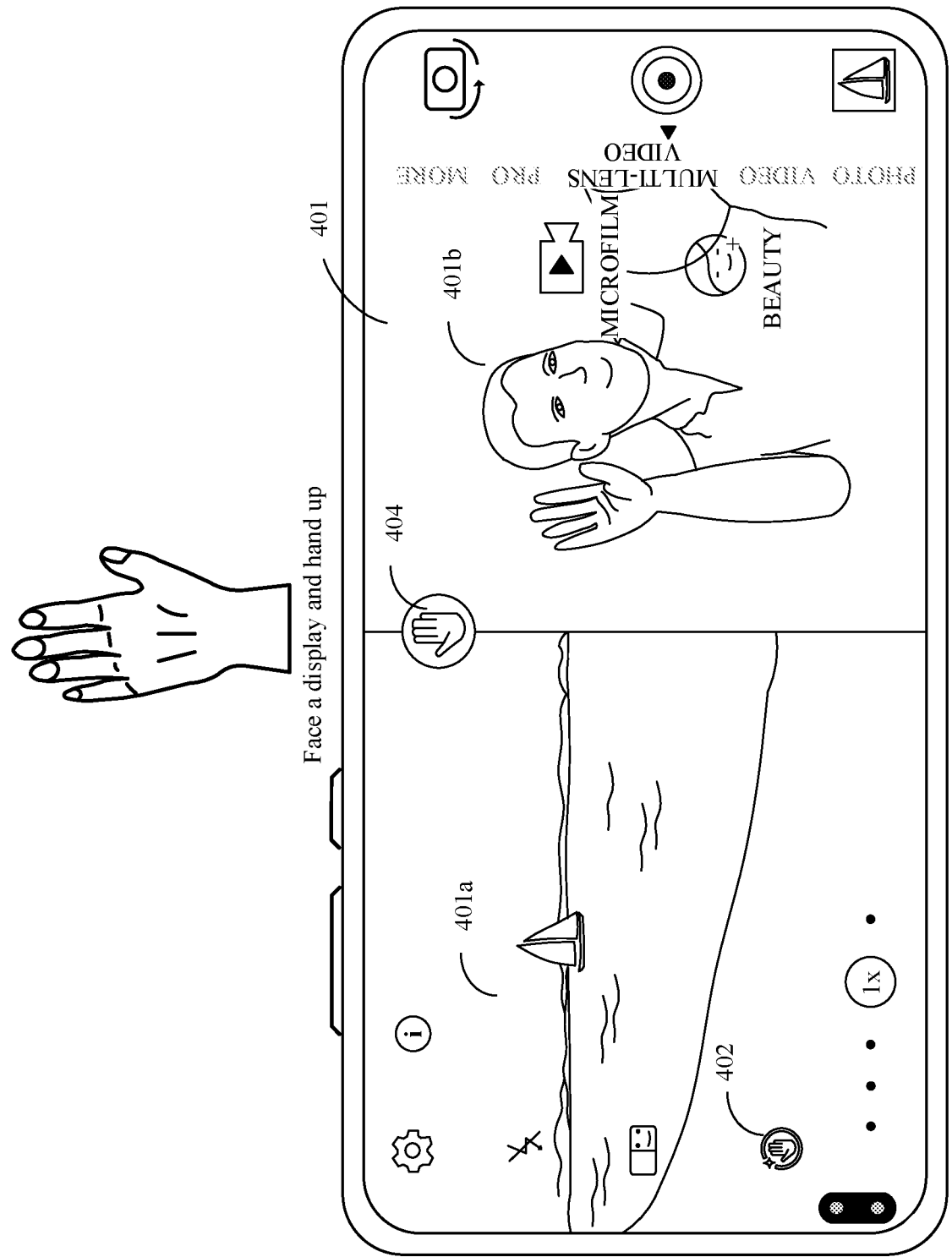

As shown in FIG. 4A, when the user wants to start recording, the user may first face the electronic device and input an air gesture, for example, input a "hand up" air gesture (that is, a user operation, which may be understood that the user keeps facing the display and keeps a "hand up" state, and may also be referred to as a first air gesture). The front-facing camera of the electronic device may collect the air gesture (that is, the preview image 401b) input by the user, and display the air gesture on the photographing preview interface 401. In addition, the electronic device may further perform analysis and processing on the collected preview image 401b, and display the photographing preview interface 401 shown in FIG. 4B when recognizing the "hand up" air gesture. The photographing preview interface 401 shown in FIG. 4B is similar to the photographing preview interface 401 shown in FIG. 4A. A difference lies in that prompt information 404 is displayed on the photographing preview interface 401 shown in FIG. 4B, and is used to prompt the user that the electronic device has entered a "ready" state (which may be understood as a state of being ready to further recognize the air gesture of the user). The user may input an air gesture as required. For example, as shown in FIG. 4B, the prompt information 404 may be an icon of the air gesture. In a possible design, the prompt information 404 may further include text information that prompts the user that a gesture operation needs to be completed within a first preset time, for example, "the gesture operation needs to be completed within 3 seconds".

In addition, the prompt information 404 may further include a time progress bar, and the time progress bar may be used to indicate a time at which the electronic device enters the "ready" state. The electronic device starts timing from a moment at which the electronic device enters the "ready" state (for example, a first moment), and in this case, the time progress bar is blank. The electronic device stops timing upon expiration of a first preset time after the first moment, and in this case, the time progress bar is filled up. After the electronic device enters the "ready" state, the user needs to input the air gesture before the time progress bar is filled up (which may be understood as within the first preset time), to control the electronic device.

Figure 4C:
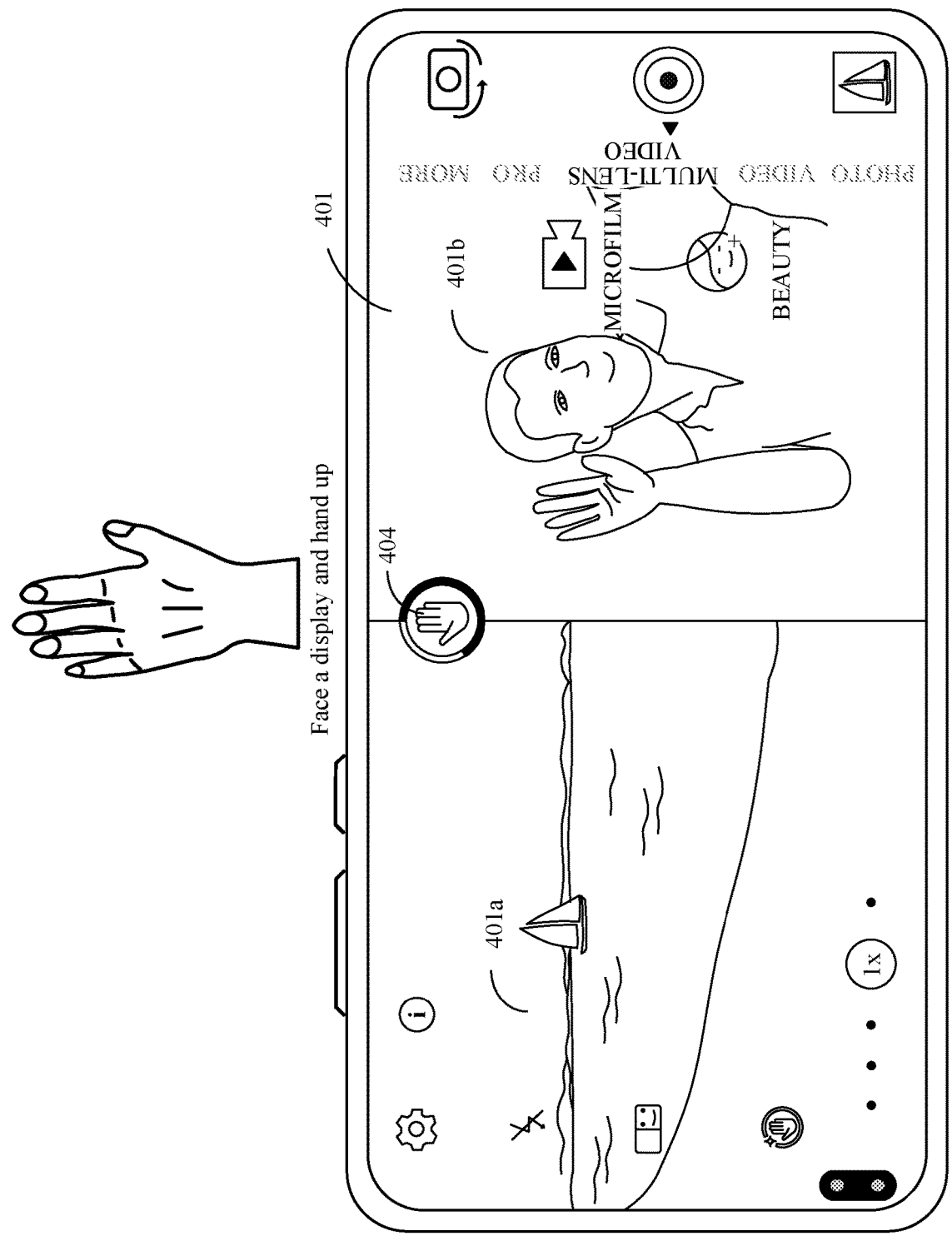

As shown in FIG. 4C, in a photographing scenario shown in FIG. 4B, the user may continuously input the "hand up" air gesture (which may also be referred to as a second air gesture) until the time progress bar is filled with more than two thirds (or any other proportion, for example, a half or two fifths). In response to that the electronic device detects that the user continuously inputs the "hand up" air gesture until the time progress bar is filled with more than two thirds, the electronic device may enter a ready-to-record state and display the photographing preview interface 401 shown in FIG. 4D. For example, if the first preset time is 3 seconds, after the electronic device enters the "ready" state, the user may keep the "hand up" gesture for at least 2 seconds, and the electronic device may enter the ready-to-record state.

Figure 4D:
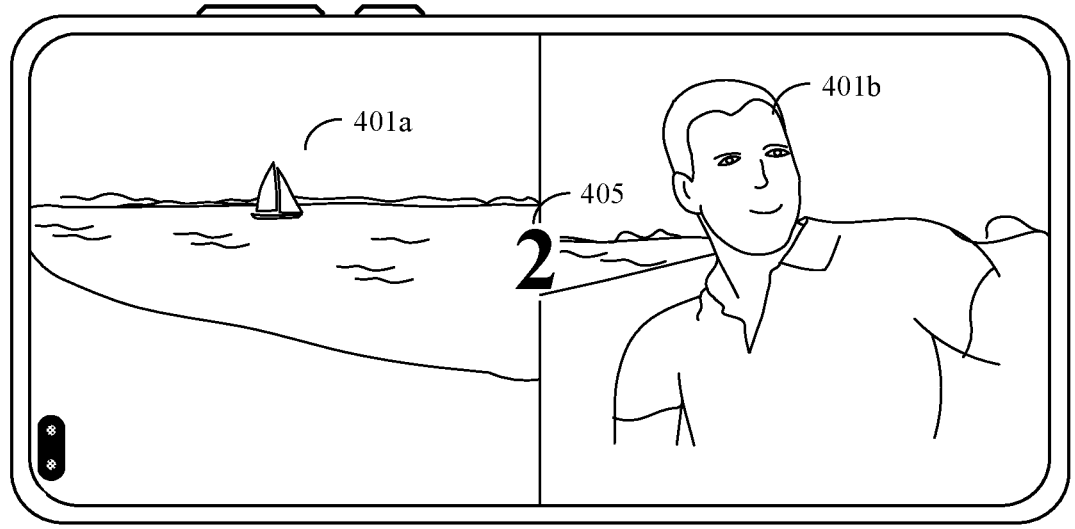

As shown in FIG. 4D, after the electronic device enters the ready-to-record state, the photographing preview interface 401 may display only the preview image 401a, the preview image 401b, and a countdown reminder 405. The preview image 401b shows that the user already drops the hand (that is, does not input the "hand up" air gesture any more). The countdown reminder 405 is used to remind the user that the electronic device is to enter a recording state after a third preset time, for example, to enter the recording state after 2 seconds. By displaying the countdown reminder 405 on the photographing preview interface 401, the user may be reminded that the electronic device is about to start recording, so that the user prepares for recording. It may be understood that, after the electronic device enters the ready-to-record state, the user may not need to continue to input the air gesture, and may pose any gesture for photographing.

Figure 4E:
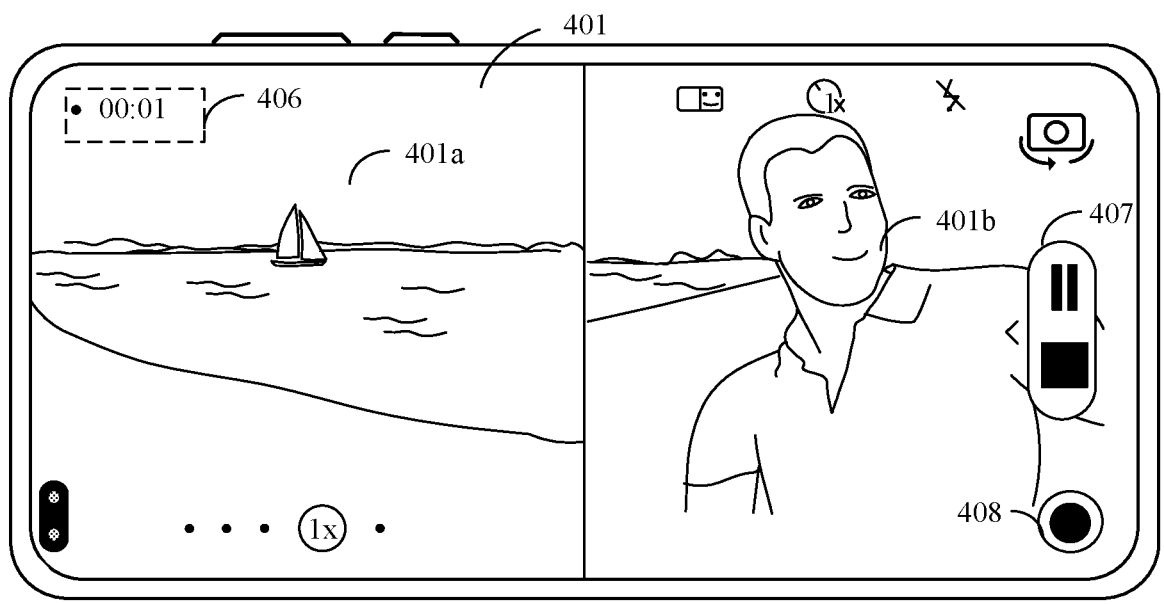

After the countdown ends, the electronic device may start recording. FIG. 4E shows a photographing preview interface 401 when an electronic device starts recording. The photographing preview interface 401 shown in FIG. 4E may include a recording time 406, a recording control 407, a screenshot control 408, and the like. The recording time 406 is used to display recording duration of a video, for example, "00:01". When detecting a touch operation performed on the recording control 407, the electronic device may stop or pause video recording. When detecting a touch operation performed on the screenshot control 408, the electronic device may capture an image (including the preview image 401a and the preview image 401b) currently displayed on the photographing preview interface 401.

It can be learned from the foregoing description that, when detecting, for the first time, the "hand up" air gesture (that is, the first air gesture) input by the user, the electronic device may enter the "ready" state. In this case, if the electronic device detects, within the first preset time, an air gesture (for example, the "hand up" air gesture) further input by the user, the electronic device may perform an operation corresponding to the air gesture (for example, the "hand up" air gesture may correspond to an operation of starting recording). If the electronic device does not detect, within the first preset time, the air gesture further input by the user, the electronic device returns to an original state (that is, a state of the electronic device before entering the "ready" state). In this case, if the user wants to control the electronic device again, the user needs to re-input the "hand up" air gesture to enable the electronic device to re-enter the "ready" state.

It should be noted that the first air gesture and the second air gesture may be the same (for example, both are "hand up"), or may be different. This is not specifically limited herein. In addition, the "hand up" air gesture may alternatively be replaced with another air gesture, for example, a "thumb up" air gesture and a "victory" air gesture.

With reference to FIG. 5A-FIG. 5F, the following describes a series of interfaces on which a user controls, by using an air gesture, an electronic device to switch from a front/rear photographing mode to another photographing mode in a recording process.

Figure 5A:
FIG. 5A-FIG. 5F are schematic diagrams of another group of interfaces according to an embodiment of this application.
Figure 5A:
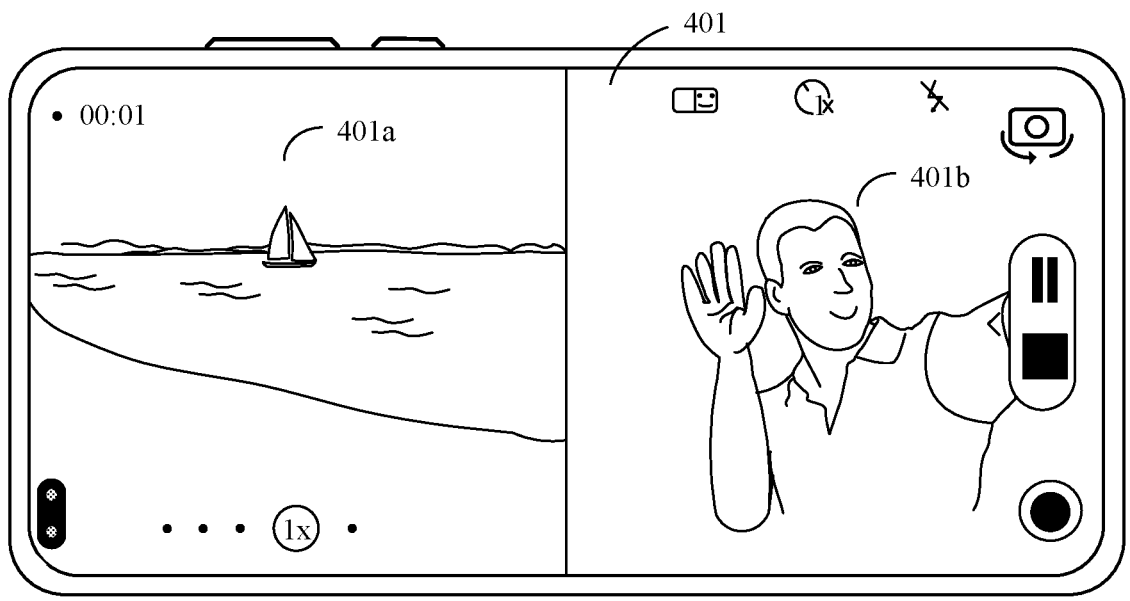

As shown in FIG. 5A, the electronic device may display the photographing preview interface 401. The photographing preview interface 401 shown in FIG. 5A is similar to the photographing preview interface 401 shown in FIG. 4E. Details are not described herein again.

Figure 5B:
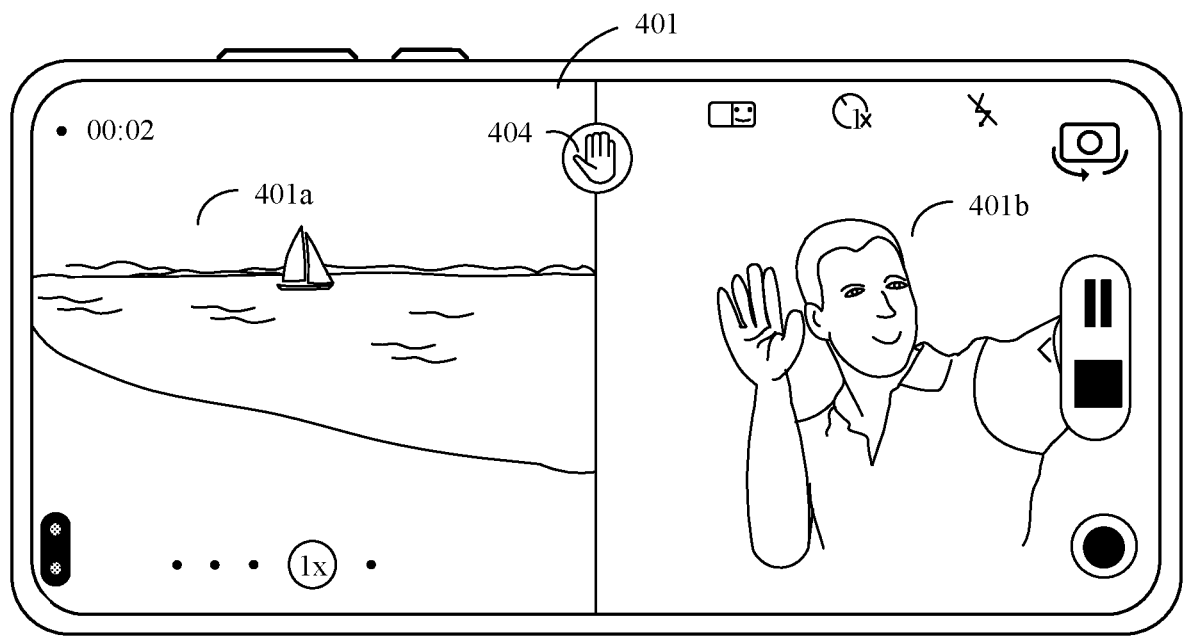

As shown in FIG. 5A, if the user wants to switch the photographing mode of the electronic device, the user may first face the electronic device and input an air gesture, for example, input a "hand up" air gesture. The front-facing camera of the electronic device may collect the air gesture (that is, the preview image 401b) input by the user, and display the air gesture on the photographing preview interface 401. In addition, the electronic device may further perform analysis and processing on the collected preview image 401b, and display the photographing preview interface 401 shown in FIG. 5B when recognizing the "hand up" air gesture. The photographing preview interface 401 shown in FIG. 5B is similar to the photographing preview interface 401 shown in FIG. 5A. A difference lies in that the photographing preview interface 401 shown in FIG. 5B includes the prompt information 404. For related descriptions of the prompt information 404, refer to the foregoing descriptions. Details are not described herein again.

The foregoing description indicates that, when detecting, for the first time, the "hand up" air gesture (that is, the first air gesture) input by the user, the electronic device may enter the "ready" state. After the electronic device enters the "ready" state, the electronic device may determine, based on a further detected gesture operation, an operation that needs to be performed. That is, on the photographing preview interface 401 shown in FIG. 5B, the user may input different air gestures to switch photographing modes of the electronic device, for example, control the electronic device to switch the photographing mode from the front/rear photographing mode to another photographing mode, for example, the front photographing mode, the rear photographing mode, or the picture-in-picture photographing mode.

Figure 5C:
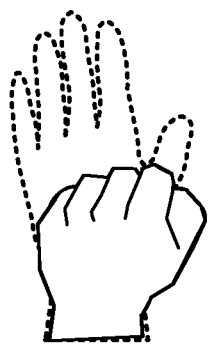
Figure 5C:
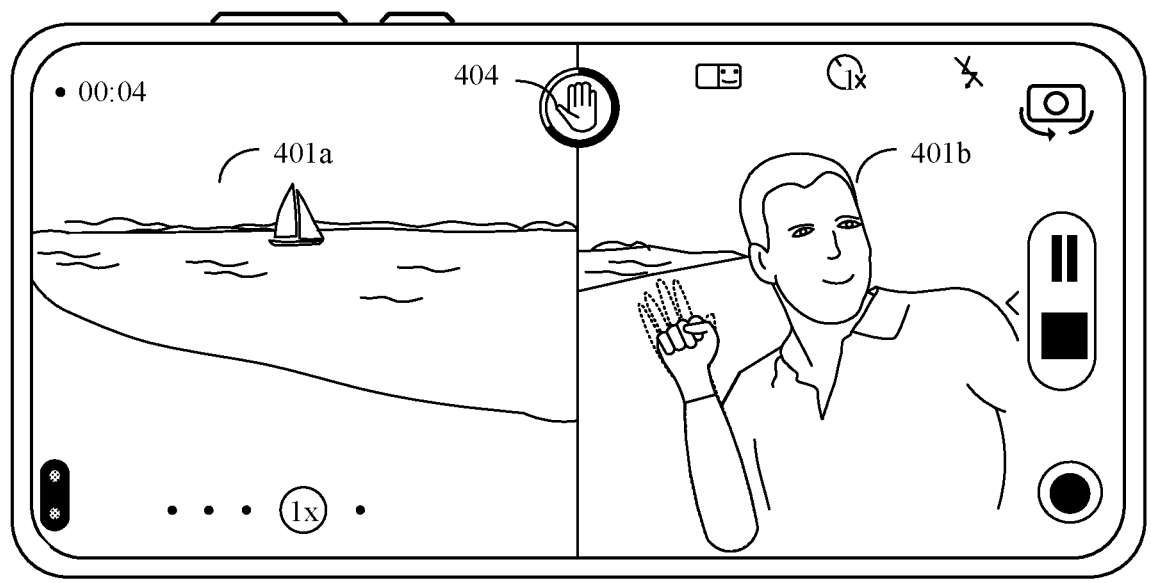
Figure 5D:
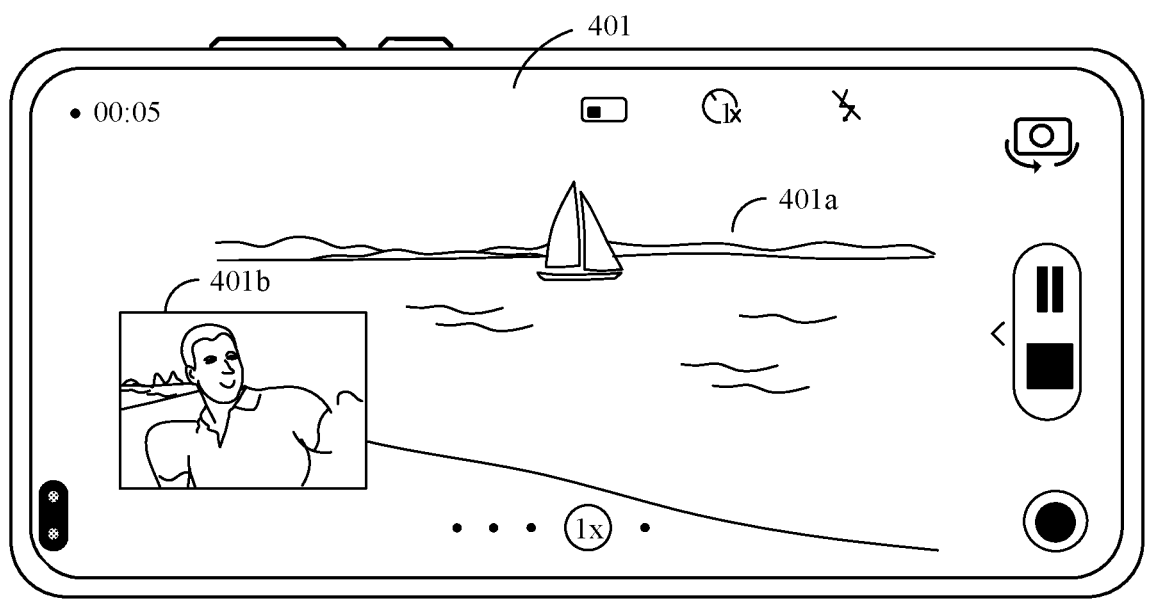

The electronic device may switch from the front/rear photographing mode to the picture-in-picture photographing mode. Based on a photographing scenario shown in FIG. 5A-FIG. 5B, the following describes interfaces included in a process in which the electronic device switches from the front/rear photographing mode to the picture-in-picture photographing mode. As shown in FIG. 5C, if the user hopes that the electronic device switches from the front/rear photographing mode to the picture-in-picture photographing mode, the user may face the display and input a "hold out a palm and then make a fist" air gesture (which may also be referred to as a third air gesture) when the electronic device displays the photographing preview interface 401 shown in FIG. 5B. In response to detecting the "hold out a palm and then make a fist" air gesture input by the user, the electronic device may switch the photographing mode from the front/rear photographing mode to the picture-in-picture photographing mode, and display the photographing preview interface 401 shown in FIG. 5D. As shown in FIG. 5D, after switching to the picture-in-picture photographing mode, the electronic device may display, in the picture-in-picture mode on the photographing preview interface 401, the image 401a collected by the rear-facing camera and the image 401b collected by the front-facing camera.

Specifically, the image 401a and the image 401b are displayed on the photographing preview interface 401. The image 401b is superimposed and displayed on the image 401a, and a display location of the image 401a is a location at which the entire photographing preview interface 401 is located. It should be noted that when the images are displayed in the picture-in-picture mode, a display location of the image 401b may be a default display location of the electronic device, that is, a lower left corner of the photographing preview interface 401. Alternatively, the display location and a size of the image 401b may be set by the user. For example, the electronic device may detect that the user performs an action on the image 401b and performs dragging to adjust the display location of the image 401b to any location on the photographing preview interfaces 401. For another example, the electronic device may detect that the user performs an action on the image 401b with two fingers, and then pinches inward or expands outward to zoom in or zoom out the image 401b, that is, to adjust a size of a display area of the image 401b. The display location and the size of the display area of the image 401b are not limited in this embodiment of this application. It should be further noted that when the images are displayed in the picture-in-picture mode, the electronic device superimposes, by default, the image collected by the front-facing camera on the image collected by the rear-facing camera. Certainly, locations of the two images may be interchanged. A specific interchanging manner is described in detail later.

The electronic device may further switch display locations of the two images in the front/rear photographing mode. Based on the photographing scenario shown in FIG. 5A-FIG. 5B, the following describes interfaces included in a process in which the electronic device interchanges the locations of the two images in the front/rear photographing mode.

Figure 5E:
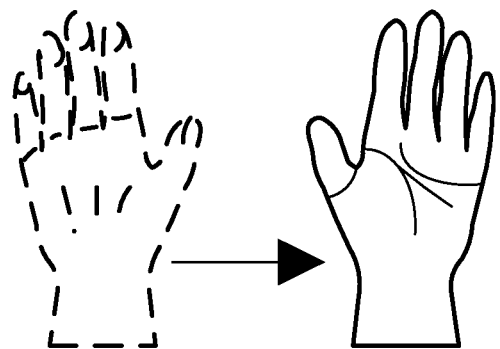
Figure 5E:
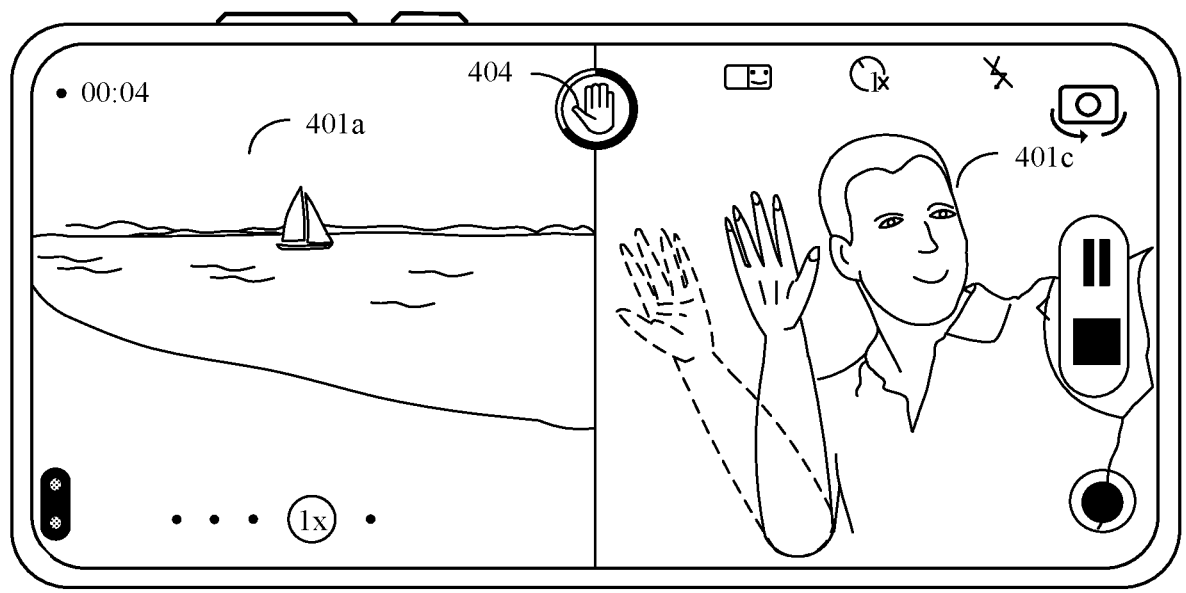
Figure 5F:
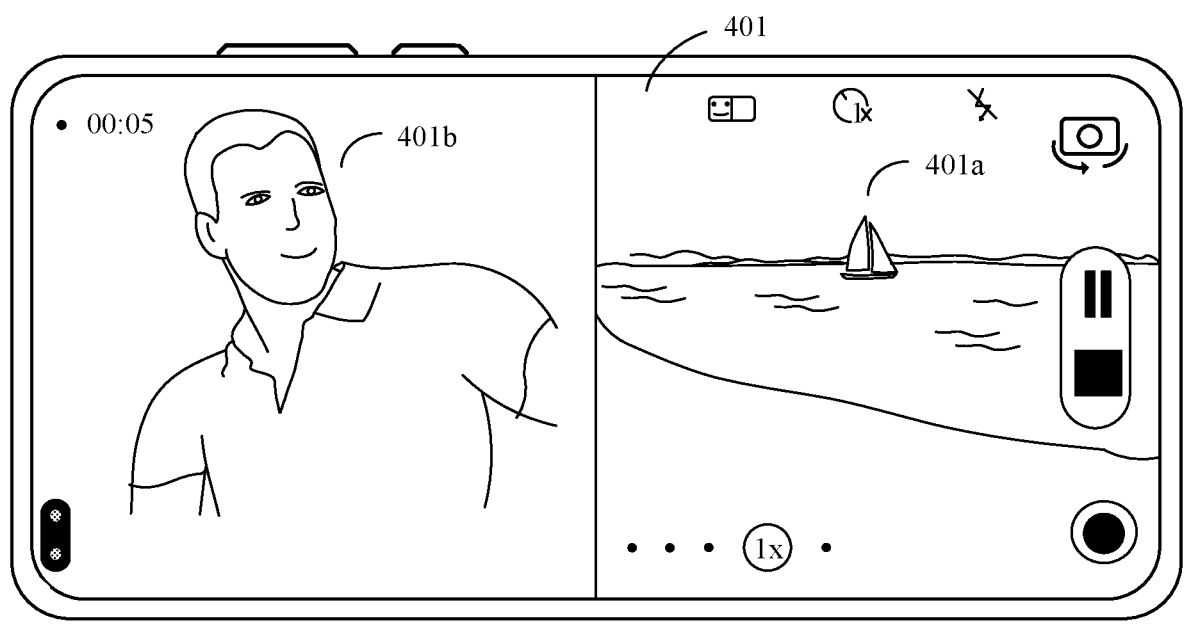

As shown in FIG. 5E, if the user wants to switch the display locations of the images, the user may face the display and input a "flip a palm" air gesture (which may also be referred to as a fourth air gesture) when the electronic device displays the photographing preview interface 401 shown in FIG. 5B. In response to detecting the "flip a palm" air gesture input by the user, the electronic device may switch the display locations of the images and display the photographing preview interface 401 shown in FIG. 5F. As shown in FIG. 5F, after the electronic device switches the display locations of the images, the locations of the image 401a and the image 401b are interchanged, that is, the location of the image 401a is changed from an original left side of the screen to a right side of the screen, and the location of the image 401b is changed from the original right side of the screen to the left side of the screen.

The electronic device may further switch from the picture-in-picture photographing mode to another photographing mode. The following describes this process in detail with reference to the accompanying drawings.

Figure 6A:
FIG. 6A-FIG. 6F are schematic diagrams of another group of interfaces according to an embodiment of this application.
Figure 6A:
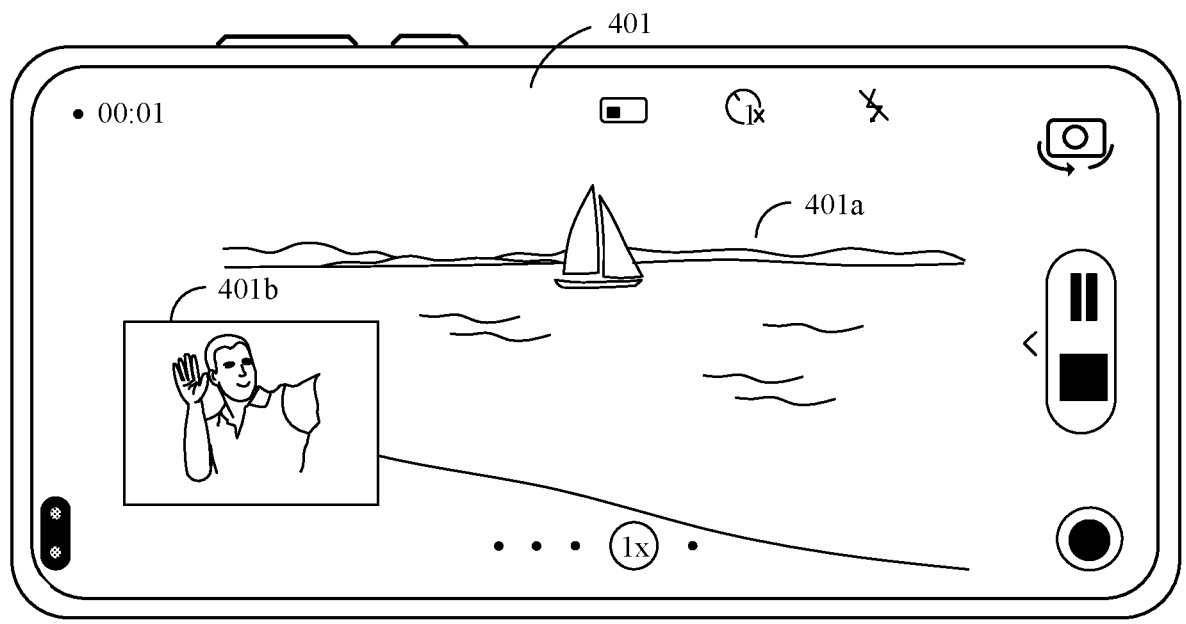
Figure 6B:
Figure 6B:
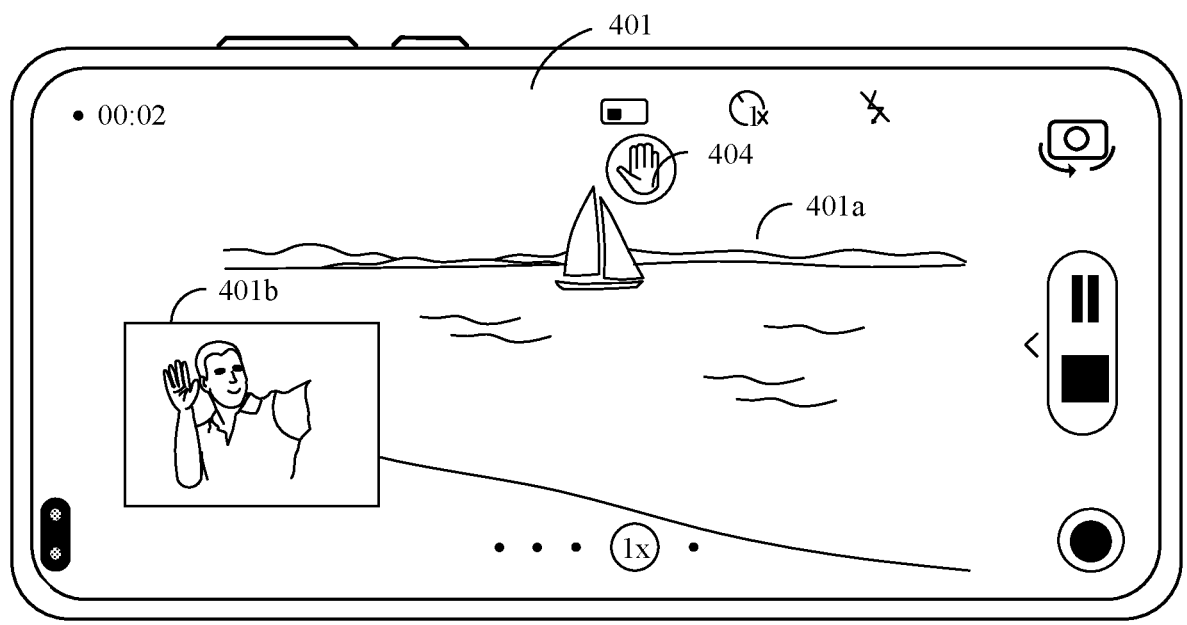

FIG. 6A shows a photographing preview interface 401 when an electronic device is in a picture-in-picture photographing mode. As shown in FIG. 6A, if the user wants to switch the photographing mode of the electronic device, the user may first face the electronic device and input an air gesture, for example, input a "hand up" air gesture. The front-facing camera of the electronic device may collect the air gesture (that is, the preview image 401b) input by the user, and display the air gesture on the photographing preview interface 401. In addition, the electronic device may further perform analysis and processing on the collected preview image 401b, and display the photographing preview interface 401 shown in FIG. 6B when recognizing the "hand up" air gesture. The photographing preview interface 401 shown in FIG. 6B is similar to the photographing preview interface 401 shown in FIG. 6A. A difference lies in that the photographing preview interface 401 shown in FIG. 6B includes the prompt information 404. For related descriptions of the prompt information 404, refer to the foregoing descriptions. Details are not described herein again.

The electronic device may switch from the picture-in-picture photographing mode to the front/rear photographing mode. Based on a photographing scenario shown in FIG. 6A-FIG. 6B, the following describes interfaces included in a process in which the electronic device switches from the picture-in-picture photographing mode to the front/rear photographing mode.

Figure 6C:
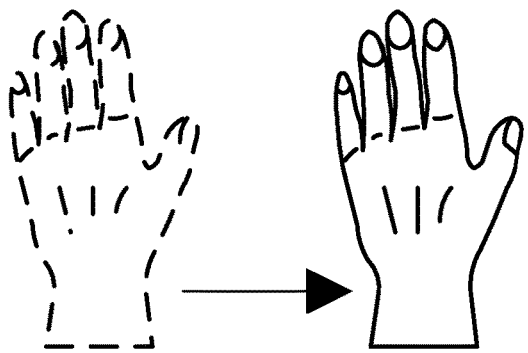
Figure 6C:
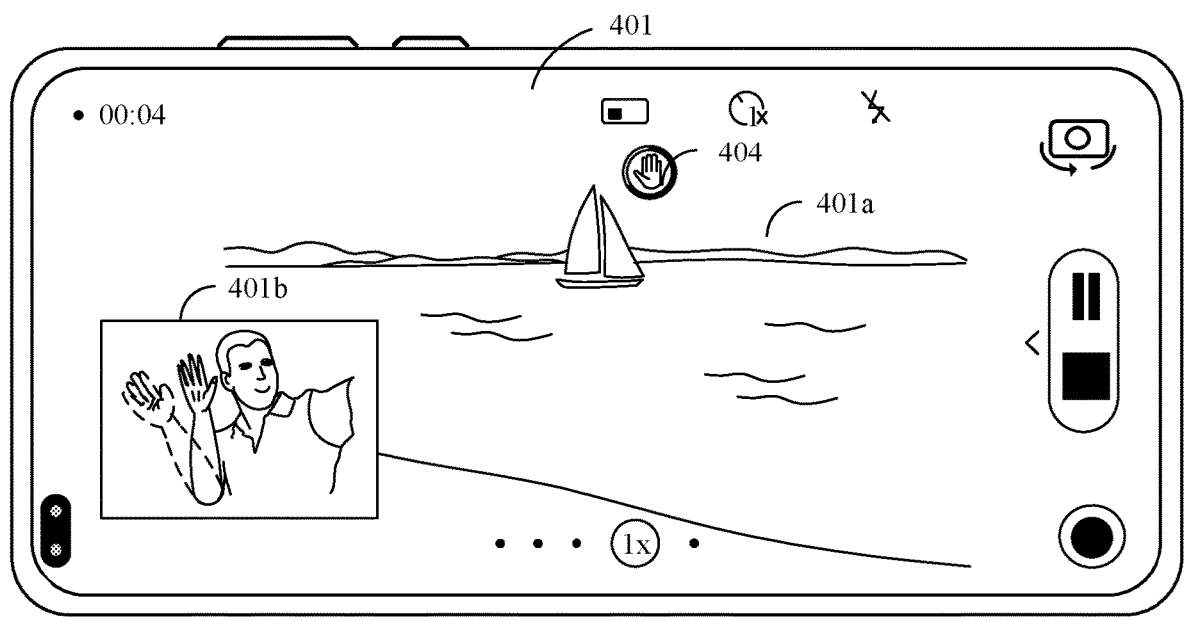
Figure 6D:
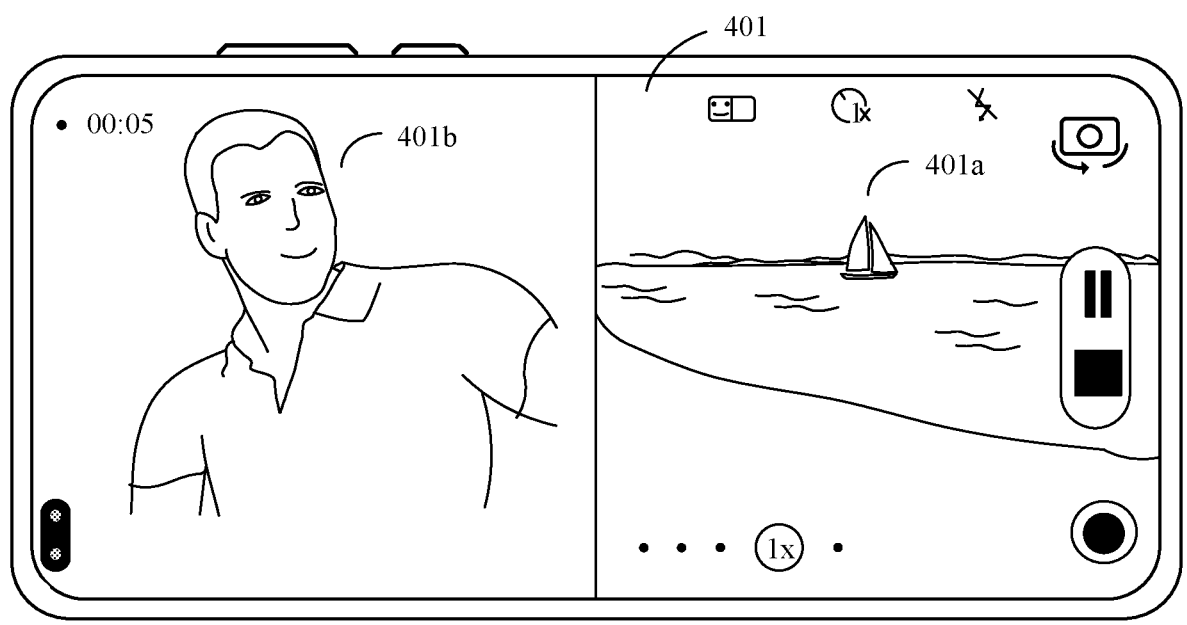

As shown in FIG. 6C, if the user hopes that the electronic device switches from the picture-in-picture photographing mode to the front/rear photographing mode, the user may face the display and input a "move a palm from left to right" air gesture (that is, a fifth air gesture) when the electronic device displays the photographing preview interface 401 shown in FIG. 6B. In response to detecting the "move a palm from left to right" air gesture input by the user, the electronic device may switch the photographing mode from the picture-in-picture photographing mode to the front/rear photographing mode, and display the photographing preview interface 401 shown in FIG. 6D. As shown in FIG. 6D, after switching to the front/rear photographing mode, the electronic device may simultaneously display, on the photographing preview interface 401, the image 401a collected by the rear-facing camera and the image 401b collected by the front-facing camera. Because the user inputs the "move a palm from left to right" air gesture, the image 401b is located on the left side of the photographing preview interface 401, and the image 401a is located on the right side of the photographing preview interface 401.

The user may alternatively face the display and input a "move a palm from right to left" air gesture. This air gesture can also enable the electronic device to switch from the picture-in-picture photographing mode to the front/rear photographing mode. Different from the photographing preview interface 401 shown in FIG. 6D, if the user faces the display and inputs the "move a palm from right to left" air gesture, in the photographing preview interface displayed after the electronic device switches to the front/rear photographing mode, the image 401b is located on the right side of the photographing preview interface 401, and the image 401a is located on the left side of the photographing preview interface 401.

The electronic device may further switch display locations of the two images in the picture-in-picture mode. Based on the photographing scenario shown in FIG. 6A-FIG. 6B, the following describes interfaces included in a process in which the electronic device interchanges the locations of the two images in the picture-in-picture mode.

Figure 6E:
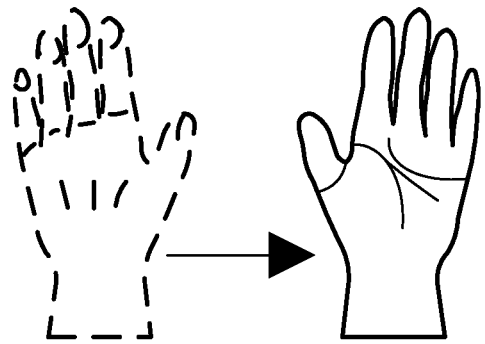
Figure 6E:
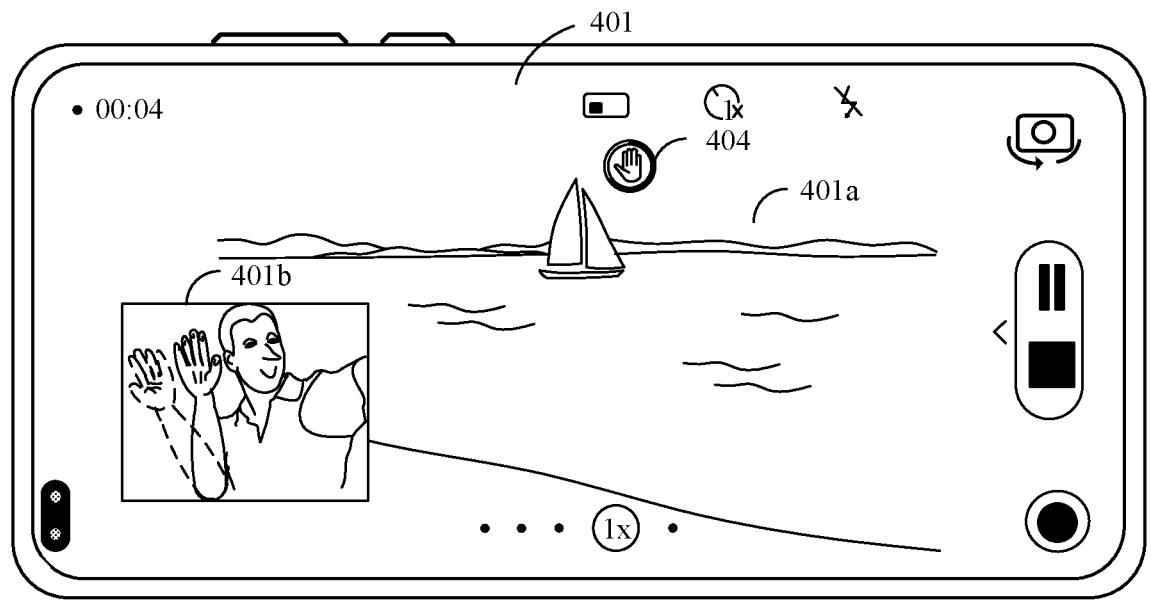
Figure 6F:
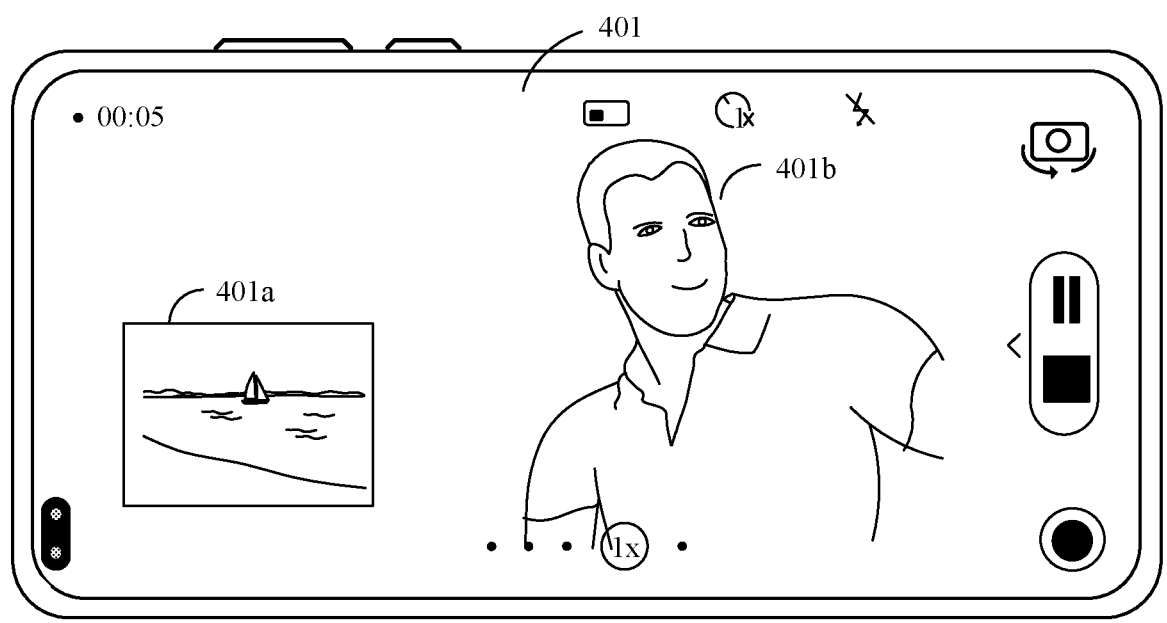

As shown in FIG. 6E, if the user wants to switch the display locations of the images, the user may face the display and input a "flip a palm" air gesture when the electronic device displays the photographing preview interface 401 shown in FIG. 6B. In response to detecting the "flip a palm" air gesture input by the user, the electronic device may switch the display locations of the images and display the photographing preview interface 401 shown in FIG. 6F. As shown in FIG. 6F, after the electronic device switches the display locations of the images, the locations of the image 401a and the image 401b are interchanged. To be specific, the image 401a changes from being originally displayed in the entire region of the photographing preview interface 401 to being superimposed on the image 401b, and the image 401b changes from being originally superimposed on the image 401a to being displayed in the entire region of the photographing preview interface 401.

It should be noted that the interfaces shown in FIG. 5A-FIG. 6F are all related interfaces based on switching photographing modes of the electronic device during recording. Actually, before starting recording, the electronic device may also recognize the air gesture of the user and perform a corresponding operation. A principle thereof is similar to a principle of recognizing the air gesture and performing the corresponding operation by the electronic device during recording. Details are not described herein.

It may be understood that the foregoing content is related description of a photographing scenario in which the electronic device is horizontally placed. The following describes, with reference to the accompanying drawings, a method for controlling the electronic device by the user by using an air gesture when the electronic device is vertically placed.

When the electronic device is vertically placed, the electronic device may also switch from the front/rear photographing mode to the picture-in-picture photographing mode, or from the picture-in-picture photographing mode to the front/rear photographing mode. A principle thereof is similar to a principle of switching when the electronic device is horizontally placed. A difference lies in that when the electronic device is horizontally placed, the user may switch the photographing mode of the electronic device by using the "move a palm from left to right" or "move a palm from right to left" air gesture; and when the electronic device is vertically placed, the electronic device may switch the photographing mode of the electronic device by using a "move a palm from up to down" or "move a palm from down to up" air gesture.

The following uses an example in which the electronic device is in the front/rear photographing mode to describe related interfaces for switching from the front/rear photographing mode to the picture-in-picture photographing mode when the electronic device is vertically placed.

Figure 7A:
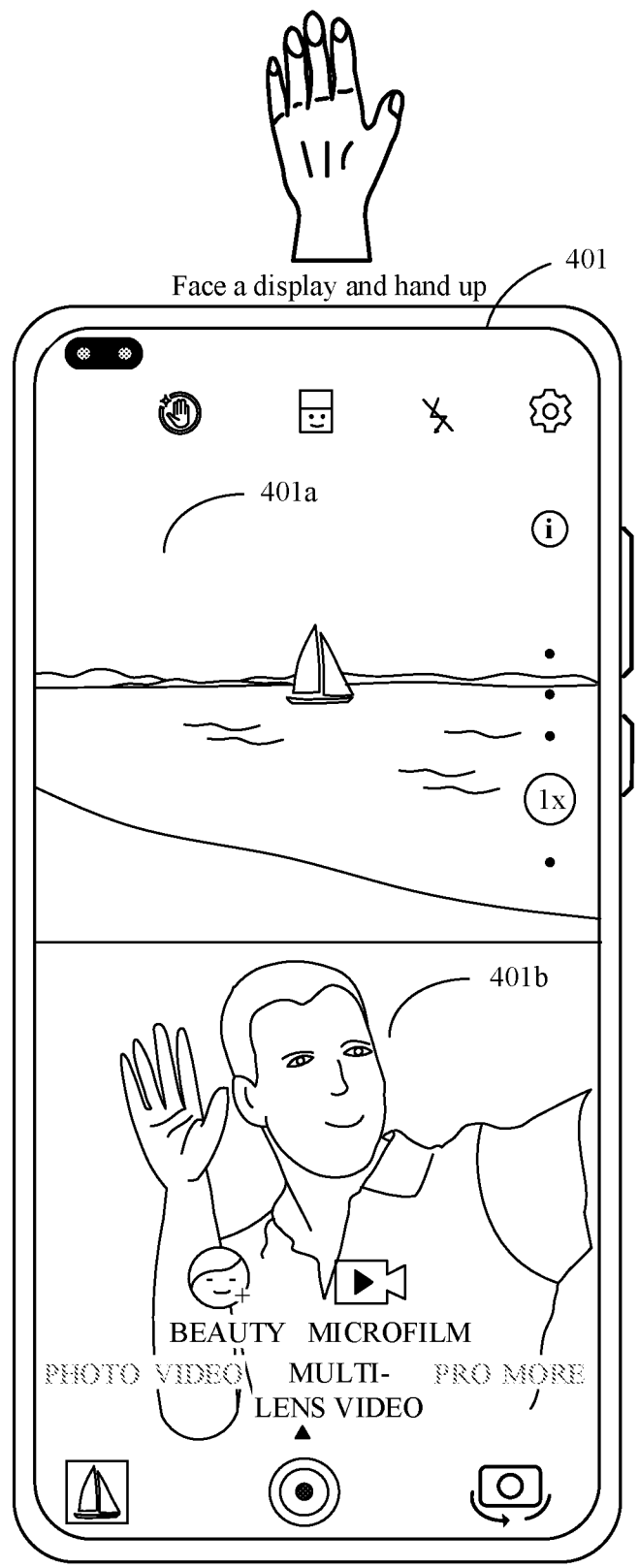
FIG. 7A-FIG. 7B are schematic diagrams of another group of interfaces according to an embodiment of this application.

As shown in FIG. 7A, the electronic device may display the photographing preview interface 401 when the electronic device is vertically placed and is in the front/rear photographing mode. The photographing preview interface 401 may include the image 401a shot by the rear-facing camera and the image 401b shot by the front-facing camera. In addition, because the electronic device is vertically placed, the image 401a and the image 401b are spliced up and down.

Figure 7B:
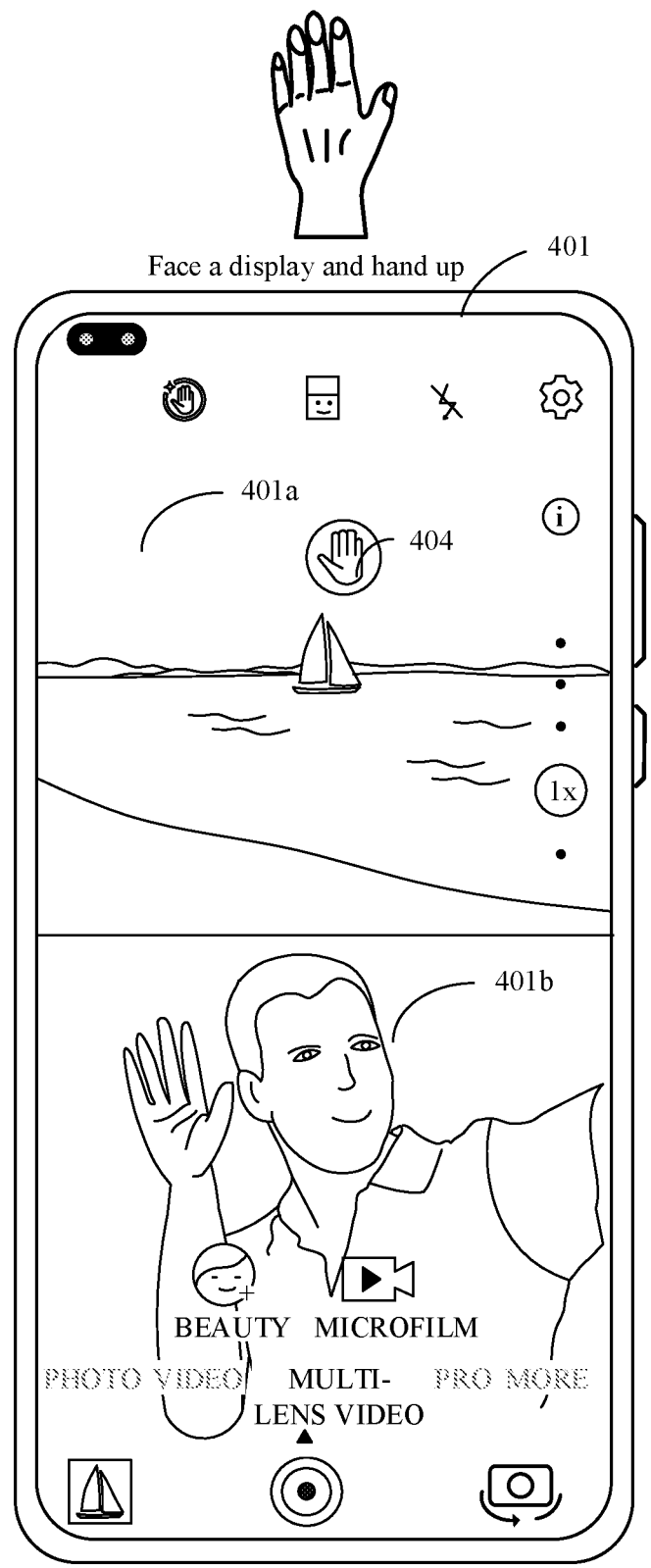

If the user wants to switch the photographing mode of the electronic device, the user first faces the electronic device and inputs an air gesture, for example, inputs a "hand up" air gesture. The front-facing camera of the electronic device may collect the air gesture (that is, the preview image 401b) input by the user, and display the air gesture on the photographing preview interface 401. In addition, the electronic device may further perform analysis and processing on the collected preview image 401b, and display the photographing preview interface 401 shown in FIG. 7B when recognizing the "hand up" air gesture. The photographing preview interface 401 shown in FIG. 7B is similar to the photographing preview interface 401 shown in FIG. 7A. A difference lies in that the photographing preview interface 401 shown in FIG. 7B includes the prompt information 404. For related descriptions of the prompt information 404, refer to the foregoing descriptions. Details are not described herein again.

Based on the photographing preview interface 401 shown in FIG. 7B, the electronic device may switch from the front/rear photographing mode to the picture-in-picture photographing mode when detecting a "hold out a palm and then make a fist" air gesture input by the user.

When the photographing preview interface is a picture displayed in the picture-in-picture photographing mode, the electronic device may switch from the picture-in-picture photographing mode to the front/rear photographing mode when detecting the "move a palm from down to up" air gesture input by the user, or may switch from the picture-in-picture photographing mode to the front/rear photographing mode when detecting the "move a palm from up to down" air gesture input by the user.

It should be noted that a principle and content of switching between other photographing modes when the electronic device is vertically placed are similar to a principle and content of switching between other photographing modes when the electronic device is horizontally placed. Details are not described herein again.

The foregoing embodiments describe switching of some photographing modes to which the video shooting method provided in this application is applied. The following describes a change of a photographing preview interface during switching of a photographing mode with reference to the accompanying drawings.

With reference to FIG. 8 and FIG. 9A-FIG. 9H, the following describes a processing procedure of the electronic device for the photographing preview interface 401 and a series of interfaces in the processing procedure in a process in which the user switches from the picture-in-picture photographing mode to the front/rear photographing mode.

Figure 8:
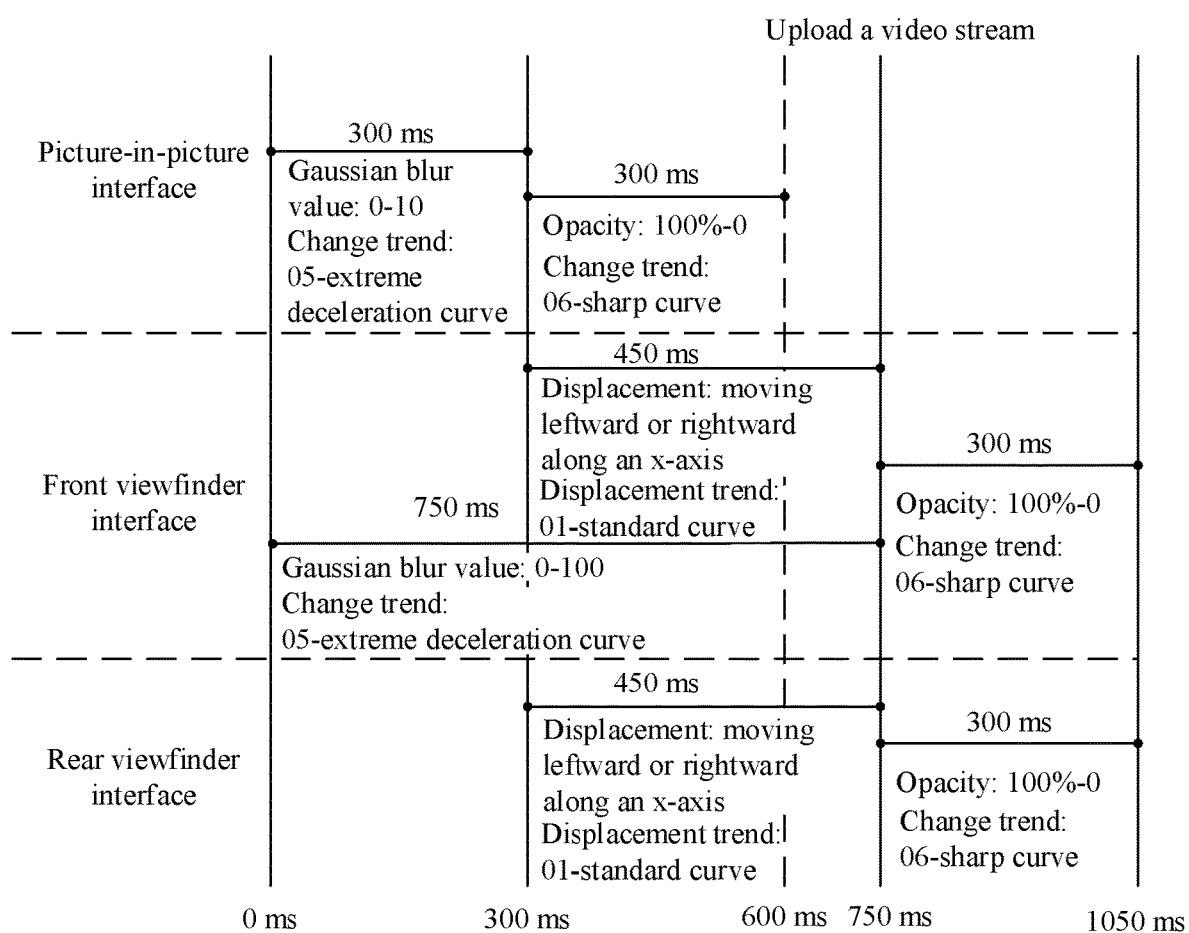
FIG. 8 is a flowchart of animation processing in a method according to an embodiment of this application.

In this embodiment, the processing procedure for the photographing preview interface 401 and the series of interfaces in the processing procedure are described by using an example in which a command input by the user is "move a palm from right to left". After the electronic device detects the "move a palm from right to left" air gesture (that is, the fifth air gesture) input by the user, in response to detecting the "move a palm from right to left" air gesture input by the user, the photographing preview interface 401 of the electronic device gradually switches from the picture-in-picture photographing mode to the front/rear photographing mode. FIG. 8 is a flowchart of animation processing performed by an electronic device on a photographing preview interface 401. Switching duration of the entire process in which the photographing preview interface switches from the picture-in-picture photographing mode to the front/rear photographing mode is a first switching cycle T1 (for example, the first switching cycle T1 is 1050 ms). This switching cycle may be divided into three processing time periods. The following describes in detail different processing time periods with reference to the accompanying drawings.

Figure 9A:
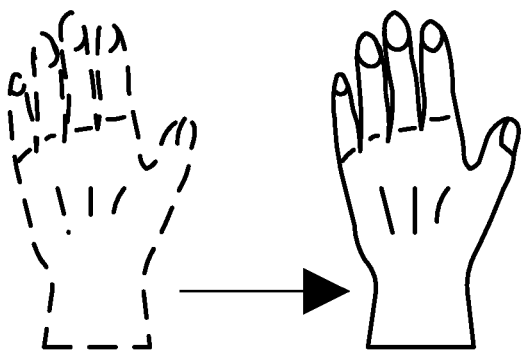
FIG. 9A-FIG. 9H are schematic diagrams of another group of interfaces according to an embodiment of this application.
Figure 9A:
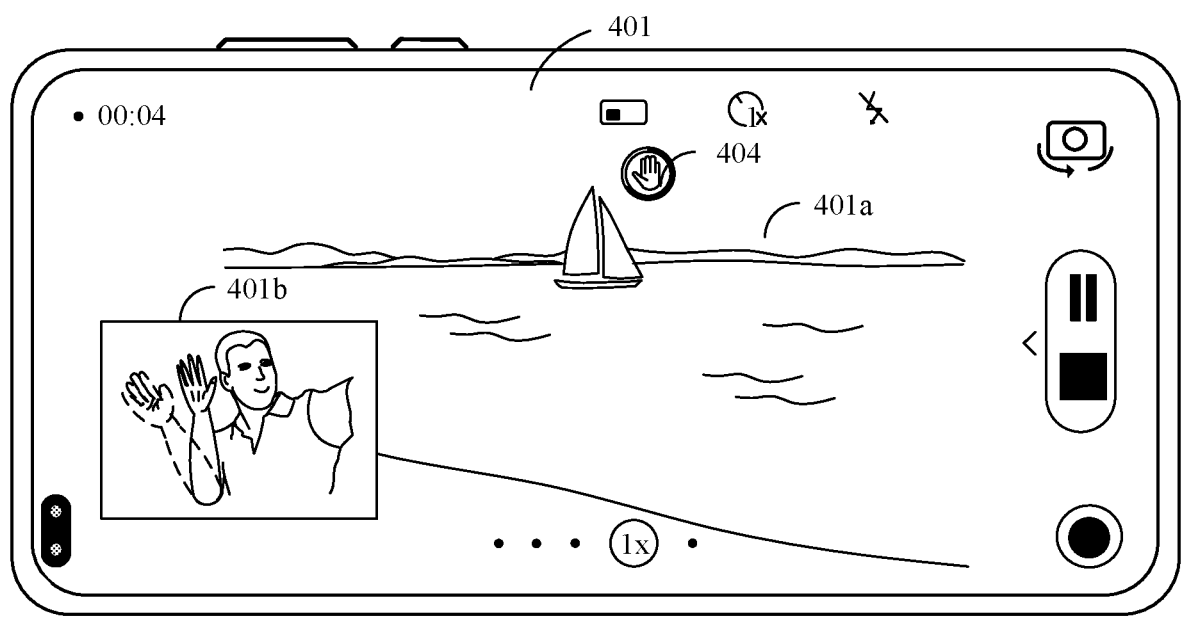

As shown in FIG. 9A, in this embodiment, when the user inputs the command "move a palm from right to left", the photographing preview interface 401 is a picture-in-picture interface shown in FIG. 9A. After the user inputs the command "move a palm from right to left", the picture-in-picture interface shown in FIG. 9A switches to an interface corresponding to the front/rear photographing mode. It should be noted that a picture shown in FIG. 9A is the same as a picture shown in FIG. 6C, and details about the picture in FIG. 9A are not described herein again.

Figure 9B:
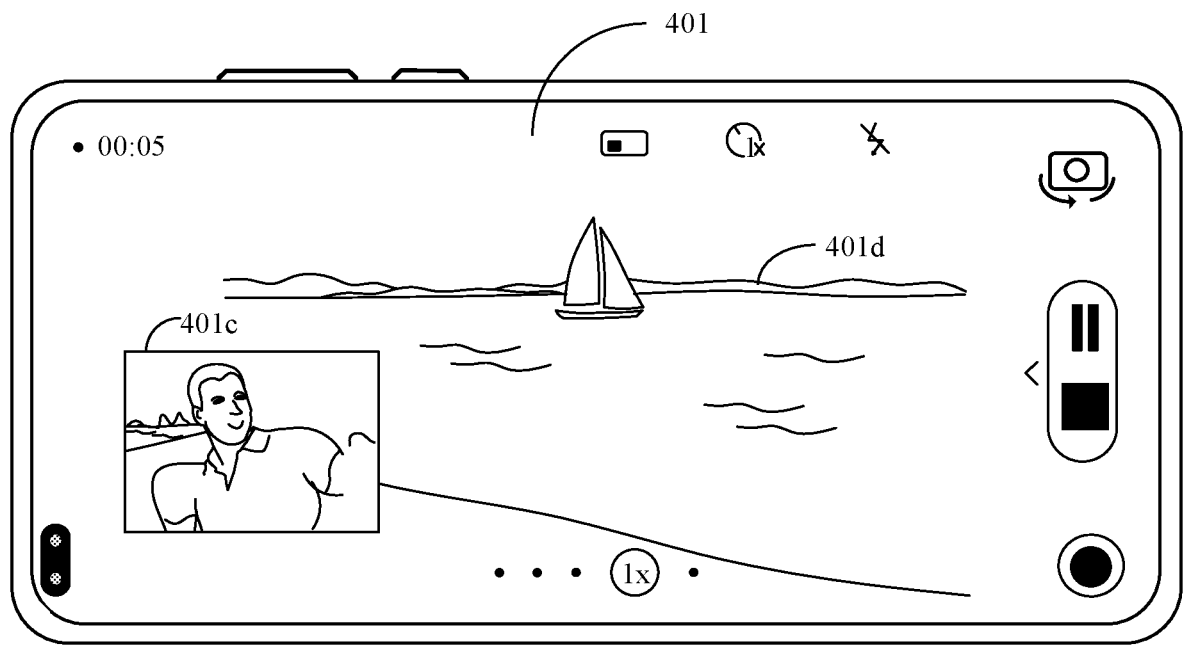

As shown in FIG. 9B, a picture on the photographing preview interface 401 is a picture at 0 ms (a first moment) in the first switching cycle T1 in which the picture-in-picture photographing mode is switched to the front/rear photographing mode, and the picture at this time may be a last frame of image in a video shot in the picture-in-picture photographing mode. The photographing preview interface 401 includes a picture-in-picture interface 401c (in this case, a display region in which the picture-in-picture interface 401c is located may be a first region) and a front viewfinder interface 401d (in this case, a display region in which the front viewfinder interface 401d is located may be a second region). A display interface of the front viewfinder interface 401d is an interface on which the entire photographing preview interface 401 is located, and the picture-in-picture interface 401c is superimposed and displayed on the front viewfinder interface 401d. In a preset mode, the picture-in-picture interface 401c is located in a lower left corner of the front viewfinder interface 401d. The picture-in-picture interface 401c is an image (that is, a first image) collected by the front-facing camera, and the front viewfinder interface 401d is an image (that is, a second image) collected by the rear-facing camera.

Figure 9C:
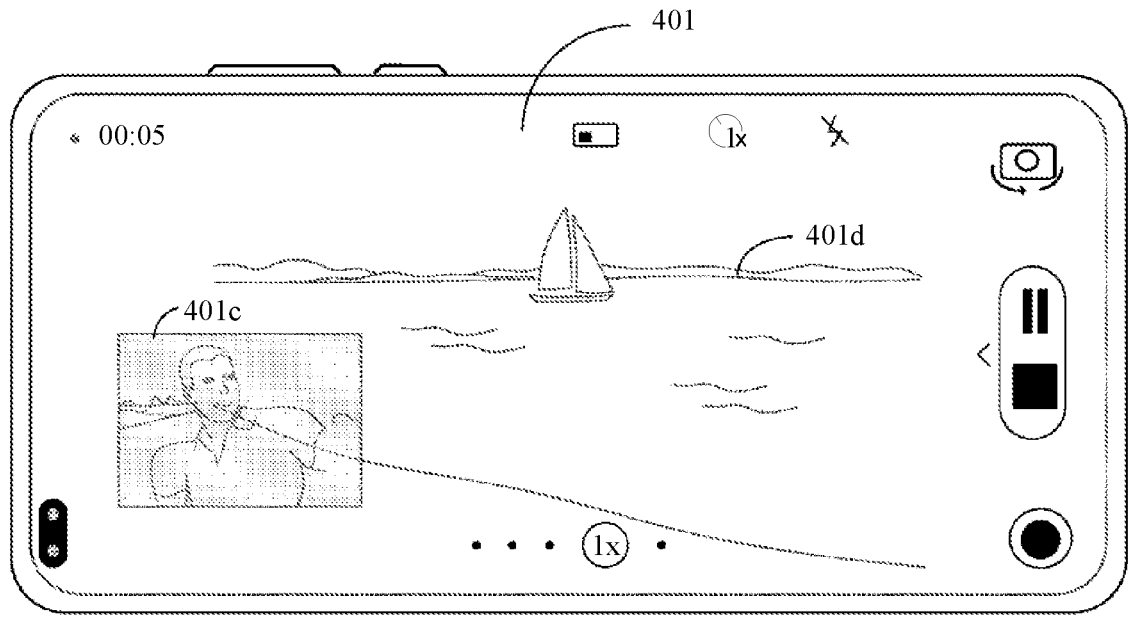

Referring to FIG. 9C, the photographing preview interface 401 shown in FIG. 9C is a picture at 300 ms (a second moment) in the first switching cycle. As shown in FIG. 9C, the photographing preview interface 401 includes the picture-in-picture interface 401c and the front viewfinder interface 401d. The photographing preview interface 401 shown in FIG. 9C is similar to the photographing preview interface 401 shown in FIG. 9B. A difference lies in that the picture-in-picture interface 401c in FIG. 9C becomes more blurred than the picture-in-picture interface 401c in FIG. 9B, and the front viewfinder interface 401d in FIG. 9C also becomes more blurred than the front viewfinder interface 401d in FIG. 9B.

Figure 10A:
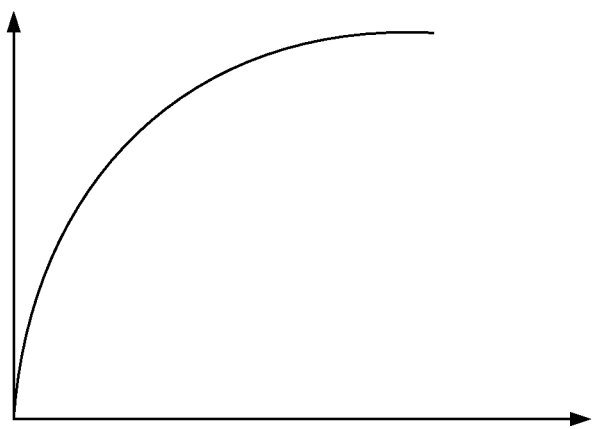
FIG. 10A-FIG. 10C are schematic diagrams of a group of curves according to an embodiment of this application.

A time period from 0 ms (the first moment) to 300 ms (the second moment) is referred to as a first time period. Referring to FIG. 8, in the first time period, the electronic device performs Gaussian blur processing on the picture-in-picture interface 401c, where a Gaussian blur value of the picture-in-picture interface 401c at 0 ms (the first moment) is 0 (a first blur value), and a Gaussian blur value of the picture-in-picture interface 401c at 300 ms (the second moment) is 10 (a third blur value). That is, in the first time period, the Gaussian blur values of the picture-in-picture interface 401c change from 0 to 10 (from the first blur value to the third blur value). For a change trend of the Gaussian blur values of the picture-in-picture interface 401c in the first time period, refer to a first curve. FIG. 10A shows a change trend of a first curve. The first curve may be 05-Extreme Deceleration Curve (05-Extreme Deceleration Curve).

Figure 9D:
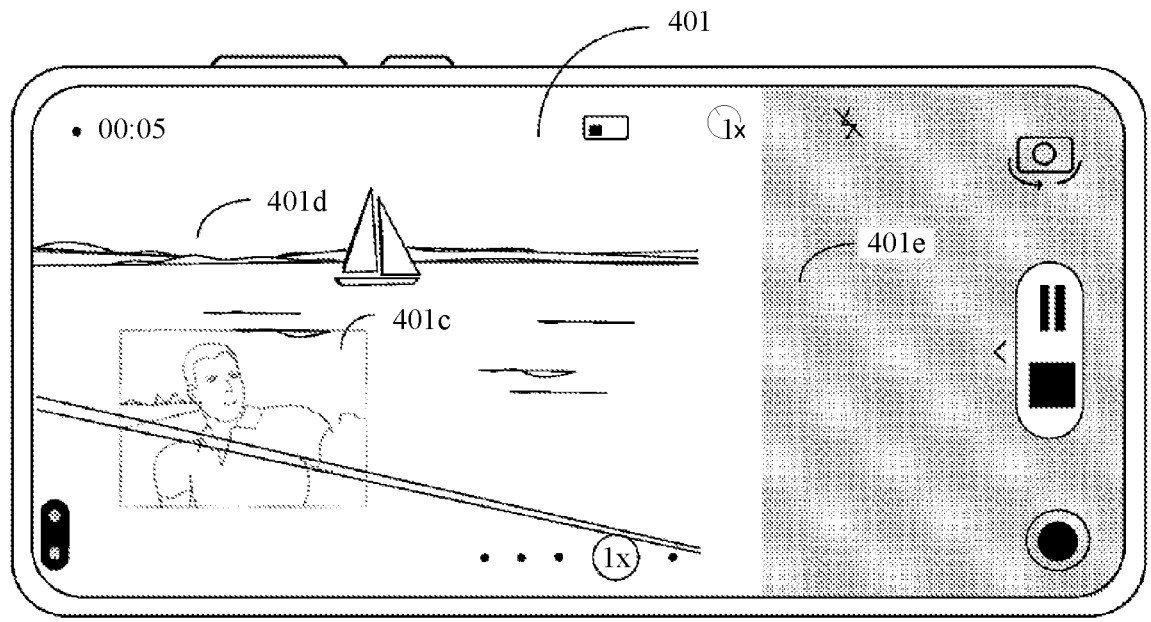
Figure 9E:
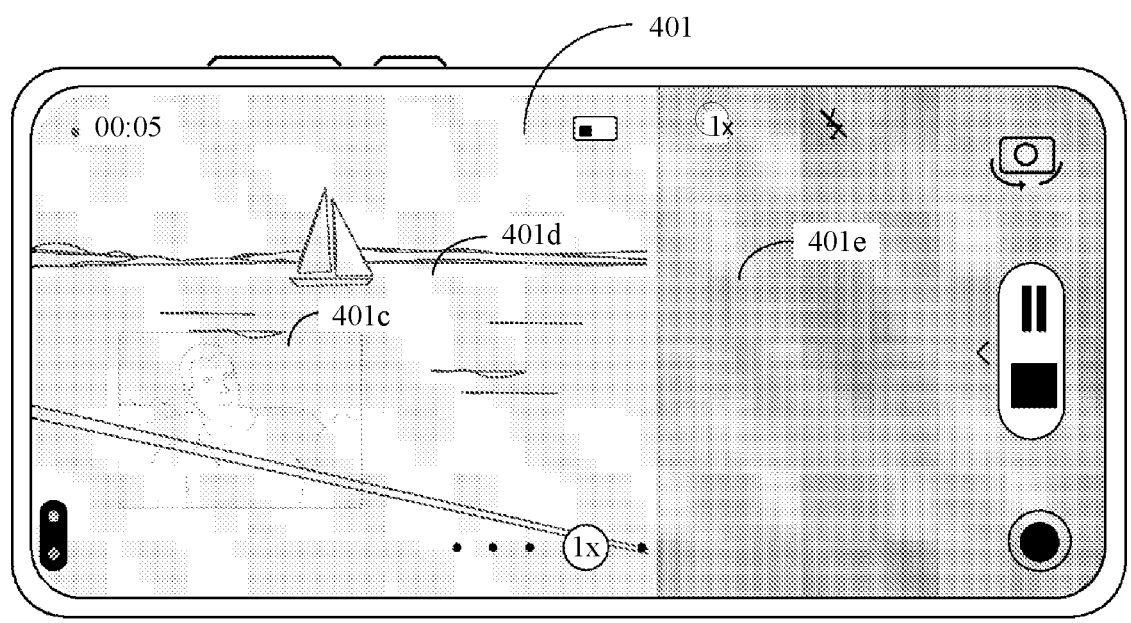

FIG. 9D shows a picture of a photographing preview interface 401 at 450 ms in a first switching cycle. As shown in FIG. 9D, the photographing preview interface 401 includes the picture-in-picture interface 401c (in this case, the display region in which the picture-in-picture interface 401c is located may be the first region), the front viewfinder interface 401d (in this case, a display region in which the front viewfinder interface 401d is located may be a fourth region, and an image on the front viewfinder interface 401d may be a fourth image), and a rear viewfinder interface 401e (in this case, a display region in which the rear viewfinder interface 401e is located may be a third region, and an image on the rear viewfinder interface 401e may be a third image). The photographing preview interface 401 shown in FIG. 9D is similar to the photographing preview interface 401 shown in FIG. 9E and FIG. 9C. A difference lies in that an opacity of the picture-in-picture interface 401c in FIG. 9D is between opacities of the picture-in-picture interface 401c in FIG. 9E and FIG. 9C. FIG. 9C, FIG. 9D, and FIG. 9E successively show a process in which the picture-in-picture interface 401c changes from opaque to transparent.

FIG. 9E shows a picture of a photographing preview interface 401 at 600 ms (a third moment) in a first switching cycle. As shown in FIG. 9E, the photographing preview interface 401 includes the picture-in-picture interface 401c, the front viewfinder interface 401d, and the rear viewfinder interface 401e. A location of the picture-in-picture interface 401c does not change compared with locations in FIG. 9C and FIG. 9B, but the picture-in-picture interface 401c in FIG. 9E changes to a transparent state. The picture displayed on the picture-in-picture interface 401c is a last frame of image in a video collected in the picture-in-picture mode by the front-facing camera. A picture displayed on the front viewfinder interface 401d is a last frame of image in a video collected in the picture-in-picture mode by the rear-facing camera. A picture displayed on the rear viewfinder interface 401e is a first preset picture provided by the electronic device. A display interface of the front viewfinder interface 401d on the photographing preview interface 401 is larger than a display interface of the rear viewfinder interface 401e on the photographing preview interface 401.

Figure 9F:
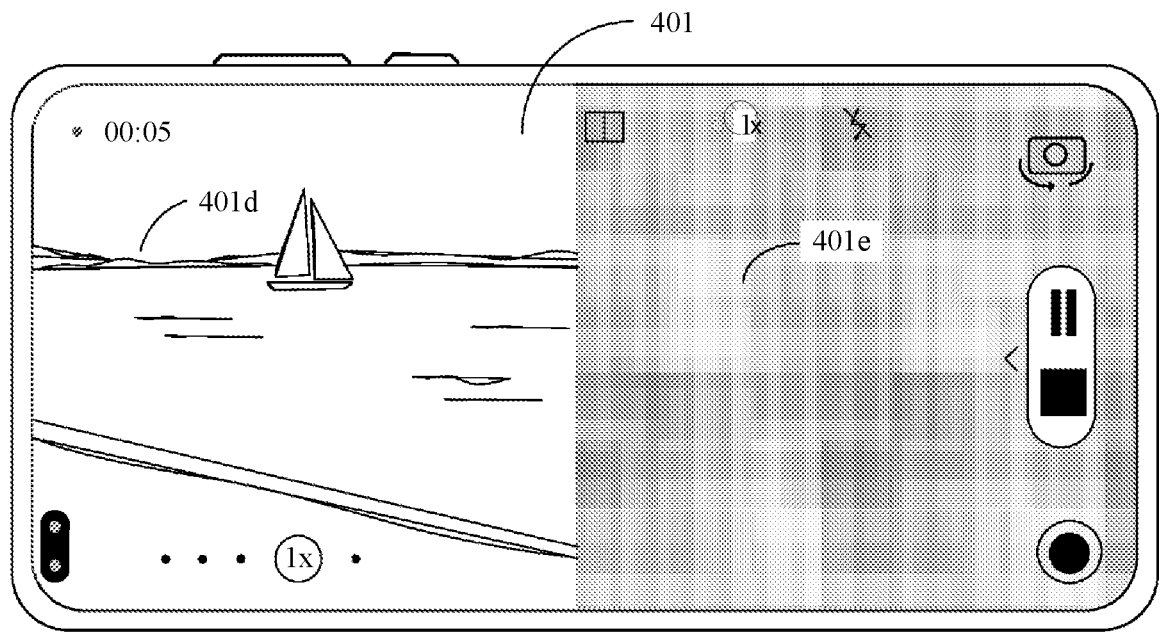

FIG. 9F shows a picture of a photographing preview interface 401 at 750 ms (a fourth moment) in a first switching cycle. The photographing preview interface 401 shown in FIG. 9F is similar to the photographing preview interface 401 shown in FIG. 9E. A difference lies in that a display interface of the front viewfinder interface 401d on the photographing preview interface 401 is equal to a display interface of the rear viewfinder interface 401e on the photographing preview interface 401, that is, each of the front viewfinder interface 401d and the rear viewfinder interface 401e accounts for half of the photographing preview interface.

A time period from 300 ms (the second moment) to 750 ms (the fourth moment) is referred to as a second time period. Referring to FIG. 8, in the first time period and the second time period, the electronic device performs Gaussian blur processing on the front viewfinder interface 401d, a Gaussian blur value of the front viewfinder interface 401d at 0 ms (the first moment) is 0 (a first blur value), and a Gaussian blur value of the front viewfinder interface 401d at 750 ms (the fourth moment) is 100 (a second blur value). That is, in the first time period and the second time period, the Gaussian blur values of the front viewfinder interface 401d change from 0 to 100 (from the first blur value to the second blur value). For a change trend of the Gaussian blur values of the picture-in-picture interface 401c in the first time period, refer to the first curve.

Figure 10B:
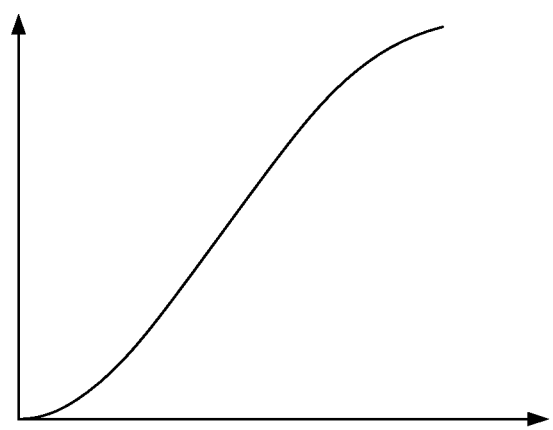

From 300 ms (the second moment) to 600 ms (the third moment) in the second time period, the electronic device further performs transparency processing on the picture-in-picture interface 401c. An opacity (opacity) of the picture-in-picture interface 401c at 300 ms (the second moment) is 100% (a second opacity), and an opacity of the picture-in-picture interface 401c at 600 ms (the third moment) is 0 (a first opacity). That is, from 300 ms (the second moment) to 600 ms (the third moment) in the second time period, the opacities of the picture-in-picture interface 401c change from 100% to 0 (from the second opacity to the first opacity). For a change trend of the opacities of the picture-in-picture interface 401c, refer to a second curve. FIG. 10B shows a change trend of a second curve. The second curve may be 06-Sharp curve (06-Sharp curve). At 600 ms, the opacity of the picture-in-picture interface 401c is 0, and in a time period from 600 ms to an end of the first switching cycle, the opacities of the picture-in-picture interface 401c all keep in this state.

Figure 10C:
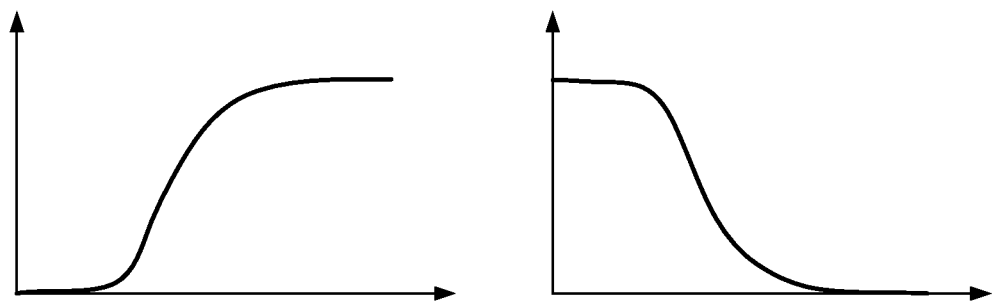

At 300 ms (the second moment), the display interface of the front viewfinder interface 401d is the entire display interface of the photographing preview interface 401. At 750 ms (the fourth moment), each of the front viewfinder interface 401d and the rear viewfinder interface 401e accounts for half of the photographing preview interface 401. In the second time period, for change processes of the front viewfinder interface 401d and the rear viewfinder interface 401e, refer to FIG. 8. In the second time period, the front viewfinder interface 401d moves leftward along an x-axis, and the rear viewfinder interface 401e also moves leftward along the x-axis. For movement trends of the front viewfinder interface 401d and the rear viewfinder interface 401e, refer to a third curve. FIG. 10C shows a change trend of a third curve. The third curve may be 01-Standard curve (01-Standard curve). A moving speed of the front viewfinder interface 401d may be equal to a moving speed of the rear viewfinder interface 401e, or the moving speed of the front viewfinder interface 401d may be less than the moving speed of the rear viewfinder interface 401e. In this embodiment, the moving speed of the front viewfinder interface 401d is half the moving speed of the rear viewfinder interface 401e. This is because a core picture (for example, a person on the interface) on the front viewfinder interface 401d is located in a center of the viewfinder interface. After moving at the foregoing speed, the core picture on the front viewfinder interface 401d in FIG. 9E may still be displayed in the center of the front viewfinder interface 401d shown in FIG. 9F, providing better viewing experience.

It should be noted that the "x-axis" in the foregoing "moving leftward along the x-axis" refers to a longer side of the electronic device when the electronic device is horizontally placed or a line parallel to the side.

At 750 ms (the fourth moment), video streams captured by the front-facing camera and the rear-facing camera are uploaded and respectively displayed on the display interfaces corresponding to the front viewfinder interface 401d and the rear viewfinder interface 401e on the photographing preview interface 401. At this time, the photographing preview interface 401 is still shown in FIG. 9F. This is because the video stream captured by the front-facing camera is shielded by a last frame of image on the front viewfinder interface 401d, and the video stream captured by the rear-facing camera is shielded by the first preset picture on the rear viewfinder interface 401e.

Figure 9G:
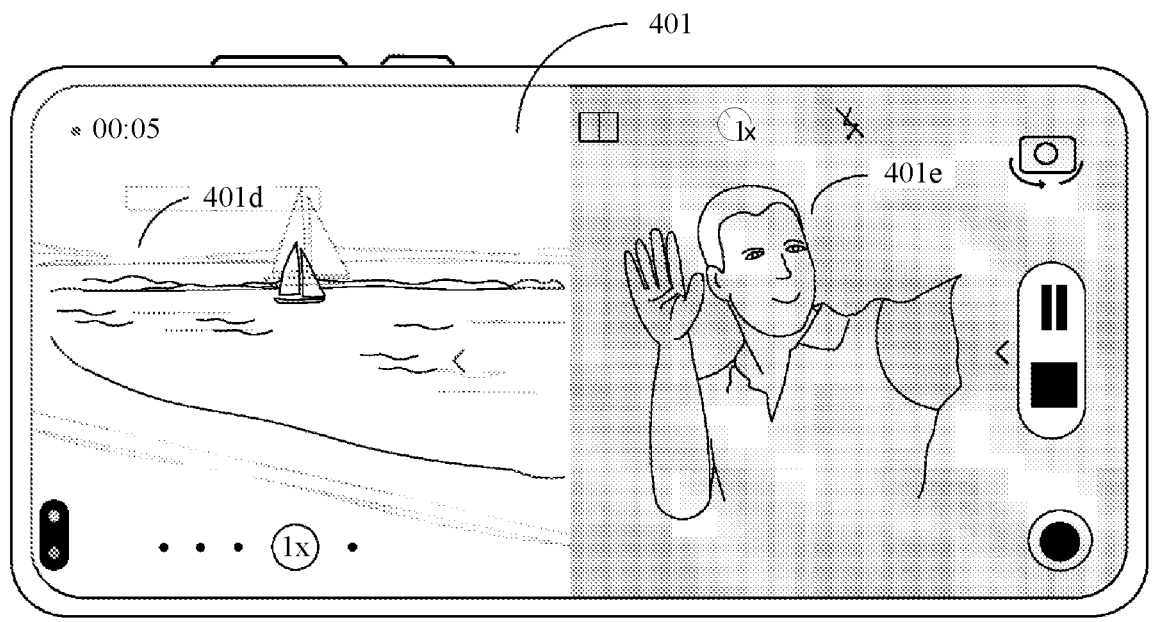

FIG. 9G shows a picture of a photographing preview interface 401 at 900 ms in a first switching cycle. As shown in FIG. 9G, the photographing preview interface 401 includes the front viewfinder interface 401d and the rear viewfinder interface 401e. A picture displayed on the front viewfinder interface 401d is a real-time video picture (the second image) shot by the rear-facing camera and the last frame of image (the fourth image), and the last frame of image (the fourth image) is superimposed and displayed on the real-time video picture (the second image) shot by the rear-facing camera. Being superimposed and displayed may mean that two pictures (the second image and the fourth image) in FIG. 9G are superimposed and displayed together. The real-time video picture is shielded by the last frame of image displayed on the front viewfinder interface 401d. However, compared with the last frame of image in FIG. 9F, the last frame of image in FIG. 9G has a decreased opacity. Therefore, in this case, a seen picture is a picture formed by superimposing the real-time video picture shot by the rear-facing camera and the last frame of image. A picture displayed on the rear viewfinder interface 401e is a real-time video picture shot by the front-facing camera and the preset picture, and the real-time video picture is shielded by the preset picture on the rear viewfinder interface 401e. However, compared with the preset picture in FIG. 9F, the preset picture in FIG. 9G has a decreased opacity. Therefore, in this case, a seen picture is a picture formed by superimposing the real-time video picture shot by the front-facing camera and the preset picture.

Figure 9H:
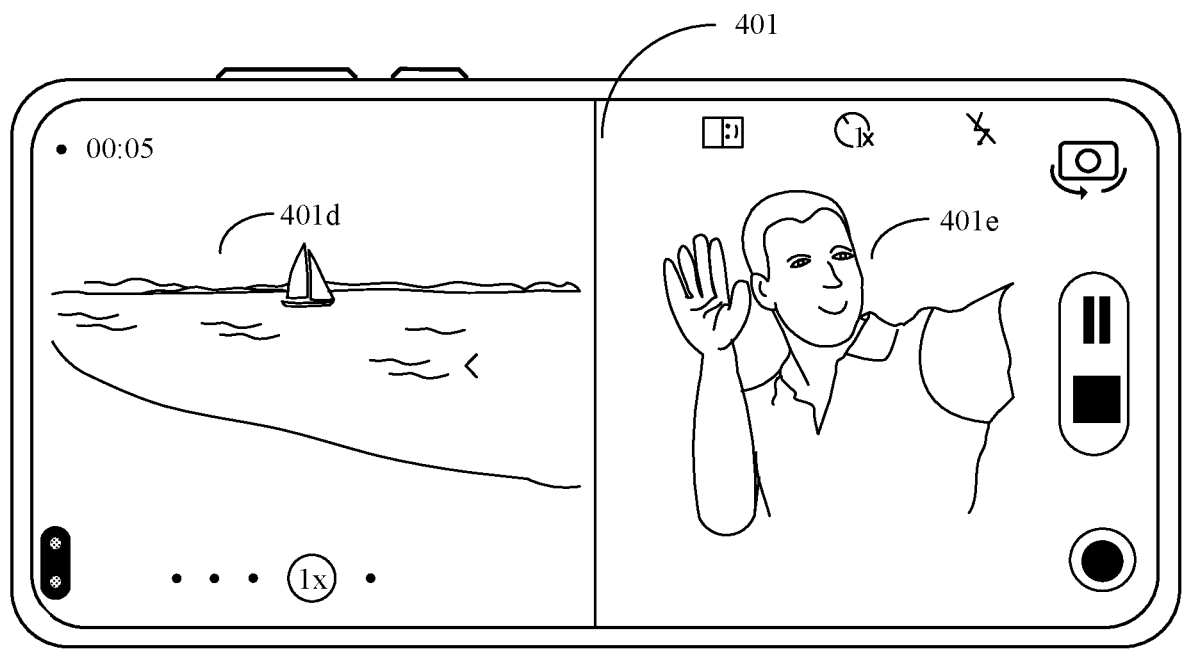

FIG. 9H shows a picture of a photographing preview interface 401 at 1050 ms (a fifth moment) in a first switching cycle. As shown in FIG. 9H, the photographing preview interface 401 includes the front viewfinder interface 401d (in this case, a display region in which the front viewfinder interface 401d is located may be a sixth region, and an image on the front viewfinder interface 401d may be the second image) and the rear viewfinder interface 401e (in this case, a display region in which the rear viewfinder interface 401e is located may be a fifth region, and an image on the rear viewfinder interface 401e may be the first image). A picture displayed on the front viewfinder interface 401d is the real-time video picture shot by the front-facing camera, and a picture displayed on the rear viewfinder interface 401e is the real-time video picture shot by the rear-facing camera.

A time period from 750 ms (the fourth moment) to 1050 ms (the fifth moment) is referred to as a third time period. The photographing preview interface 401 at 1050 ms (the fifth moment) is different from the photographing preview interface 401 at 750 ms (the fourth moment). This is because in the third time period, the electronic device performs transparency processing on the front viewfinder interface 401d and the rear viewfinder interface 401e. Referring to FIG. 8 and FIG. 9F, an opacity of the last frame of image on the front viewfinder interface 401d at 750 ms (the fourth moment) is 100% (a second opacity), and an opacity of the first preset picture on the rear viewfinder interface 401e at 750 ms (the fourth moment) is 100% (the second opacity). Referring to FIG. 8 and FIG. 9H, an opacity of the last frame of image on the front viewfinder interface 401d at 1050 ms (the fifth moment) is 0 (a first opacity), and an opacity of the first preset picture on the rear viewfinder interface 401e at 1050 ms (the fifth moment) is 0 (the first opacity). That is, in the third time period, the opacities of the front viewfinder interface 401d change from 100% to 0 (from the second opacity to the first opacity), and the opacities of the rear viewfinder interface 401e change from 100% to 0 (from the second opacity to the first opacity). For a change trend of the opacities of the front viewfinder interface 401d, refer to the second curve. For a change trend of the opacities of the rear viewfinder interface 401e, still refer to the second curve. That is, in the third time period, both the last frame of image on the front viewfinder interface 401d and the first preset picture on the rear viewfinder interface 401e change from completely opaque to completely transparent. After 750 ms, the video stream captured by the front-facing camera is uploaded at a display location at which the front viewfinder interface 401d is located, and the video stream captured by the rear-facing camera is uploaded at a display location at which the rear viewfinder interface 401e is located. With gradual changing of the transparencies of the last frame of image on the front viewfinder interface 401d and the first preset picture on the rear viewfinder interface 401e, the video pictures shot by the front-facing camera and the rear-facing camera are gradually and clearly presented on the photographing preview interface 401.

Figure 11:
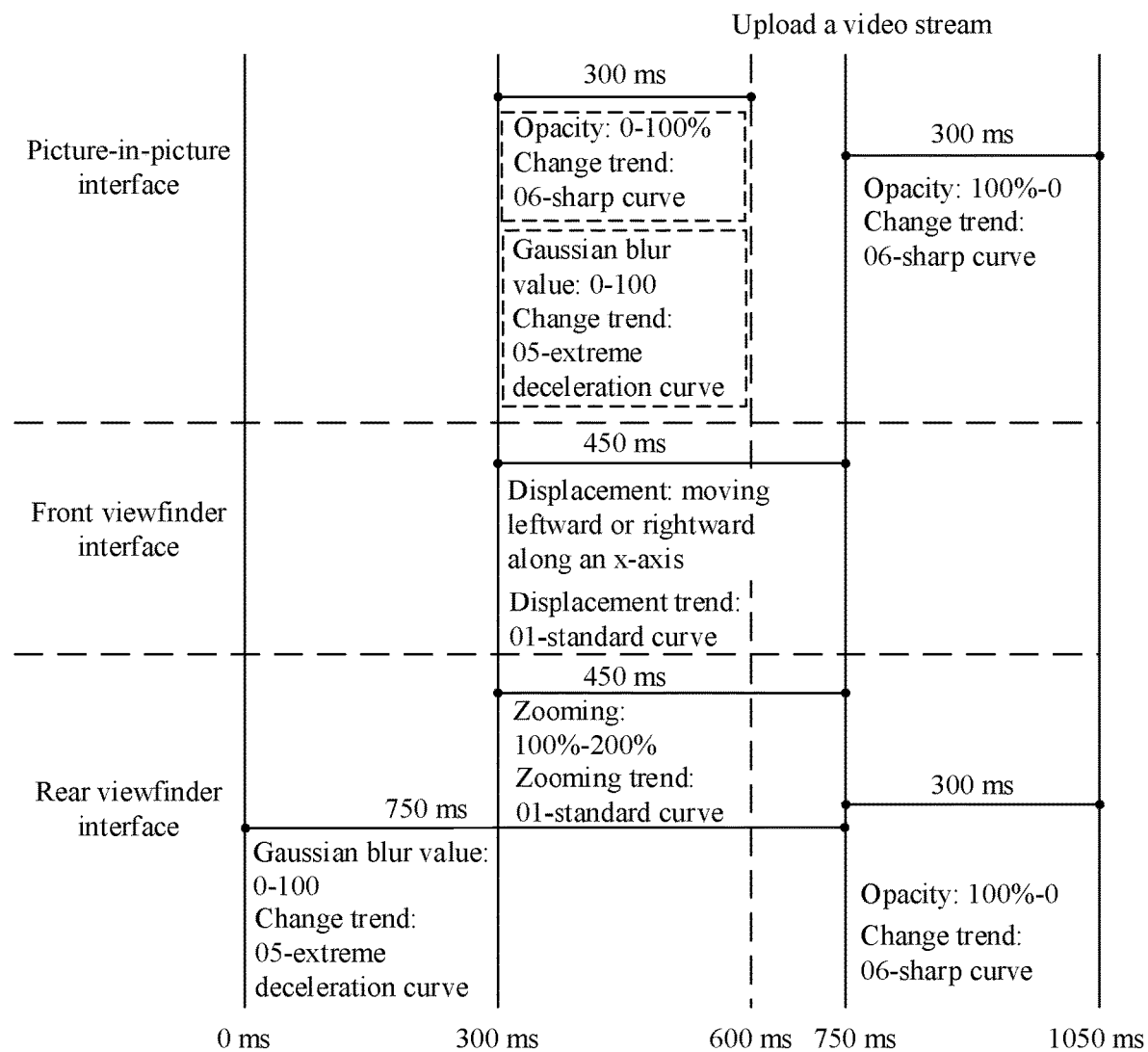
FIG. 11 is another flowchart of animation processing in a method according to an embodiment of this application.

The electronic device may further switch from the front/rear photographing mode to the picture-in-picture photographing mode. With reference to FIG. 11-FIG. 12H, the following describes a processing procedure of the electronic device for the photographing preview interface 401 and a series of interfaces in the processing procedure in a process in which the user switches from the front/rear photographing mode to the picture-in-picture photographing mode.

In this embodiment, the processing procedure for the photographing preview interface 401 and the series of interfaces in the processing procedure are described by using an example in which a photographing preview interface in the front/rear photographing mode is the interface shown in FIG. 5F, a command input by the user is "hold out a palm and then make a fist", and a photographing preview interface in the switched-to picture-in-picture photographing mode is the interface shown in FIG. 6A.

After the electronic device detects the "hold out a palm and then make a fist" air gesture (that is, the third air gesture) input by the user, in response to detecting the "hold out a palm and then make a fist" air gesture input by the user, the photographing preview interface 401 of the electronic device gradually switches from the front/rear photographing mode to the picture-in-picture photographing mode. FIG. 11 is another flowchart of animation processing performed by an electronic device on a photographing preview interface 401. Switching duration of the entire process in which the photographing preview interface switches from the front/rear photographing mode to the picture-in-picture photographing mode is a second switching cycle T2 (for example, the second switching cycle T2 is 1050 ms). The second switching cycle T2 may be divided into three processing time periods. The following describes in detail different processing time periods with reference to the accompanying drawings.

Figure 12A:
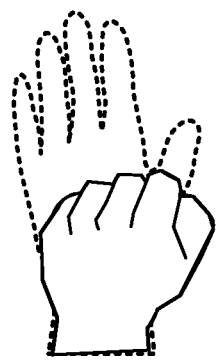
FIG. 12A-FIG. 12H are schematic diagrams of another group of interfaces according to an embodiment of this application.
Figure 12A:
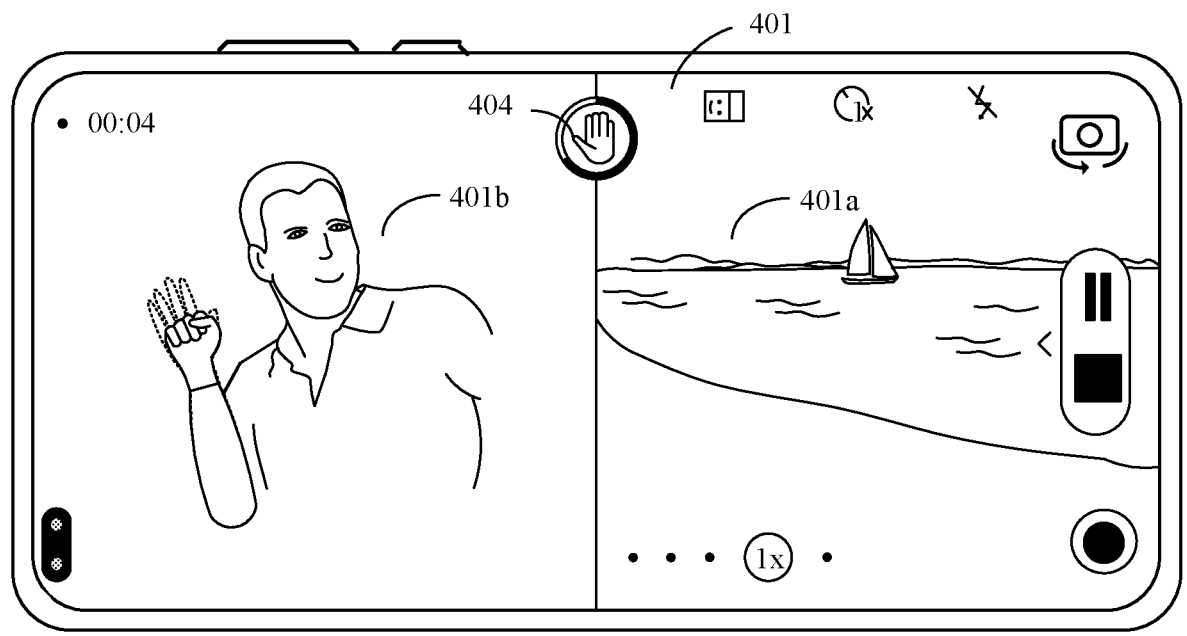

As shown in FIG. 12A, in this embodiment, when the user inputs the command "hold out a palm and then make a fist", the photographing preview interface 401 is an interface in the front/rear photographing mode shown in FIG. 12A, and after the user inputs the command "hold out a palm and then make a fist", the interface in the front/rear photographing mode shown in FIG. 12A switches to a picture-in-picture interface. It should be noted that a picture shown in FIG. 12A is similar to a picture shown in FIG. 5C. A difference lies in that display locations of pictures collected by the front-facing camera and the rear-facing camera on the photographing preview interface 401 are opposite. The picture shown in FIG. 12A may be obtained in the process shown in FIG. 5E to FIG. 5F, and then the picture shown in FIG. 5C is obtained. For the picture shown in FIG. 12A, refer to related descriptions in the foregoing embodiment. Details about the picture in FIG. 12A are not described herein again.

Figure 12B:
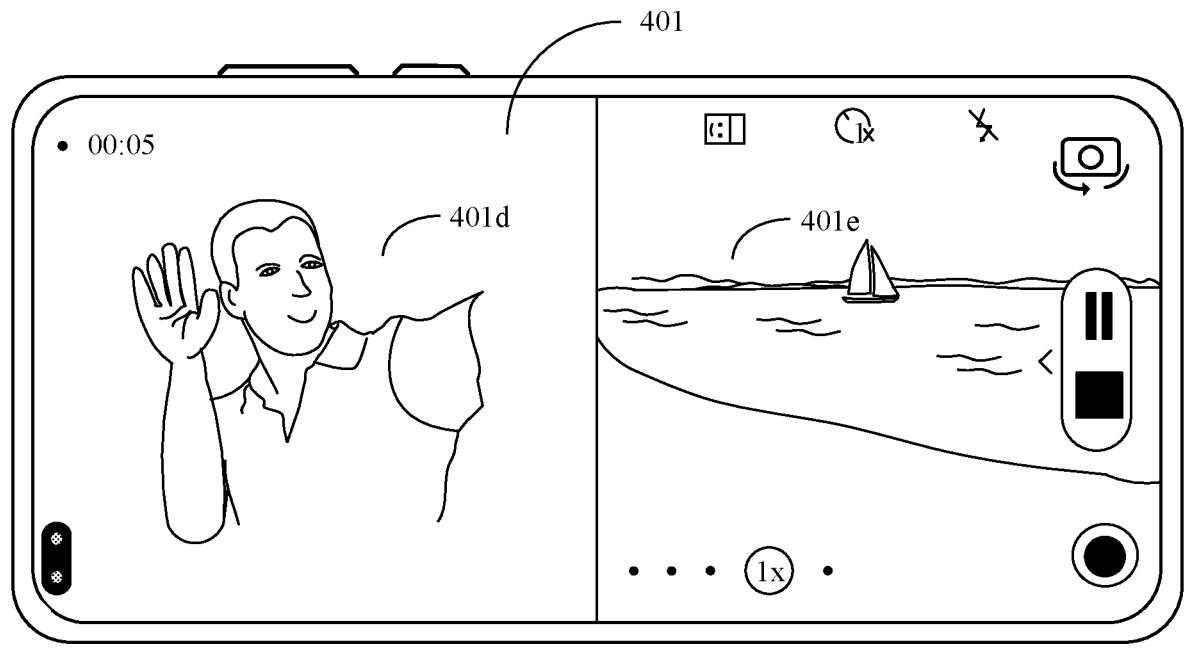

Referring to FIG. 12B, a picture on the photographing preview interface 401 shown in FIG. 12B is a picture at 0 ms (a first moment) in the second switching cycle T2 in which the front/rear photographing mode is switched to the picture-in-picture photographing mode, and the picture at this time may be a last frame of image in a video shot in the front/rear photographing mode. The photographing preview interface 401 includes the front viewfinder interface 401d and the rear viewfinder interface 401e. Each of a display interface of the front viewfinder interface 401d and a display interface of the rear viewfinder interface 401e accounts for half of the interface on which the entire photographing preview interface 401 is located, and the front viewfinder interface 401d and the rear viewfinder interface 401e are spliced left and right and displayed. The front viewfinder interface 401d displays a last frame of image in an image video collected by the front-facing camera, and the rear viewfinder interface 401e displays a last frame of image in an image video collected by the rear-facing camera.

Figure 12C:
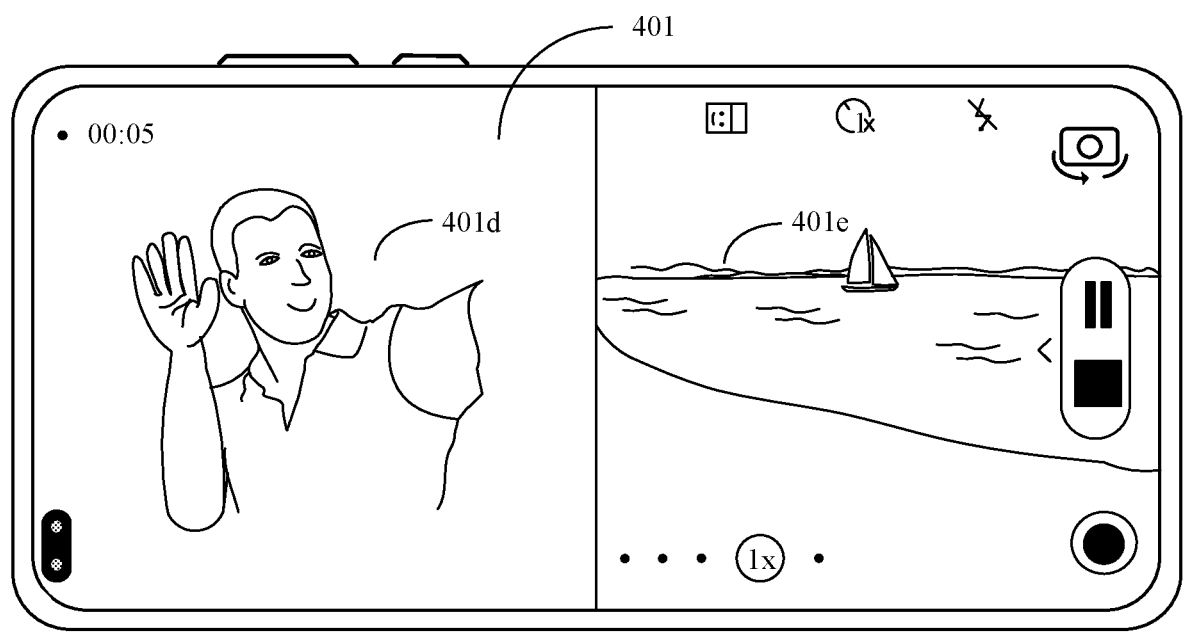
Figure 12D:
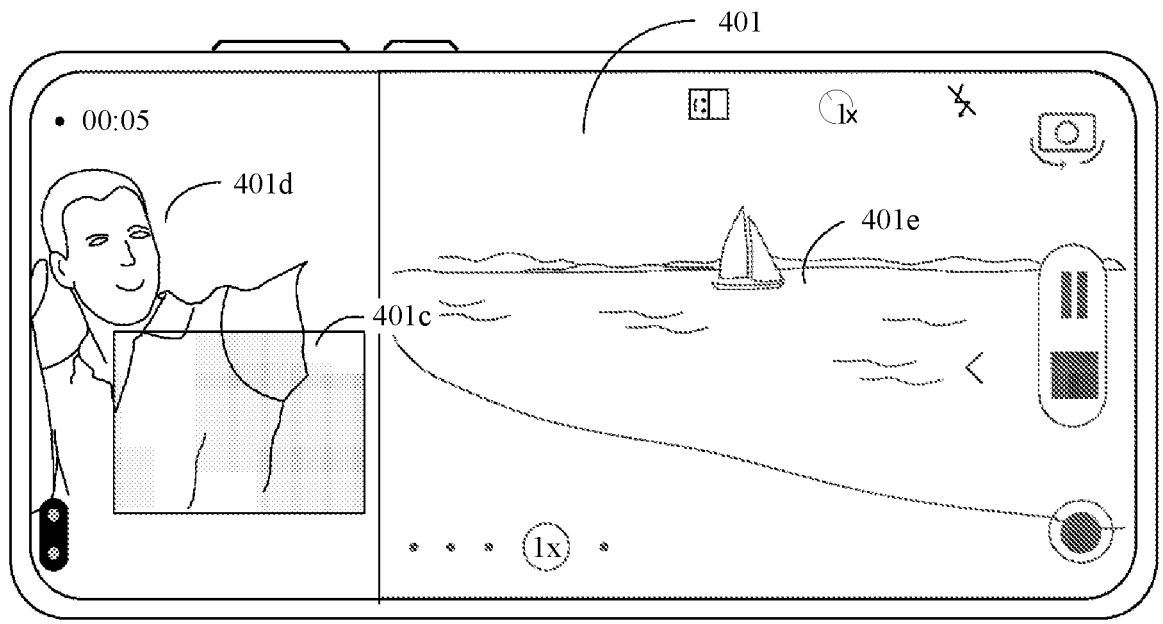

Referring to FIG. 12C, the photographing preview interface 401 shown in FIG. 12C is a picture at 300 ms (a second moment) in the second switching cycle T2. As shown in FIG. 12C, the photographing preview interface 401 includes the picture-in-picture interface 401c, the front viewfinder interface 401d, and the rear viewfinder interface 401e. The photographing preview interface 401 shown in FIG. 12C is similar to the photographing preview interface 401 shown in FIG. 12B. A difference lies in that the picture-in-picture interface 401c is superimposed and displayed on the front viewfinder interface 401d, and the picture-in-picture interface 401c is in a transparent state; and the rear viewfinder interface 401e in FIG. 12C becomes more blurred than the rear viewfinder interface 401e in FIG. 12B, and the front viewfinder interface 401d in FIG. 12C does not change compared with the front viewfinder interface 401d in FIG. 12B.

A time period from 0 ms (the first moment) to 300 ms (the second moment) in the second switching cycle T2 is referred to as a first time period. Referring to FIG. 11, in the first time period, the electronic device performs Gaussian blur processing on the rear viewfinder interface 401e, where a Gaussian blur value of the rear viewfinder interface 401e at 0 ms (the first moment) is 0 (a first blur value), and a Gaussian blur value of the rear viewfinder interface 401e at 300 ms (the second moment) is greater than 0. In the first time period, the Gaussian blur value of the rear viewfinder interface 401e is increasingly large. For a change trend of the Gaussian blur values of the rear viewfinder interface 401e in the first time period, refer to the first curve.

Figure 12E:
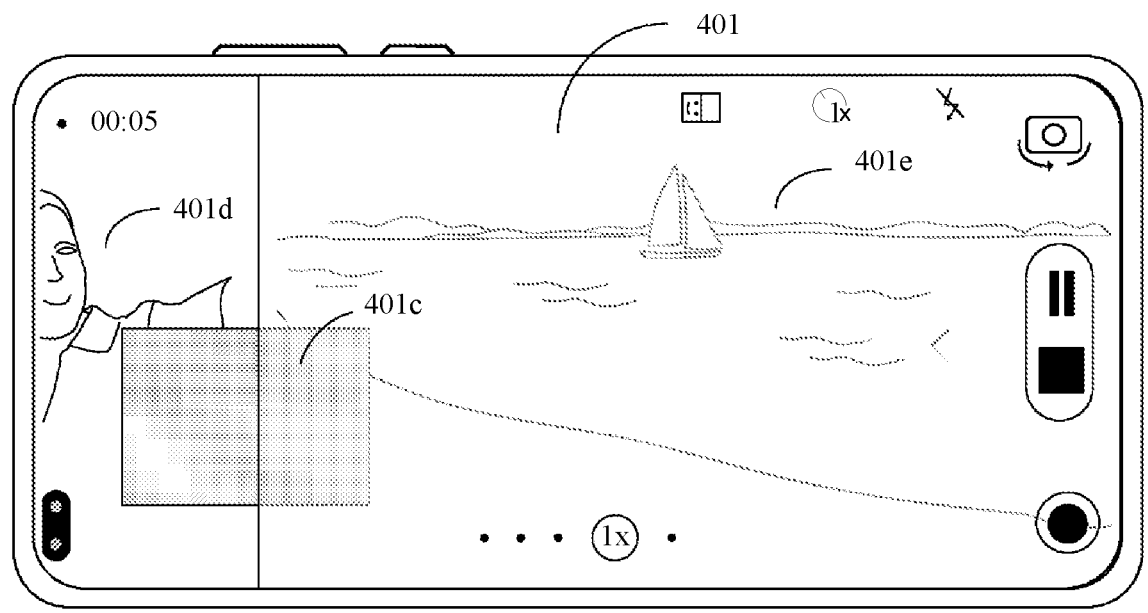

FIG. 12E shows a picture of a photographing preview interface 401 at 600 ms (a third moment) in a second switching cycle T2. As shown in FIG. 12E, the photographing preview interface 401 includes the picture-in-picture interface 401c, the front viewfinder interface 401d, and the rear viewfinder interface 401e. A display interface of the front viewfinder interface 401d is smaller than a display interface of the rear viewfinder interface 401e, and the picture-in-picture interface 401c is superimposed and displayed on the front viewfinder interface 401d and the rear viewfinder interface 401e. In a preset mode, the picture-in-picture interface 401c is preset at a lower left corner of the photographing preview interface 401. A picture displayed on the picture-in-picture interface 401c is a second preset picture. The second preset picture is more blurred than the second preset picture displayed on the picture-in-picture interface 401c in FIG. 12C. A picture displayed on the front viewfinder interface 401d is a last frame of image in a video collected by the front-facing camera in the front/rear photographing mode. A picture displayed on the rear viewfinder interface 401e is a last frame of image in a video collected by the rear-facing camera in the front/rear photographing mode, and the image is more blurred than an image displayed on the rear viewfinder interface 401e in FIG. 12C.

In comparison with the photographing preview interface in FIG. 12C, a display interface of the front viewfinder interface 401d in FIG. 12E is smaller than that of the front viewfinder interface 401d in FIG. 12C, and an image displayed on the front viewfinder interface 401d in FIG. 12E is a part of an image displayed on the front viewfinder interface 401d in FIG. 12C. A display interface of the rear viewfinder interface 401e in FIG. 12E is larger than that of the rear viewfinder interface 401e in FIG. 12C. An image displayed on the rear viewfinder interface 401e in FIG. 12E is an enlarged view of an image displayed on the rear viewfinder interface 401e in FIG. 12C.

FIG. 12D shows a picture of a photographing preview interface 401 at 450 ms in a second switching cycle T2. As shown in FIG. 12D, the photographing preview interface 401 includes the picture-in-picture interface 401c, the front viewfinder interface 401d, and the rear viewfinder interface 401e. The photographing preview interface 401 shown in FIG. 12D is similar to the photographing preview interface 401 shown in FIG. 12E and FIG. 12C. A difference lies in that an opacity of the picture-in-picture interface 401c in FIG. 12D is between opacities of the picture-in-picture interface 401c in FIG. 12E and FIG. 12C. FIG. 12C, FIG. 12D, and FIG. 12E successively show a process in which the picture-in-picture interface 401c changes from transparent to opaque. A size of a display interface of the front viewfinder interface 401d in FIG. 12D is between sizes of the display interfaces of the front viewfinder interface 401d in FIG. 12E and FIG. 12C. FIG. 12C, FIG. 12D, and FIG. 12E successively show a process in which the sizes of the display interfaces of the front viewfinder interface 401d change from large to small. A size of a display interface of the rear viewfinder interface 401e in FIG. 12D is between sizes of the display interfaces of the rear viewfinder interface 401e in FIG. 12E and FIG. 12C. FIG. 12C, FIG. 12D, and FIG. 12E successively show a process in which the sizes of the display interfaces of the rear viewfinder interface 401e change from small to large.

It should be noted that the foregoing "from small to large" and "from large to small" are relative concepts, and "from small to large" and "from large to small" represent change trends of the display interfaces of the front viewfinder interface 401d and the rear viewfinder interface 401e respectively shown in FIG. 12C, FIG. 12D, and FIG. 12E.

Figure 12F:
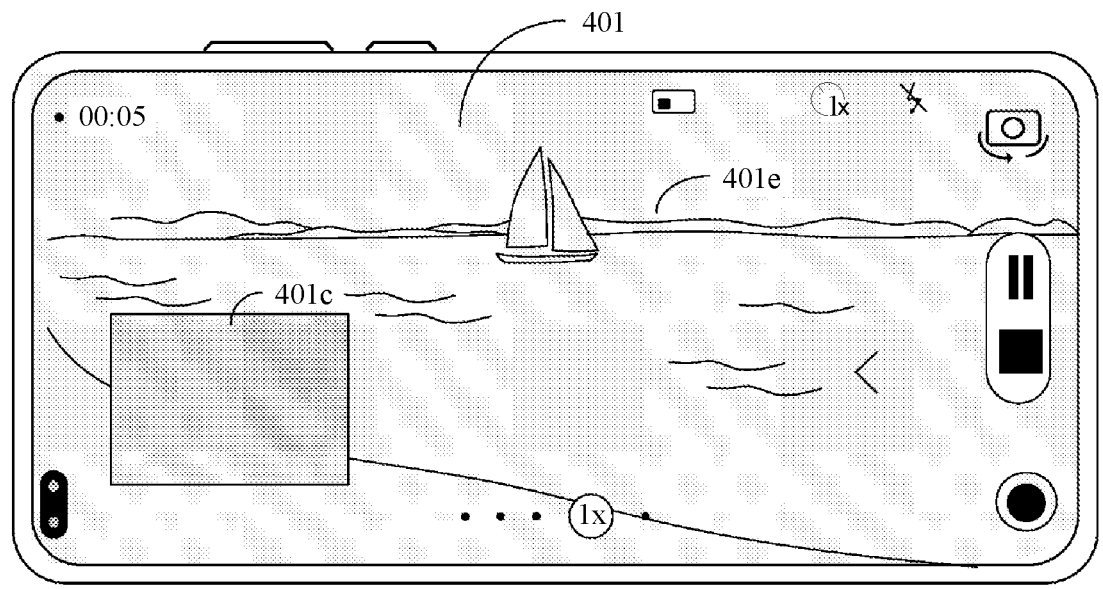

FIG. 12F shows a picture of a photographing preview interface 401 at 750 ms (a fourth moment) in a second switching cycle T2. The photographing preview interface 401 shown in FIG. 12F includes the picture-in-picture interface 401c and the rear viewfinder interface 401e. At this time, the picture-in-picture interface 401c is superimposed and displayed on the rear viewfinder interface 401e, and a display interface of the rear viewfinder interface 401e is the entire display interface of the photographing preview interface 401. The display interface of the rear viewfinder interface 401e in FIG. 12F is twice the display interface of the rear viewfinder interface 401e in FIG. 12C. Correspondingly, an image displayed on the rear viewfinder interface 401e in FIG. 12F is a 2× zoomed image of the image displayed on the rear viewfinder interface 401e in FIG. 12C.

A time period from 300 ms (the second moment) to 750 ms (the fourth moment) in the second switching cycle T2 is referred to as a second time period. Referring to FIG. 11 and with reference to FIG. 12B-FIG. 12F, the electronic device performs Gaussian blur processing on the rear viewfinder interface 401e in the first time period and the second time period, where the Gaussian blur value of the rear viewfinder interface 401e at 0 ms (the first moment) is 0 (the first blur value), and a Gaussian blur value of the rear viewfinder interface 401e at 750 ms (the fourth moment) is 100 (a second blur value). That is, in the first time period and the second time period, the Gaussian blur values of the rear viewfinder interface 401e change from 0 to 100 (from the first blur value to the second blur value). For a change trend of the Gaussian blur values of the rear viewfinder interface 401e in the first time period and the second time period (0 ms-750 ms), refer to the first curve.

In 300 ms (the second moment) to the 600 ms (the third moment) in the second time period, the electronic device further performs transparency processing and Gaussian blur processing on the picture-in-picture interface 401c. An opacity (opacity) of the picture-in-picture interface 401c at 300 ms (the second moment) is 0 (the first opacity), which indicates that the picture-in-picture interface 401c is in a transparent state in this case. An opacity of the picture-in-picture interface 401c at 600 ms (the third moment) is 0 (the first opacity), which indicates that the picture-in-picture interface 401c is in an opaque state in this case. That is, within 300 ms (the second moment) to 600 ms (the third moment) in the second time period, the opacities of the picture-in-picture interface 401c change from 0 to 100% (from the first opacity to the second opacity), that is, from the transparent state to the opaque state. For a change trend of the opacities of the picture-in-picture interface 401c, refer to the second curve. At 600 ms, the opacity of the picture-in-picture interface 401c is 100%, and in a time period from 600 ms to an end of the second switching cycle, the opacities of the picture-in-picture interface 401c all keep in this state.

In addition, a Gaussian blur value of the picture-in-picture interface 401c at 300 ms (the second moment) is 0 (the first blur value), which indicates that Gaussian blur processing is not performed on the picture-in-picture interface 401c at this time. A Gaussian blur value of the picture-in-picture interface 401c at 600 ms (the third moment) is 10 (the third blur value), which indicates that blur processing is performed on the picture-in-picture interface 401c at this time. That is, within 300 ms (the second moment) to 600 ms (the third moment) in the second time period, the Gaussian blur values of the picture-in-picture interface 401c change from 0 to 10 (from the first blur value to the third blur value), that is, the image on the picture-in-picture interface gradually becomes blurred. For a change trend of the Gaussian blur values of the picture-in-picture interface 401c, refer to the first curve. At 600 ms, the Gaussian blur value of the picture-in-picture interface 401c is 10, and in the time period from 600 ms to the end of the second switching cycle, the Gaussian blur values of the picture-in-picture interface 401c may keep in this state.

At 300 ms (the second moment), the display interface of the front viewfinder interface 401d is half the photographing preview interface 401, and the display interface of the rear viewfinder interface 401e is half the photographing preview interface 401. At 750 ms (the fourth moment), the display interface of the rear viewfinder interface 401e is the entire display interface of the photographing preview interface 401. For a change process of the front viewfinder interface 401d and the rear viewfinder interface 401e in the second time period, refer to FIG. 11. In the second time period, the front viewfinder interface 401d moves leftward along the x-axis, and for a movement trend of the front viewfinder interface 401d, refer to the third curve; and the rear viewfinder interface 401e zooms along a specific point, so that the display interface of the rear viewfinder interface 401e gradually becomes the display interface of the photographing preview interface 401. In this embodiment of this application, because the front viewfinder interface 401d moves leftward, the photographing preview interface 401 zooms along a vertex in an upper right corner of an interface on which the photographing preview interface 401 is located, so that the display interface of the rear viewfinder interface 401e can gradually cover a display interface vacated after the front viewfinder interface 401d moves.

The display interface of the rear viewfinder interface 401e in FIG. 12F is twice the display interface of the rear viewfinder interface 401e in FIG. 12C. Therefore, in the second time period, zoom values of the rear viewfinder interface 401e are from 100% to 200%. For a zooming trend of the rear viewfinder interface 401e, refer to the first curve.

It should be noted that the "x-axis" in the foregoing "moving leftward along the x-axis" refers to a longer side of the electronic device when the electronic device is horizontally placed or a line parallel to the side.

At 750 ms (the fourth moment), video streams captured by the front-facing camera and the rear-facing camera are uploaded and respectively displayed on the display interfaces corresponding to the picture-in-picture interface 401c and the rear viewfinder interface 401e on the photographing preview interface 401. At this time, the photographing preview interface 401 is still shown in FIG. 12F. This is because the video stream captured by the front-facing camera is shielded by the second preset picture on the picture-in-picture interface 401c, and the video stream captured by the rear-facing camera is shielded by a last frame of image on the rear viewfinder interface 401e.

Figure 12G:
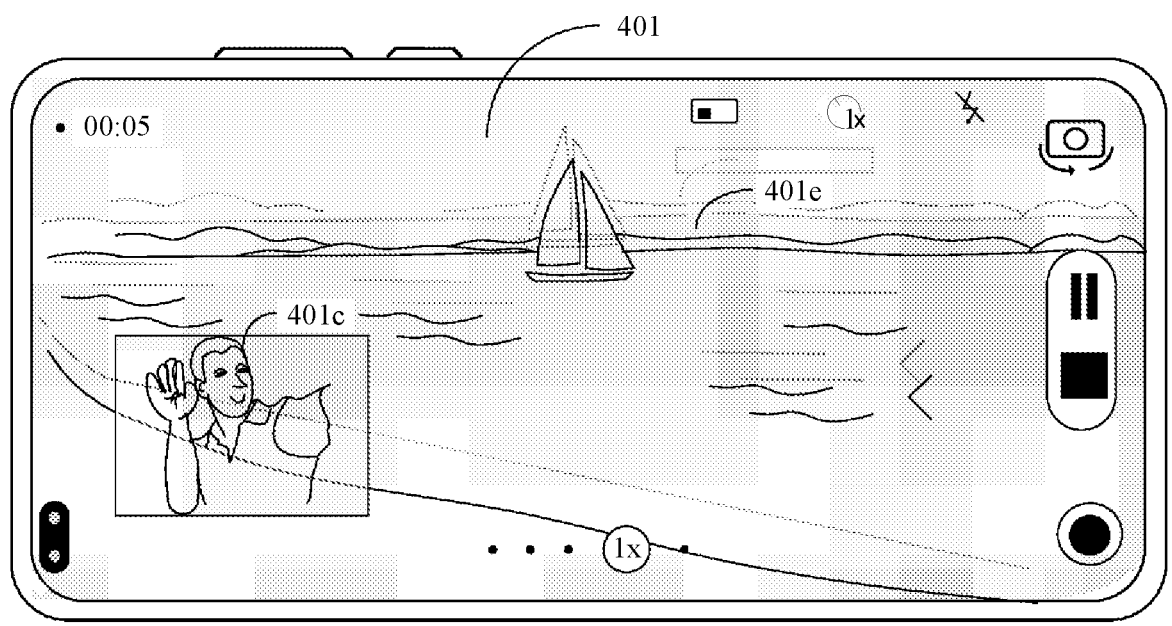
Figure 12H:
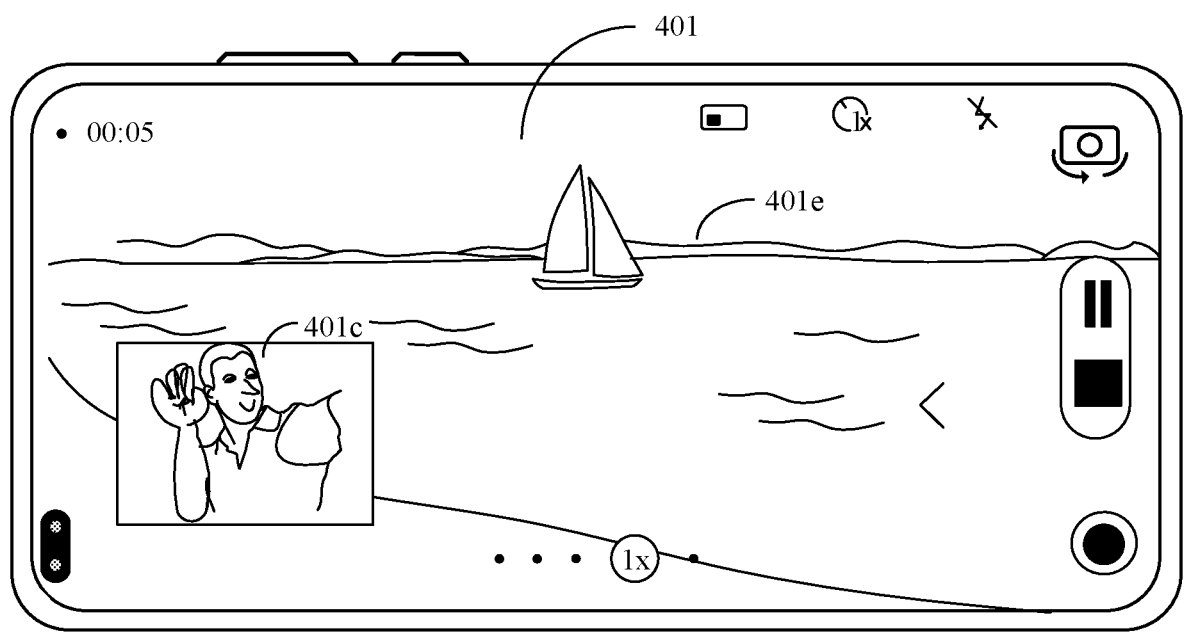

FIG. 12G shows a picture of a photographing preview interface 401 at 900 ms in a first switching cycle. As shown in FIG. 12G, the photographing preview interface 401 includes the picture-in-picture interface 401c and the rear viewfinder interface 401e. A picture displayed on the picture-in-picture interface 401c is a real-time video picture shot by the front-facing camera and a preset picture, and the real-time video picture is shielded by the preset picture displayed on the picture-in-picture interface 401c. However, compared with the preset picture in FIG. 9F, the preset picture in FIG. 12G has a decreased opacity. Therefore, in this case, a seen picture is a picture formed by superimposing the real-time video picture shot by the front-facing camera and the preset picture. A picture displayed on the rear viewfinder interface 401e is a real-time video picture shot by the rear-facing camera and the last frame of image. The real-time video picture is shielded by the last frame of image on the rear viewfinder interface 401e. However, compared with the last frame of image in FIG. 12F, the last frame of image in FIG. 12G has a decreased opacity. Therefore, in this case, a seen picture is a picture formed by superimposing the real-time video picture shot by the rear-facing camera and the last frame of image.

FIG. 12H shows a picture of a photographing preview interface 401 at 1050 ms (a fifth moment) in a switching cycle. As shown in FIG. 12H, the photographing preview interface 401 includes the picture-in-picture interface 401c and the rear viewfinder interface 401e. A picture displayed on the picture-in-picture interface 401c is a real-time video picture shot by the front-facing camera, and a picture displayed on the rear viewfinder interface 401e is a real-time video picture shot by the rear-facing camera. The picture-in-picture interface 401c is superimposed and displayed on the rear viewfinder interface 401e.

A time period from 750 ms (the fourth moment) to 1050 ms (the fifth moment) is referred to as a third time period. The photographing preview interface 401 at 1050 ms (the fifth moment) is different from the photographing preview interface 401 at 750 ms (the fourth moment). This is because in the third time period, the electronic device performs transparency processing on the picture-in-picture interface 401c and the rear viewfinder interface 401e. Referring to FIG. 11 and FIG. 12F, an opacity of the second preset picture on the picture-in-picture interface 401c at 750 ms (the fourth moment) is 100% (the second opacity), and an opacity of the last frame of image on the rear viewfinder interface 401e at 750 ms (the fourth moment) is 100% (the second opacity). Referring to FIG. 11 and FIG. 12H, an opacity of the second preset picture on the picture-in-picture interface 401c at 1050 ms (the fifth moment) is 0 (the first opacity), and an opacity of the last frame of image on the rear viewfinder interface 401e at 1050 ms (the fifth moment) is 0 (the first opacity). That is, in the third time period, the opacities of the picture-in-picture interface 401c change from 100% to 0 (from the second opacity to the first opacity), and the opacities of the rear viewfinder interface 401e change from 100% to 0 (from the second opacity to the first opacity). For a change trend of the opacities of the picture-in-picture interface 401c, refer to the second curve. For a change trend of the opacities of the rear viewfinder interface 401e, refer to the second curve. That is, in the third time period, both the second preset picture on the picture-in-picture interface 401c and the last frame of image on the rear viewfinder interface 401e change from completely opaque to completely transparent. After 750 ms, the video stream captured by the front-facing camera is uploaded at a display location at which the picture-in-picture interface 401c is located, and the video stream captured by the rear-facing camera is uploaded at a display location at which the rear viewfinder interface 401e is located. With gradual changing of the transparencies of the last frame of image on the picture-in-picture interface 401c and the first preset picture on the rear viewfinder interface 401e, the video pictures shot by the front-facing camera and the rear-facing camera are gradually and clearly presented on the photographing preview interface 401.

According to the foregoing descriptions of implementations, a person skilled in the art may clearly understand that, for ease and brevity of description, division of the foregoing functional modules is merely used as an example for illustration. In actual application, the foregoing functions may be allocated to different functional modules as required for implementation, that is, an inner structure of an apparatus is divided into different functional modules to implement all or some of the functions described above. For a specific working process of the system, the apparatus, and the unit described above, refer to a corresponding process in the foregoing method embodiments. Details are not described herein again.

Functional units in embodiments of this application may be integrated into one processing unit, or each unit may exist separately physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of embodiments of this application essentially, or the part contributing to the conventional technology, or all or some of the technical solutions may be implemented in the form of a software product. The computer software product is stored in a storage medium and includes several instructions for instructing a computer device (which may be a personal computer, a server, a network device, or the like) or a processor to perform all or some of the steps of the methods described in embodiments of this application. The foregoing storage medium includes any medium that can store program code, such as a flash memory, a removable hard disk, a read-only memory, a random access memory, a magnetic disk, or an optical disc.

The foregoing descriptions are merely specific implementations of embodiments of this application. However, the protection scope of embodiments of this application is not limited thereto. Any change or replacement within the technical scope disclosed in embodiments of this application shall fall within the protection scope of embodiments of this application. Therefore, the protection scope of embodiments of this application shall be subject to the protection scope of the claims.

What is claimed is:

1. A video shooting method, wherein the method is applied to an electronic device comprising a display, a first camera, and a second camera, the first camera and the second camera are located on different sides of the display, the first camera and the display are located on a same side of the electronic device, and the method comprises:
   displaying, in a first region of the display, a first image collected in real time by the first camera, and displaying, in a second region of the display, a second image collected in real time by the second camera;
   responding to a detected user operation, displaying a third image in a third region of the display, and displaying a fourth image in a fourth region of the display, wherein the third region is smaller than the first region and the fourth region is larger than the second region, or the third region is larger than the first region and the fourth region is smaller than the second region; and displaying, in a fifth region of the display, the first image collected in real time by the first camera, and displaying, in a sixth region of the display, the second image collected in real time by the second camera, wherein the fifth region is different from the first region, and the sixth region is different from the second region, wherein the method further comprises:

after the responding to a detected user operation, in a first time period, displaying, in the first region, a first image collected by the first camera when the user operation is detected, and displaying, in the second region, a second image collected by the second camera when the user operation is detected, wherein in the first time period, a Gaussian blur value of the second image gradually increases from a first blur value based on a first curve.

2. The method according to claim 1, after the responding to a detected user operation, comprising:

in a second time period, displaying the third image in the third region, and displaying the fourth image in the fourth region; and in a third time period, displaying, in the fifth region, the third image and the first image collected in real time by the first camera, wherein the third image is superimposed and displayed on the first image, and displaying, in the sixth region, the fourth image and the second image collected in real time by the second camera, wherein the fourth image is superimposed and displayed on the second image.

3. The method according to claim 2, wherein the first region and the second region are spliced and displayed on the display, the third region and the fourth region are spliced and displayed on the display, the sixth region is an entire display region of the display, and the fifth region is smaller than the sixth region.

4. The method according to claim 3, wherein in the second time period, a Gaussian blur value of the fourth image gradually increases to a second blur value based on the first curve.

5. The method according to claim 3, when the third image is displayed in the third region of the display and the fourth image is displayed in the fourth region of the display, further comprising:

displaying a preset picture in the fifth region of the display, wherein the preset picture is superimposed and displayed on at least one of the third image or the fourth image; and in the second time period, gradually increasing a Gaussian blur value of the preset picture from the first blur value to a third blur value based on the first curve, and gradually increasing an opacity of the preset picture from a first opacity to a second opacity based on a second curve.

6. The method according to claim 5, before the displaying, in a fifth region of the display, the first image collected in real time by the first camera, and displaying, in a sixth region of the display, the second image collected in real time by the second camera, further comprising:

in the third time period, gradually decreasing the opacity of the preset picture from the second opacity to the first opacity based on the second curve; and in the third time period, gradually decreasing an opacity of the fourth image from the second opacity to the first opacity based on the second curve.

7. The method according to claim 3, when the third image is displayed in the third region of the display and the fourth image is displayed in the fourth region of the display, comprising:

in the second time period, shrinking the third region along a direction corresponding to the user operation, and moving the third image along the direction corresponding to the user operation until the third image disappears from the display; and in the second time period, enlarging the fourth region along the direction corresponding to the user operation, and zooming in the fourth image along the direction corresponding to the user operation until the fourth image fills the display.

8. The method according to claim 7, wherein the third image moves based on a third curve along the direction corresponding to the user operation, and the fourth image zooms based on the third curve along the direction corresponding to the user operation.

9. The method according to claim 3, wherein the third image is generated based on the first image, and the fourth image is generated based on the second image.

10. A video shooting method, wherein the method is applied to an electronic device comprising a display, a first camera, and a second camera, the first camera and the second camera are located on different sides of the display, the first camera and the display are located on a same side of the electronic device, and the method comprises:

displaying, in a first region of the display, a first image collected in real time by the first camera, and displaying, in a second region of the display, a second image collected in real time by the second camera;

responding to a detected user operation, displaying a third image in a third region of the display, and displaying a fourth image in a fourth region of the display; and displaying, in a fifth region of the display, the first image collected in real time by the first camera, and displaying, in a sixth region of the display, the second image collected in real time by the second camera, wherein the fifth region is different from the first region, the sixth region is different from the second region, the fifth region is larger than the third region, and the sixth region is smaller than the fourth region, wherein the third image is a preset picture, and the fourth image is generated based on the second image.

11. The method according to claim 10, after the responding to a detected user operation, comprising:

in a first time period, displaying, in the first region, a first image collected by the first camera when the user operation is detected, and displaying, in the second region, a second image collected by the second camera when the user operation is detected;

in a second time period, displaying the third image in the third region, and displaying the fourth image in the fourth region; and in a third time period, displaying, in the fifth region, the third image and the first image collected in real time by the first camera, wherein the third image is superimposed and displayed on the first image, and displaying, in the sixth region, the fourth image and the second image collected in real time by the second camera, wherein the fourth image is superimposed and displayed on the second image.

12. The method according to claim 11, wherein the second region is an entire display region of the display, the first region is smaller than the second region, the third region and the fourth region are spliced and displayed on the display, and the fifth region and the sixth region are spliced and displayed on the display.

13. The method according to claim 12, wherein in the first time period, a Gaussian blur value of the first image gradually increases from a first blur value to a third blur value based on a first curve, and a Gaussian blur value of the second image gradually increases from the first blur value based on the first curve; and in the second time period, a Gaussian blur value of the fourth image gradually increases to a second blur value based on the first curve.

14. The method according to claim 12, when the third image is displayed in the third region of the display and the fourth image is displayed in the fourth region of the display, comprising:

displaying the first image in the first region, wherein the first image is superimposed and displayed on at least one of the third image or the fourth image; and in the second time period, gradually decreasing an opacity of the first image from a second opacity to a first opacity based on a second curve.

15. The method according to claim 12, when the third image is displayed in the third region of the display and the fourth image is displayed in the fourth region of the display, comprising:

moving the third region and the third image along a direction corresponding to the user operation, and moving the fourth region and the fourth image along the direction corresponding to the user operation until a size of the third region is equal to a size of the fourth region.

16. The method according to claim 15, wherein the third image moves based on a third curve along the direction corresponding to the user operation, and the fourth image moves based on the third curve along the direction corresponding to the user operation.

17. The method according to claim 12, before the displaying, in a fifth region of the display, the first image collected in real time by the first camera, and displaying, in a sixth region of the display, the second image collected in real time by the second camera, further comprising:

in the third time period, gradually decreasing an opacity of the third image from a second opacity to a first opacity based on a second curve; and in the third time period, gradually decreasing an opacity of the fourth image from the second opacity to the first opacity based on the second curve.

18. An electronic device, comprising:
a display;
a first camera;
a second camera, wherein the first camera and the second camera are located on different sides of the display, the first camera and the display are located on a same side of the electronic device;
at least one processor; and
one or more non-transitory computer-readable storage media coupled to the at least one processor and storing programming instructions for execution by the at least one processor, wherein the programming instructions, when executed, cause the electronic device to perform operations comprising:

displaying, in a first region of the display, a first image collected in real time by a first camera, and displaying, in a second region of the display, a second image collected in real time by the second camera;

responding to a detected user operation, displaying a third image in a third region of the display, and displaying a fourth image in a fourth region of the display, wherein the third region is smaller than the first region and the fourth region is larger than the second region, or the third region is larger than the first region and the fourth region is smaller than the second region; and displaying, in a fifth region of the display, the first image collected in real time by the first camera, and displaying, in a sixth region of the display, the second image collected in real time by the second camera, wherein the fifth region is different from the first region, and the sixth region is different from the second region, wherein the operations further comprise:

after the responding to a detected user operation, in a first time period, displaying, in the first region, a first image collected by the first camera when the user operation is detected, and displaying, in the second region, a second image collected by the second camera when the user operation is detected, wherein in the first time period, a Gaussian blur value of the second image gradually increases from a first blur value based on a first curve.

19. The electronic device according to claim 18, wherein the operations comprise:

after the responding to a detected user operation:
in a second time period, displaying the third image in the third region, and displaying the fourth image in the fourth region; and in a third time period, displaying, in the fifth region, the third image and the first image collected in real time by the first camera, wherein the third image is superimposed and displayed on the first image, and displaying, in the sixth region, the fourth image and the second image collected in real time by the second camera, wherein the fourth image is superimposed and displayed on the second image.

20. The electronic device according to claim 19, wherein the first region and the second region are spliced and displayed on the display, the third region and the fourth region are spliced and displayed on the display, the sixth region is an entire display region of the display, and the fifth region is smaller than the sixth region.

* * * * *